United States Patent [19]

Riganati et al.

[11] 4,135,147

[45] Jan. 16, 1979

[54] MINUTIAE PATTERN MATCHER

[75] Inventors: John P. Riganati, Yorba Linda; Visvaldis A. Vitols, Orange, both of Calif.

[73] Assignee: Rockwell International Corporation, El Segundo, Calif.

[21] Appl. No.: 722,308

[22] Filed: Sep. 10, 1976

[51] Int. Cl.² ............................................. G06K 9/00
[52] U.S. Cl. ........................................... 340/146.3 E
[58] Field of Search .............. 340/146.3 E, 146.3 AC, 340/146.3 Q, 146.3 AQ; 283/7; 356/71; 235/181

[56] References Cited

U.S. PATENT DOCUMENTS

| | | | |
|---|---|---|---|
| 3,611,290 | 10/1971 | Luisi et al. | 340/146.3 E |
| 3,638,188 | 1/1972 | Pincoffs et al. | 340/146.3 AC |
| 3,959,884 | 6/1976 | Jordan et al. | 340/146.3 E |
| 4,015,240 | 3/1977 | Swonger et al. | 340/146.3 E |

FOREIGN PATENT DOCUMENTS 1186169  4/1970  United Kingdom .............. 340/146.3 E

*Primary Examiner*—Leo H. Boudreau
*Attorney, Agent, or Firm*—L. Lee Humphries; H. Fredrick Hamann; Rolf M. Pitts

[57] ABSTRACT

A system which, in one exemplary embodiment, comprises first means responsive to minutiae of first and second fingerprints for selectively generating a plurality of neighborhood comparison signals indicative of the closeness of match and coordinate displacements between minutiae neighborhoods of the first and second fingerprints, and second means responsive to the neighborhood comparison signals for developing an output signal indicative of the relative closeness of match of the first and second fingerprints.

11 Claims, 28 Drawing Figures

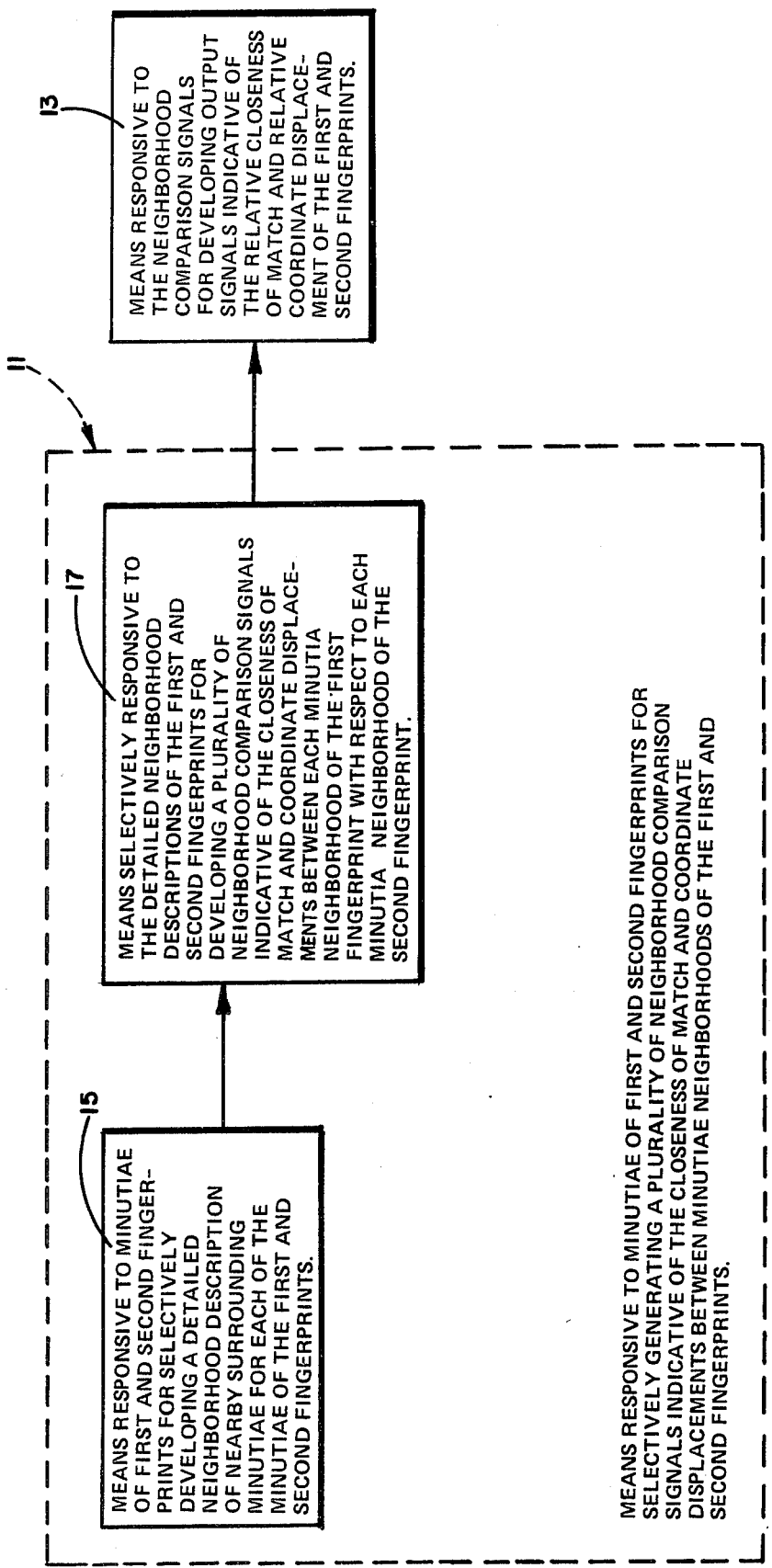

| CMA | NMA | NEXT RIV |
|---|---|---|
| | | |
| 1 | 2 | 1 |
| 1 | 3 | 0 |
| 1 | 4 | 0 |
| 1 | 5 | 0 |
| • | • | • |
| • | • | • |
| • | • | • |
| 1 | 191 | 0 |
| 1 | 192 | 0 |
| 2 | 1 | 1 |
| 2 | 3 | 0 |
| 2 | 4 | 0 |
| 2 | 5 | 0 |
| • | • | • |
| • | • | • |
| • | • | • |
| 2 | 191 | 0 |
| 2 | 192 | 0 |
| 3 | 1 | 1 |
| 3 | 2 | 0 |
| 3 | 4 | 0 |
| 3 | 5 | 0 |
| • | • | • |
| • | • | • |
| • | • | • |
| 3 | 191 | 0 |
| 3 | 192 | 0 |
| • | • | • |
| • | • | • |
| • | • | • |
| 192 | 1 | 1 |
| 192 | 2 | 0 |
| 192 | 3 | 0 |
| 192 | 4 | 0 |
| • | • | • |
| • | • | • |
| • | • | • |
| 192 | 191 | 0 |
| 192 | — | 1 |

FIG. 7

CENTER MINUTIA 4: $x_4, y_4, \theta_4$
RADIALLY SORTED
NEIGHBORING
MINUTIAE:
MINUTIA 6: $(x_6, y_6, \theta_6)\ r_1, \phi_1, \Delta\theta_1$
MINUTIA 2: $(x_2, y_2, \theta_2)\ r_2, \phi_2, \Delta\theta_2$  } RIV OF MINUTIA 4
MINUTIA 8: $(x_8, y_8, \theta_8)\ r_3, \phi_3, \Delta\theta_3$
RIV OF MINUTIA 4
FIG. 12
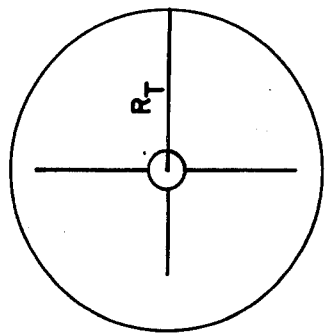
RIV NEIGHBORHOOD
FIG. 10
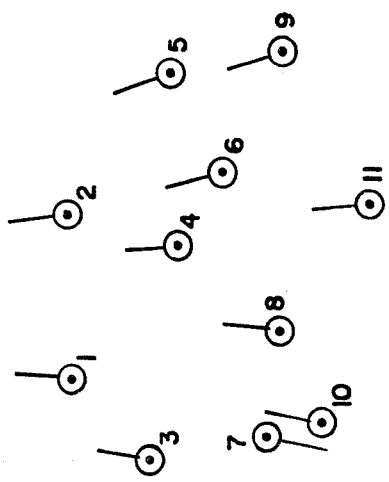
FINGERPRINT MINUTIAE
FIG. 9

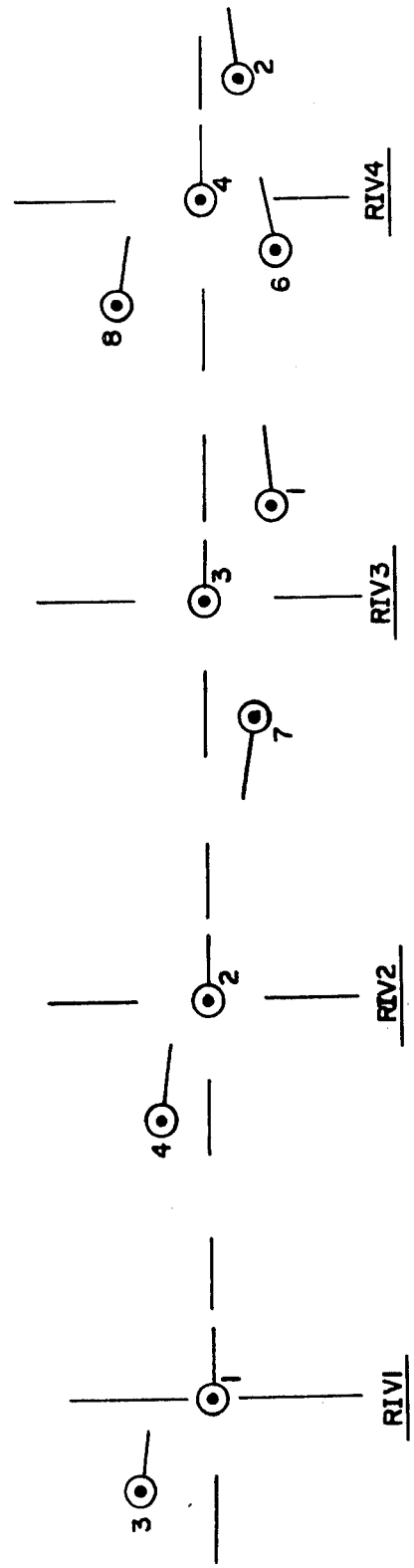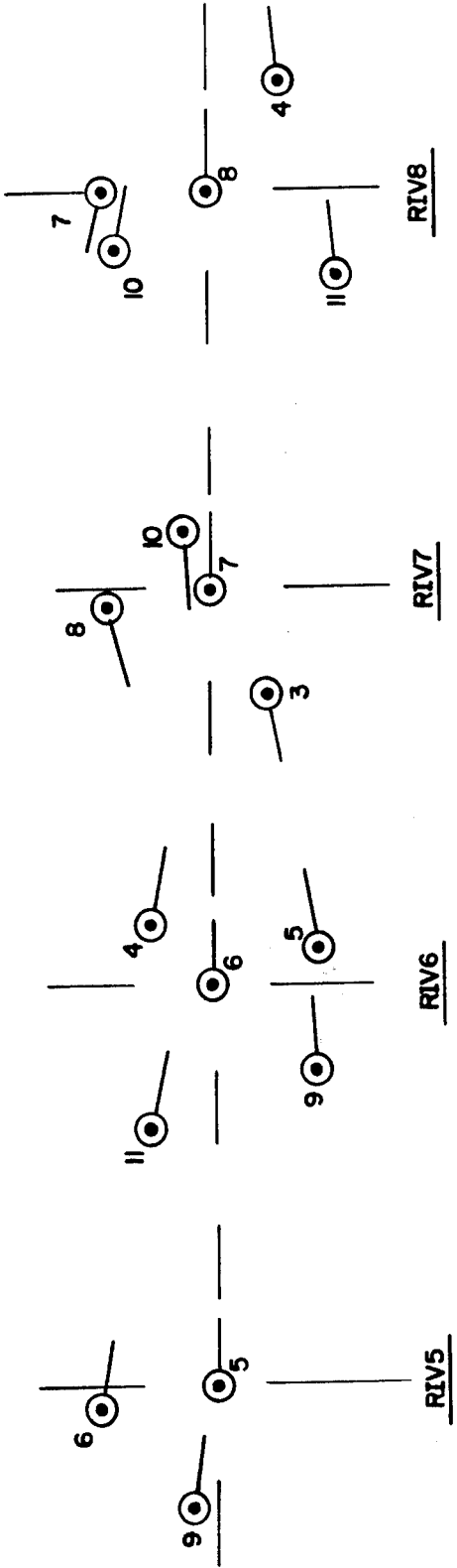
FIG. II

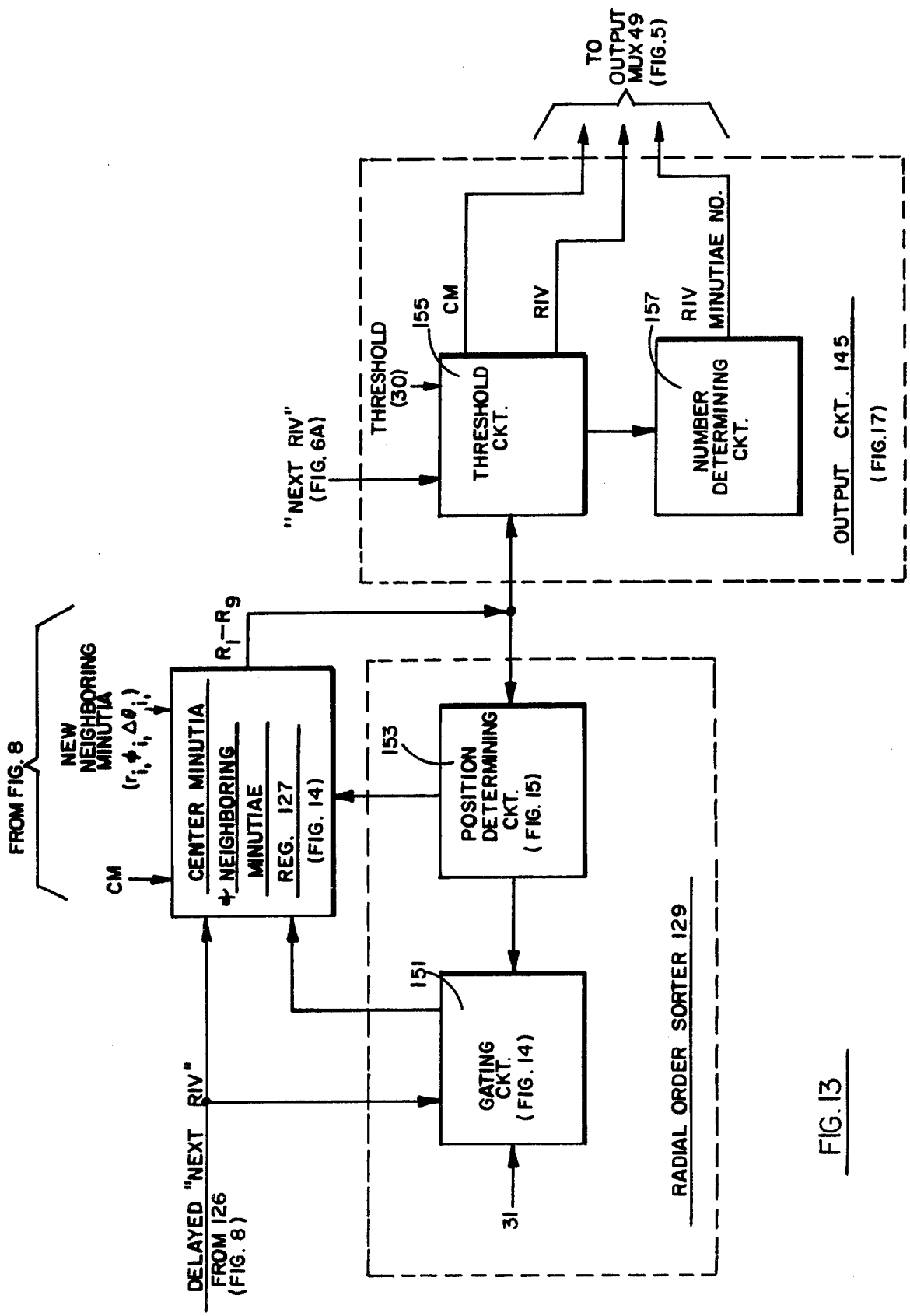

MINUTIAE PATTERN MATCHER

BACKGROUND OF THE INVENTION

1. Field of the Invention

This invention relates to pattern identification systems and particularly to a minutiae pattern identification system which in one embodiment automatically determines whether the minutiae pattern of an unidentified fingerprint matches that of any one of a plurality of known reference fingerprints.

2. Description of the Prior Art

The necessity for accurate and automatic fingerprint identification or verification in the fields of law enforcement, security, credit transactions, etc., has increased with time. Many different types of automatic systems have been proposed for identifying fingerprints or other patterns in these fields.

A first type of automatic fingerprint identification system is based primarily upon the global or general form of fingerprint patterns in order to determine the degree of match between those fingerprint patterns. Most systems based upon optical or holographic pattern matching are included in this first type. Examples of this first type of system are described in U.S. Pat. Nos.: 3,200,701; 3,292,149; 3,511,571; 3,532,426; 3,614,737; 3,619,060; 3,622,989; 3,704,949; 3,743,421; and 3,781,113.

A second type of automatic fingerprint identification system is based primarily upon local characteristics or details of the fingerprint patterns, e.g. the encoding of certain nuances in the vicinity of a fingerprint core. Examples of this second type of system are described in U.S. Pat. Nos. 3,584,958 and 3,694,240. In each of these two patents a mask is provided with a reference opening of predetermined contour for forming a reference line of corresponding contour across the fingerprint of an individual. This reference line will intersect the lines making up the fingerprint at some definite number of locations to define areas of intersection. These areas of intersection form the basis for parallel code lines of different widths for an identification card for the individual. A subsequent identification of the individual will be made by comparing the code lines of the identification card with the individual's fingerprint as taken at the time the card is used.

A third type of automatic fingerprint identification system is based upon a combination of the global form of the fingerprint patterns and local fingerprint characeristics which do not utilize minutiae. The minutiae of a fingerprint comprise the finest details that can be extracted from the fingerprint. Examples of this third type are found in U.S. Pat. Nos. 2,952,181; 3,566,354; 3,771,124 and 3,882,462. Each of these patents uses concatenated local information consisting of ridge and frequency measurements as the characterizing information. This breaking up of the ridge flow into local regions, is superior to a purely global approach,. In another example, U.S. Pat. No. 3,716,301 is concerned with a global correlation technique with a quasi-local embellishment consisting of one or more information bands around a central region.

A fourth type of automatic fingerprint identification system is based upon a combination of the global form of the fingerprint patterns and utilizes minutiae is the local fingerprint characteristics.

One example of this fourth type is found in U.S. Pat. No. 3,582,889. The fifth circuit of this patent utilizes a group of minutiae (termed "characteristic points") to form a "closed figure with straight sides joining the points in a predetermined order". The sixth circuit of this patent indicates coincidence of an unknown pattern with a known pattern when a preselected number of such closed figures are common to the two patterns.

Another example of this fourth type is described in "Automated Fingerprint Identification", by J. H. Wegstein, NBS (National Bureau of Standards) Technical Note 538, SD Catalog No. C13.46.538, U.S. Government Printing Office, Washington, D.C., August 1970. In this publication an NBS system is described which uses minutiae data for the entire fingerprint without doing a specific local region.

Many of the above-described systems require a relatively close orientation of the finger to be identified with the apparatus which is to perform the fingerprint identification.

None of the systems discussed above performs a relative information vector (RIV) encoding and analysis of minutiae neighborhoods of the fingerprints being compared to determine how each and every little minutiae neighborhood, or RIV, or one fingerprint matches with each and every little region of the other fingerprint. None of the above-described systems puts all these interim RIV comparison results together in three dimensional space to obtain the global picture.

SUMMARY OF THE INVENTION

An automatic system is exemplified to show the basic concepts of the present invention. This system provides for sequentially determining whether an unidentified fingerprint matches any one of the known fingerprints in a reference file. In a preferred embodiment, each minutia from each fingerprint is described by its relative position and orientation and is selectively encoded in a relative information vector (RIV) format. Each RIV is a detailed description of a minutia's immediate neighborhood of nearby surrounding minutiae. Each RIV in the unidentified print is sequentially compared with all of the RIVs in each of the known fingerprints. In this comparison operation a match score is determined from the number of minutiae in one RIV that match minutiae in the other RIV being compared. The set of match scores, developed from the pair of fingerprints being compared, is analyzed from a global or overall viewpoint by a score processor which develops a final score indicative of the degree of similarity between the pair of fingerprints being compared.

Although the embodiment of the present invention is directed to an automatic system for matching minutiae patterns occurring in fingerprints, it is apparent that fingerprints are but one example of the many types of patterns which may be automatically matched. For instance, speech and other sound patterns, as well as many types of contour patterns including those developed in conjunction with geographical mapping, structure analysis and wave study may be uniquely represented and encoded into an RIV format and processed as herein described.

An object of this invention is to provide an automatic minutia matcher which may be employed wherever patterns are uniquely represented by features which may be encoded into a relative information vector type format.

Another object of this invention is to provide an automatic statistical minutiae pattern matcher which is insensitive to expected fingerprint variations normally encountered.

Another object of this invention is to provide an automatic minutiae pattern matcher which is insensitive to the horizontal-vertical position and angular orientation of the minutiae patterns.

Another object of this invention is to provide an automatic minutiae pattern matcher which is capable of performing a match of data extracted from two partial fingerprints.

Another object of this invention is to provide an automatic fingerprint matcher which can generate a match score or result that is insensitive to skin stretch distortion and inking variations normally encountered in rolled prints.

Another object of this invention is to provide an automatic fingerprint matcher which selectively utilizes clusters of minutiae data from two fingerprints being compared to determine whether or not the two fingerprints match.

Another object of this invention is to provide an automatic fingerprint matcher which utilizes a relative information vector algorithm in its operation and exploits the different statistical distortion characteristics of local versus global regions.

A further object of this invention is to provide an automatic system for producing a match of two images where each relative information vector is derived from local features of an image.

BRIEF DESCRIPTION OF THE DRAWINGS

These and other objects, features and advantages of the invention, as well as the invention itself, will become more apparent to those skilled in the art in the light of the following detailed description taken in consideration with the accompanying drawings wherein like reference numerals indicate like or corresponding parts throughout the several views and wherein:

FIG. 2 is a generalized block diagram of a preferred embodiment of the fingerprint minutiae pattern matcher invention.

FIG. 7 illustrates a timing chart useful in explaining the operation of the timing and control circuit of FIGS. 6A and 6B.

FIGS. 9, 10, 11 and 12 illustrate minutiae and RIV patterns useful in explaining the operation of the RIV encoder of FIG. 8.

FIG. 13 is a simplified block diagram of the radial order sorter, center minutia and neighboring minutiae register, and output circuit of FIG. 8.

DESCRIPTION OF THE PREFERRED EMBODIMENT

Figure 1:
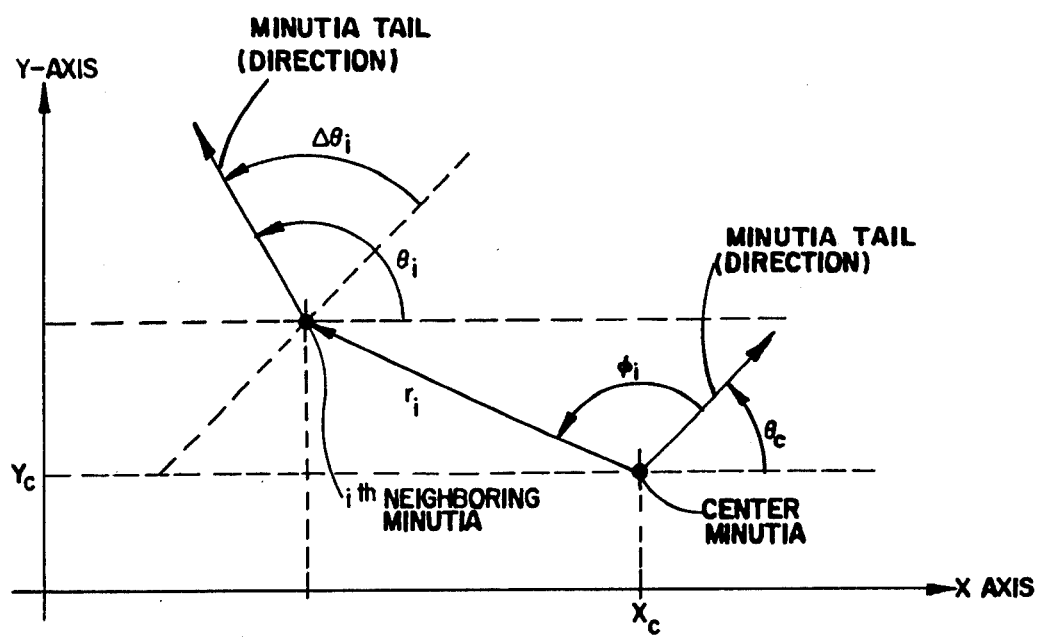
FIG. 1 illustrates the relative information vector parameters $r$, $\phi$ and $\Delta\theta$ for a neighboring minutia of a center minutia having coordinates $X_c$, $Y_c$, $\theta_c$.

The basic function of the minutiae pattern matcher system, that is illustrated in the drawings, is to selectively take two patterns (in this case, fingerprint patterns) and automatically determine a quantitative measure of similarity which may be used to conclude whether or not they originated from one and the same finger. In general, this minutiae pattern matcher system selectively matches or compares each small region (minutiae neighborhood or minutiae cluster) of an unknown fingerprint A (FP-A) with each small region of each fingerprint (for example, fingerprint B or FP-B) of known or previously identified fingerprints stored in a relatively large reference fingerprint file (not shown). In this manner, the system can determine whether the identity of the person who left fingerprint A is in the known reference file.

Before the drawings are discussed in detail, some basic principles of fingerprint identification and of the invention will now be discussed to clarify the concepts of the invention.

A fingerprint is a pattern of lines. For a human observer, categorizing these line patterns into a number of classes is convenient and has in fact formed the basis of fingerprint classification systems where humans have assumed the job of doing the classifying. These general pattern characteristics are not, by themselves, uniquely descriptive of an individual person. Fingerprints have another unique identifying set of features in addition to the patterns of their lines. This feature comes about because these "lines" don't go on forever but often have a very definite beginning and/or ending. Furthermore, these lines often divide up into two lines much like the letter Y does. The terminations, beginnings, and dividings ("bifurcations") of these lines are some of the most prevalent minutiae, or finely detailed description of the fingerprint pattern. Other minutiae can be derived from dots, islands, lakes, trifurcation or other fine detailed structures in the pattern. The relative positions of these minutiae in the fingerprint and the relative direction of the lines that they come from then forms a set of characteristics which uniquely identify a fingerprint. So, in principle, all that a minutiae reading machine must do is to trace each and every line of a fingerprint until it finds a minutia, and then simply record the coordinates and angle of that minutia. Such a fingerprint minutiae reading device is well known in the art and, for example, is taught in each of U.S. Pat. Nos. 3,611,290 and 3,699,519. As taught in these U.S. patents, each minutia in a fingerprint has three components or parameters that collectively define the location and orientation of that minutia. These parameters are the X and Y locations in a rectangular coordinate system and the angle $\theta$ of the orientation of the minutia in that coordinate system.

Once the parameters (X-Y coordinates and orientation angle $\theta$) of each of the minutiae of a fingerprint have been extracted, matching two fingerprints of the same finger is somewhat like sliding one set of mapped minutiae (corresponding to one fingerprint) past the other set of mapped minutiae (corresponding to the other fingerprint) while looking for a best fit.

In practice, a major complication comes into the picture. Skin is stretchable; and, consequently, two fingerprints of the same finger can differ quite appreciably due to the particular squeezing and twisting of the finger that was used at the time the fingerprint impression was made. More explicitly, two fingerprints from the same finger may never match perfectly because there may be, for example, false, missing or distorted minutiae. "False minutiae" are minutiae which do not exist in the finger, but appear in the fingerprint because of a poor fingerprint impression (too light, too smudgy, too heavy, or caused by an oily, dusty or wounded finger, etc.), or because of scarred or broken ridge areas. These false minutiae add to the 50–200 minutiae found in the typical fingerprint. Missing minutiae can be due to smeared, under-inked or over-inked prints. Distorted minutiae are due to variations in the stretching and twisting of the skin.

One approach that can be concluded from this major complication of skin stretchability is that, instead of matching whole fingerprints subjected to such relative stretching, only a small region or segment of one fingerprint should be matched against a small region of the other fingerprint. A counter-approach could require that a global or overall approach be used instead of a small region approach, due to the belief that a small region approach would be of limited weight if the global characteristics of the two fingerprints being matched were not considered. However, the two approaches are not contradictory, but are compatible with each other.

The basic approach taken in this invention is that, even though two fingerprints of the same finger may not match perfectly, if the minutiae patterns of these two fingerprints match sufficiently close, they can be considered to match each other. For this reason, there is a general overall match of two fingerprints for which it can be said that the fingerprints match. As a result, the fingerprint matcher embodiment of the present invention is implemented to automatically determine how each and every little region of one fingerprint matches with each and every little region of the other fingerprint and then put all these interim results together in a different space (something like the time domain versus frequency domain) to obtain the global picture. By this means the fingerprint matcher embodiment of this invention automatically determines whether or not the two fingerprints being compared are sufficiently similar to constitute a match.

Each little region of one fingerprint is called a "relative information vector" or RIV. An RIV is generated for each minutia of the fingerprints to be matched and is essentially a detailed description of the immediate neighborhood of that minutia. The minutia for which an RIV is generated is called the "reference" or "center" minutia for that RIV. More specifically, an RIV describes the relative position (r, $\phi$) and direction ($\Delta\theta$) for each one of a number of minutiae in a fingerprint with respect to the center minutia of that RIV. The three parameters r, $\phi$ and $\Delta\theta$ of this relative position may be defined as follows:

$r_i$ = the distance between the center minutia and the ith neighboring minutia of that RIV, $\phi_i$ = the angle between the tail of the center minutia and the location of the ith neighboring minutia of that RIV, and $\Delta\theta_i$ = the difference between the angle of the tail of the center minutia ($\theta_c$) and the angle of the tail of the ith neighboring minutia ($\theta_i$).

Pursuant to the above definitions, the RIV parameters $r_i$, $\phi_i$ and $\Delta\theta_i$ of the ith neighboring minutia are illustrated in FIG. 1 for a center minutia with coordinates ($x_c$, $y_c$, $\theta_c$).

In conformance with the above teaching, a generalized block diagram of the invention is illustrated in FIG. 2 as comprising means 11 and 13. Means 11 is responsive to minutiae of first and second fingerprints for selectively generating a plurality of neighborhood comparison signals indicative of the closeness of match and coordinate displacements between minutiae neighborhoods of the first and second fingerprints. Means 13 is responsive to the neighborhood comparison signals for developing output signals indicative of the relative closeness of match and relative coordinate displacement of the first and second fingerprints. Means 11 can be further divided into means 15 and 17. Means 15 is responsive to minutiae of first and second fingerprints for selectively developing a detailed neighborhood description of nearby surrounding minutiae for each of the minutiae of the first and second fingerprints. Means 17 is selectively responsive to the detailed neighborhood descriptions of the first and second fingerprints for developing a plurality of neighborhood comparison signals indicative of the closeness of match and coordinate displacement between each minutiae neighborhood of the first fingerprint with respect to each minutiae neighborhood of the second fingerprint.

As stated in relation to the above discussion of FIG. 2, the invention is responsive to minutiae of first and second fingerprints (A and B). Before the invention is discussed in more detail, a brief description will now be presented on how the minutiae of a fingerprint are developed.

Figure 4:
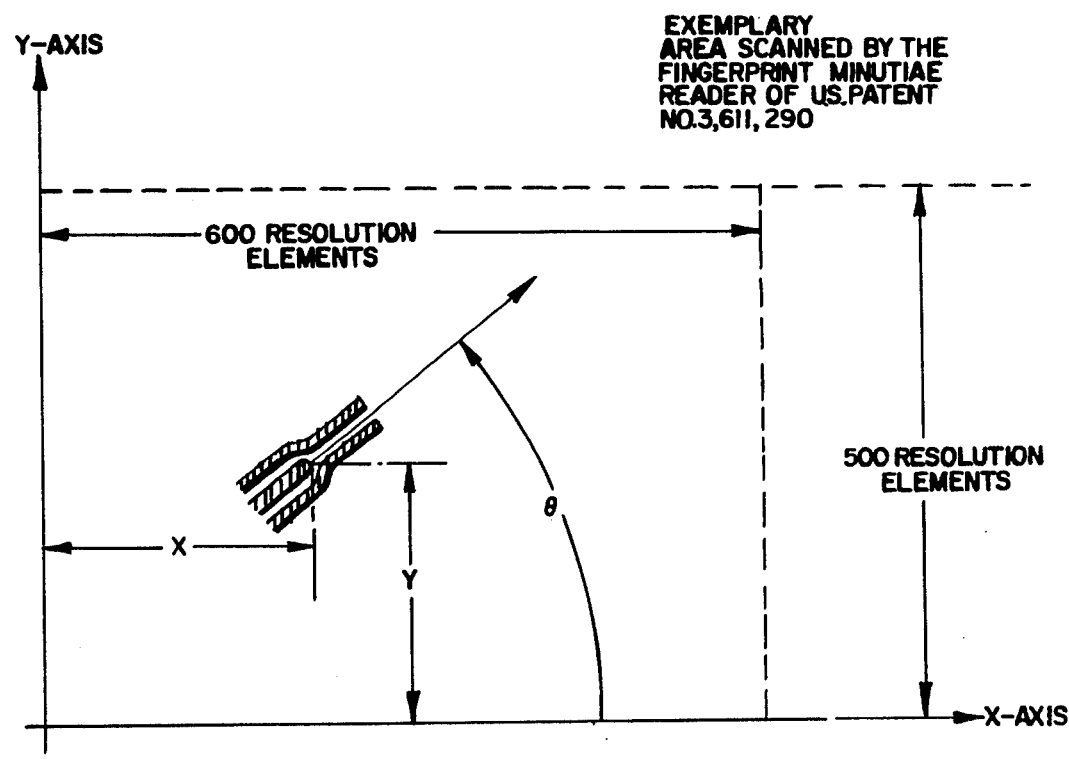
FIG. 4 illustrates how a minutia is identified.

As discussed previously, the X-Y coordinates and orientation angle $\theta$ of each minutia can be originally derived from a fingerprint minutiae reader, such as described in U.S. Pat. No. 3,611,290. The fingerprint minutiae reader of U.S. Pat. No. 3,611,290 detects minutiae in a fingerprint by circularly scanning incremental positions or locations, or resolution elements, of the fingerprint in a typical raster pattern. Such a raster pattern can comprise, for example, 300,000 incremental locations, with 600 increments in the X direction and 500 increments in the Y direction. In this fingerprint minutiae reader, as partially shown in FIG. 3, the incremental positions or locations of the X and Y coordinates of the scan are developed by the X and Y counters (73 and 75), while the counter (72) provides the angular orientation of the scan. The outputs of the counters (73, 75 and 72) are respectively applied to the inputs of X, Y and $\theta$ registers (60, 61 and 62). Each time that a minutia is detected by the decision logic (5), the associated X, Y and $\theta$ fingerprint minutiae data for that minutia is read out of the registers (60, 61 and 62). As shown in FIG. 4, this fingerprint minutiae reader identifies the relative positions of detected minutiae by developing the X and Y coordinates and angular orientation $\theta$ of each detected minutia.

For the sake of compatibility with the present invention, the fingerprint minutiae reader of U.S. Pat. No. 3,611,290 can be readily modified to also provide the number of minutiae in the unknown fingerprint A (FP-A) being processed and a signal (start FP-B) to start sequentially processing a known reference fingerprint B (FP-B), as well as the fingerprint minutiae data in the X, Y, $\theta$ format. For purposes of this discussion, let fingerprint B (FP-B) be any of the known fingerprints stored in a relatively large reference fingerprint file (not shown), which fingerprints can be individually or sequentially matched or compared with unknown fingerprint A (FP-A), in conformance with the teachings of this invention, for the best overall fingerprint identification match or matches as desired.

Figure 3:
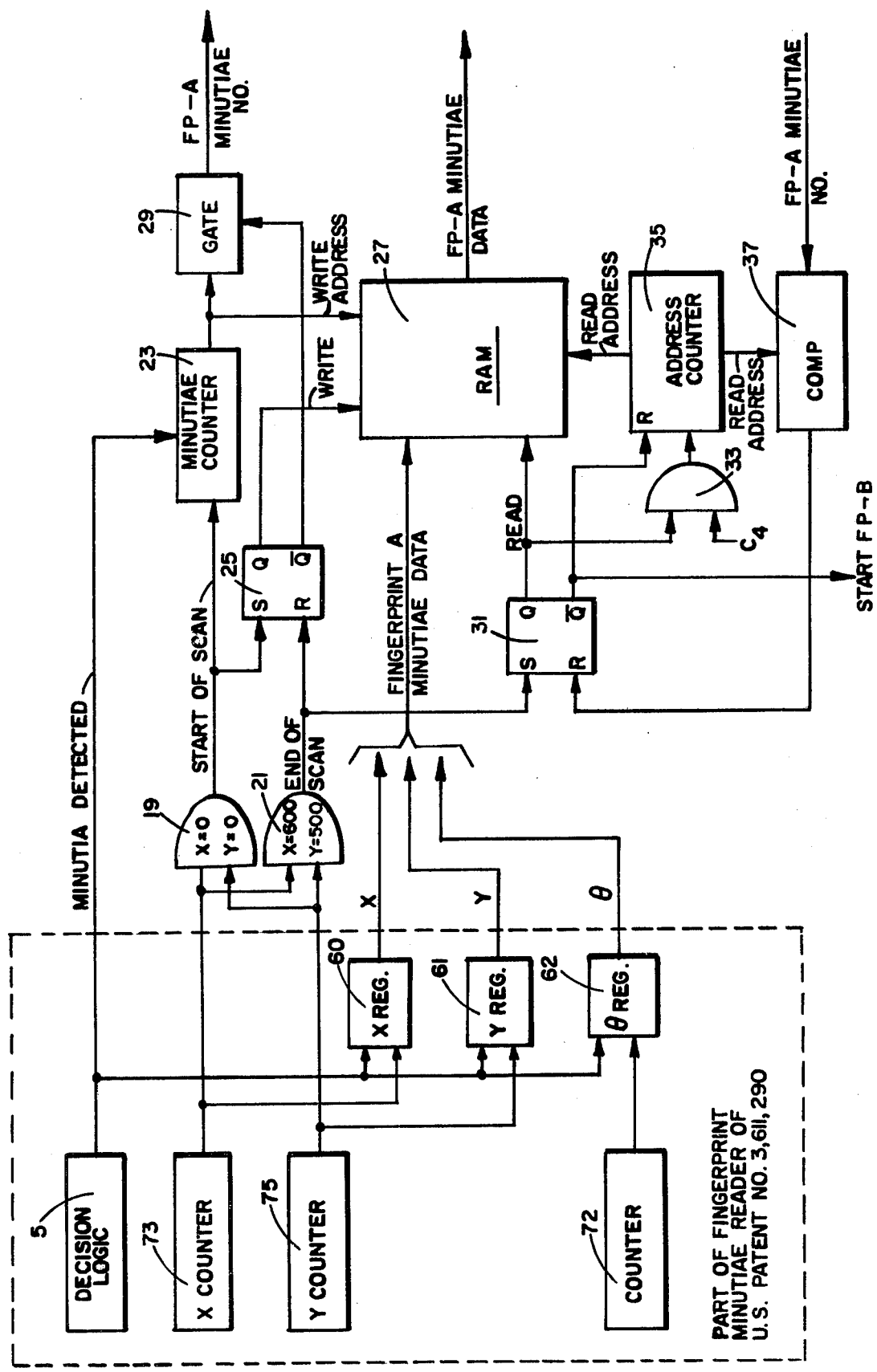
FIG. 3 illustrates a fingerprint minutiae reader modified to be compatible with the invention.

One such modification of the fingerprint minutiae reader of U.S. Pat. No. 3,611,290 is illustrated in the remaining portion of FIG. 3. As shown in FIG. 3, the X and Y outputs of the counters (73 and 75) are each applied to both of AND gates 19 and 21. AND gate 19 is implemented to develop a "start of scan" signal when, at the start of the scanning of the unknown fingerprint A, the counts of the X and Y counters (73 and 75) are both zero. On the other hand, AND gate 21 is implemented to develop an "end of scan" signal when the counts of the counters (73 and 75) are 600 and 500, respectively. The start of scan signal resets a minutiae counter 23 to a zero count, and sets a flip flop 25 so that its Q and $\bar{Q}$ sides respectively initiate a write cycle in a random access memory (RAM) 27 and a 0 state signal to disable a gate 29 to prevent the contents of the minutiae counter 23 from being read out through the gate 29. The output count of the minutiae counter 23 is used by the RAM 27 as a write address. Each time that a minutia is detected by the decision logic (5), the minutiae counter 23 is incremented by 1, as the X, Y and $\theta$ fingerprint minutiae data is read out of the registers (60, 61 and 62) and stored in the RAM 27 at the associated address location indicated by the count of the counter 23. Upon the completion of the scanning of a fingerprint for minutiae, when X = 600 and Y = 500, the end of scan signal from the AND gate 21 resets the flip flop 25 to terminate the write cycle of the RAM 27 and to enable the gate 29 to pass the contents of the minutiae counter 23 out. The output of the minutiae counter 23 is a binary number representing the number of minutiae that were detected in the fingerprint A that was scanned (or FP-A minutiae number).

The end of scan signal from the AND gate 21 also sets a flip flop 31 so that its 1 state Q side initiates a read cycle in the RAM 27 and enables an AND gate 33 to pass $C_4$ clock pulses to an address counter 35 to be counted. The output count of the address counter 35 is used by the RAM 27 as a read address. By this means the X, Y, $\theta$ minutiae data in the minutiae of fingerprint A (or FP-A minutiae data) is read out of the RAM 27 at the $C_4$ clock rate as the counter 35 is counting $C_4$ clocks. When the count of the counter 35 becomes equal to the FP-A minutiae number (from gate 29), a comparator 37 develops a signal to reset the flip flop 31. Upon being reset to the 0 state the Q side of flip flop 31 terminates the read cycle of the RAM 27 and disables the AND gate 33, while the 1 state $\bar{Q}$ side of the flip flop 31 resets the address counter 35 to a zero count and starts the processing of fingerprint B.

At this point, it should also be noted that our copending U.S. application Ser. No. 722,244, filed concurrently and entitled "Automatic Pattern Processing System" provides a minutiae detection system which differs from that described above, and in addition, employs the minutiae pattern matcher of the present invention. Therefore, the aforesaid U.S. application Ser. No. 722,244 is incorporated herein by reference.

The operation discussed in this preferred embodiment is presented as a sequential processor. If large numbers of file "B" fingerprints are to be compared to an unknown fingerprint A, it is known that a pipeline structure which continuously utilizes each portion of the processor may be employed. The sequential operation is to be preferred for low speed or low volume processing requirements and for clarity of presentation.

Figure 5:
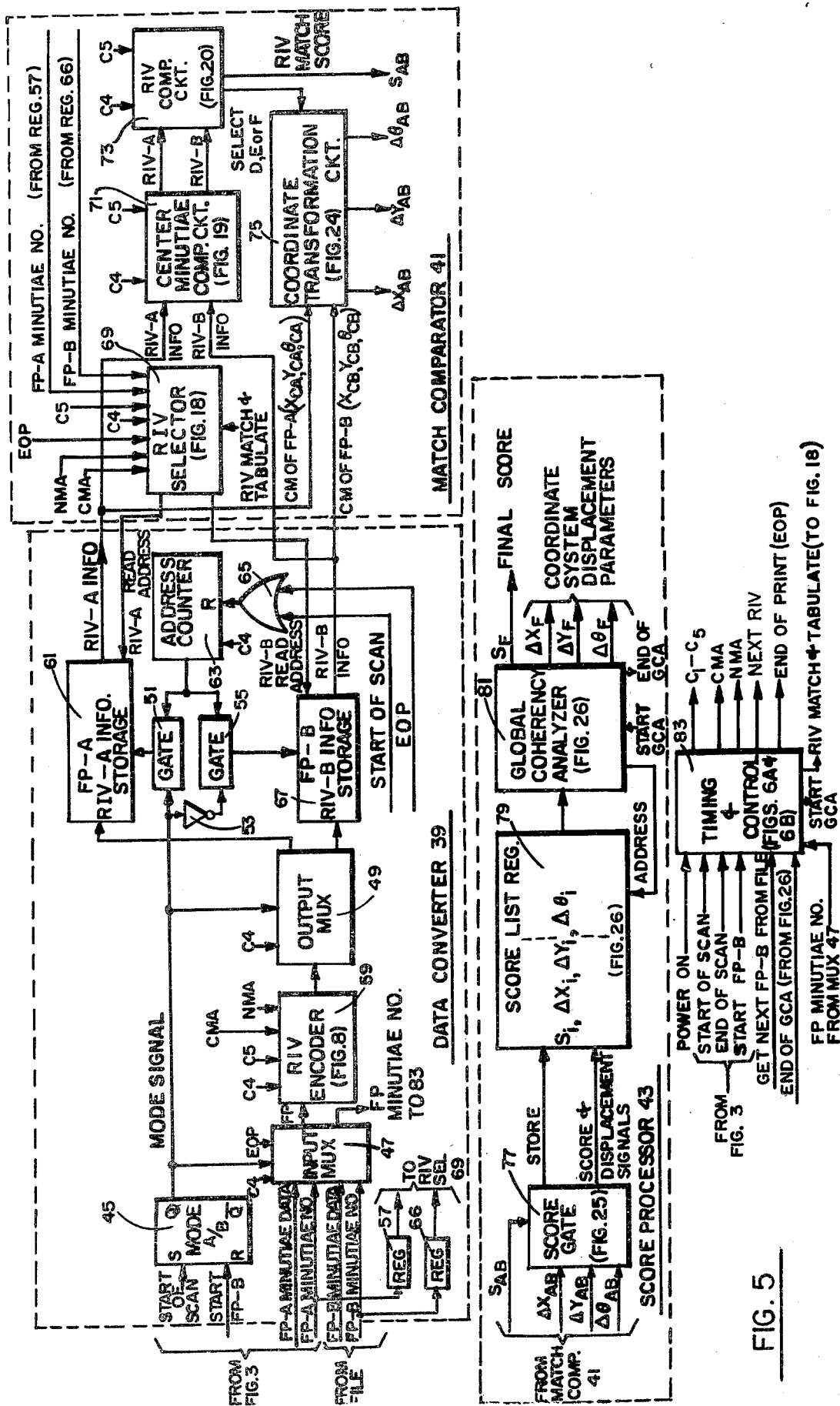
FIG. 5 is a detailed block diagram of a preferred embodiment of the invention.

Referring now to FIG. 5, a more detailed block diagram of a preferred embodiment of the fingerprint minutiae pattern matcher invention is illustrated. As shown in FIG. 5, this fingerprint matcher is basically comprised of a data converter 39, a match comparator 41 and a score processor 43. Basically, the data converter 39 sequentially transforms input minutiae data (in X, Y, $\theta$ format) from an unknown fingerprint A (FP-A) and a known or reference fingerprint B (FP-B) into the relative information vector (RIV) format. The match comparator 41 compares each RIV of the unknown or unidentified fingerprint A with each RIV of the known fingerprint B and generates a match score for each RIV pair comparison to indicate the closeness of match of that RIV pair. The score processor 43 analyzes the set of RIV match scores from a global viewpoint and develops a final score which quantitatively indicates the degree of similarity between the two fingerprints being compared.

The data converter 39 selectively receives the start of scan and start FP-B signals, the FP-A minutiae number and the FP-A minutiae data (in X, Y, $\theta$ format) of input unknown fingerprint A (FP-A) from the modified fingerprint minutiae reader of FIG. 3. The converter 39 also selectively receives the previously read and stored number of minutiae and minutiae data of known fingerprint B (or FP-B minutiae number and FP-B minutiae data). By means of a mode a/B flip flop 45, the FP-A and FP-B minutiae data of input fingerprints A and B (that are to be subsequently compared) are time division multiplexed and RIV encoded before being respectively stored in associated storage circuits.

Initially the data converter 39 receives the start of scan signal which sets the mode A/B flip flop 45 to develop a 1 state mode signal output to enable input and output multiplexers 47 and 49 and gate 51 to operate in a fingerprint A mode of operation. This 1 state mode output is also inverted by inverter 53 to disable gate 55 during the fingerprint A mode of operation.

In the fingerprint A mode of operation, the FP-A minutia number is directly stored in a register 57, while both the FP-A minutiae data (X, Y, $\theta$) and FP-A minutiae number of fingerprint A are passed through the input multiplexer 47 and respectively applied to an RIV encoder 59 and a timing and control circuit 83 (to be explained). The RIV encoder 59 basically performs the function of determining the nearest neighbors for each minutia and their relative locations and orientations with respect to that minutia. Before performing this function, the encoder 59 converts the FP-A minutiae data into a relative information vector (RIV) format or r, $\phi$ and $\Delta\theta$ (as previously illustrated in FIG. 1). The values of r, $\phi$ and $\Delta\theta$ are generated in parallel by the encoder 59 for each minutia with respect to all other minutiae. The RIV encoder 59 also determines the number of minutiae in each RIV (or RIV minutiae number) that it generates. As shown in FIG. 1, the values r and $\phi$ indicate the relative location and the value $\Delta\theta$ indicates the relative orientation of a neighboring minutia with respect to a center minutia. The RIV formatted results use a thresholded value of r for the determination of an RIV neighborhood around each minutia.

From the RIV encoder 59 the thresholded RIV encoded information signals (RIV-A info.), which includes each (center) minutia and its associated RIV as well as the number of minutiae in its associated RIV (or RIV minutiae number), are passed through the output multiplexer 49 to the input of a fingerprint A (FP-A) RIV information storage circuit 61, which may be a random access memory.

The start of scan signal also resets an address counter 63 to a zero count by way of an OR gate 65. Upon being reset the address counter 63 starts counting $C_4$ clocks to sequentially develop output addresses which are applied to gates 51 and 55. Since only gate 51 is enabled during the fingerprint A mode of operation, the addresses from the counter 63 pass through gate 51 to the storage circuit 61. Thus, the FP-A RIV information signals from multiplexer 49 are selectively stored in the addressed locations of the storage circuit 61 during the fingerprint A mode of operation.

After the FP-A minutiae data has been RIV encoded by encoder 59 and stored in circuit 61, the start FP-B signal is received (from FIG. 3). The start FP-B signal resets the mode A/B flip flop 45 to develop a 0 state mode signal output. This 0 state mode signal output of flip flop 45 disables the gate 51, while enabling the multiplexers 47 and 49 to operate in a fingerprint B mode of operation. At the same time the inversion of the 0 state mode signal output of flip flop 45 by the inverter 53 enables the gate 55 to also operate in the fingerprint B mode of operation.

In the fingerprint B mode of operation, the FP-B minutiae number from a previously read file of fingerprints represented by minutiae data is directly stored in a register 66, while both the FP-B minutiae data (X, Y, $\theta$) and FP-B minutiae number are passed through the input multiplexer 47 and respectively applied to the RIV encoder 59 and to the timing and control circuit 83. The encoder 59 converts the X, Y, $\theta$ formatted FP-B minutiae data into thresholded RIV encoded information signals (RIV-B info.), like that in relation to fingerprint A. The RIV-B information signals are then passed through the output multiplexer 49 to the input of a fingerprint B (FP-B) RIV information storage circuit 67 similar to the circuit 61.

An "end of print" (EOP) signal (from FIG. 6A - explained below) is passed through the OR gate 65 to reset the address counter 63 to a zero count. Upon being reset the counter 63 starts counting $C_4$ clocks to again sequentially develop and apply output addresses to the gates 51 and 55. Since only gate 55 is enabled during the fingerprint B mode of operation, the addresses from the counter 63 pass through gate 55 to the storage circuit 67. Thus, the fingerprint B RIV information signals from multiplexer 49 are selectively stored in the addressed locations of the storage circuit 67 during the fingerprint B mode of operation.

After the A and B fingerprints have been converted to an RIV information signal format by the encoder 59 and placed in the storage circuits 61 and 67, all further signal processing of the A and B fingerprints (FP-A and FP-B) by the rest of the matcher system is in the RIV information signal format.

Figure 6A:
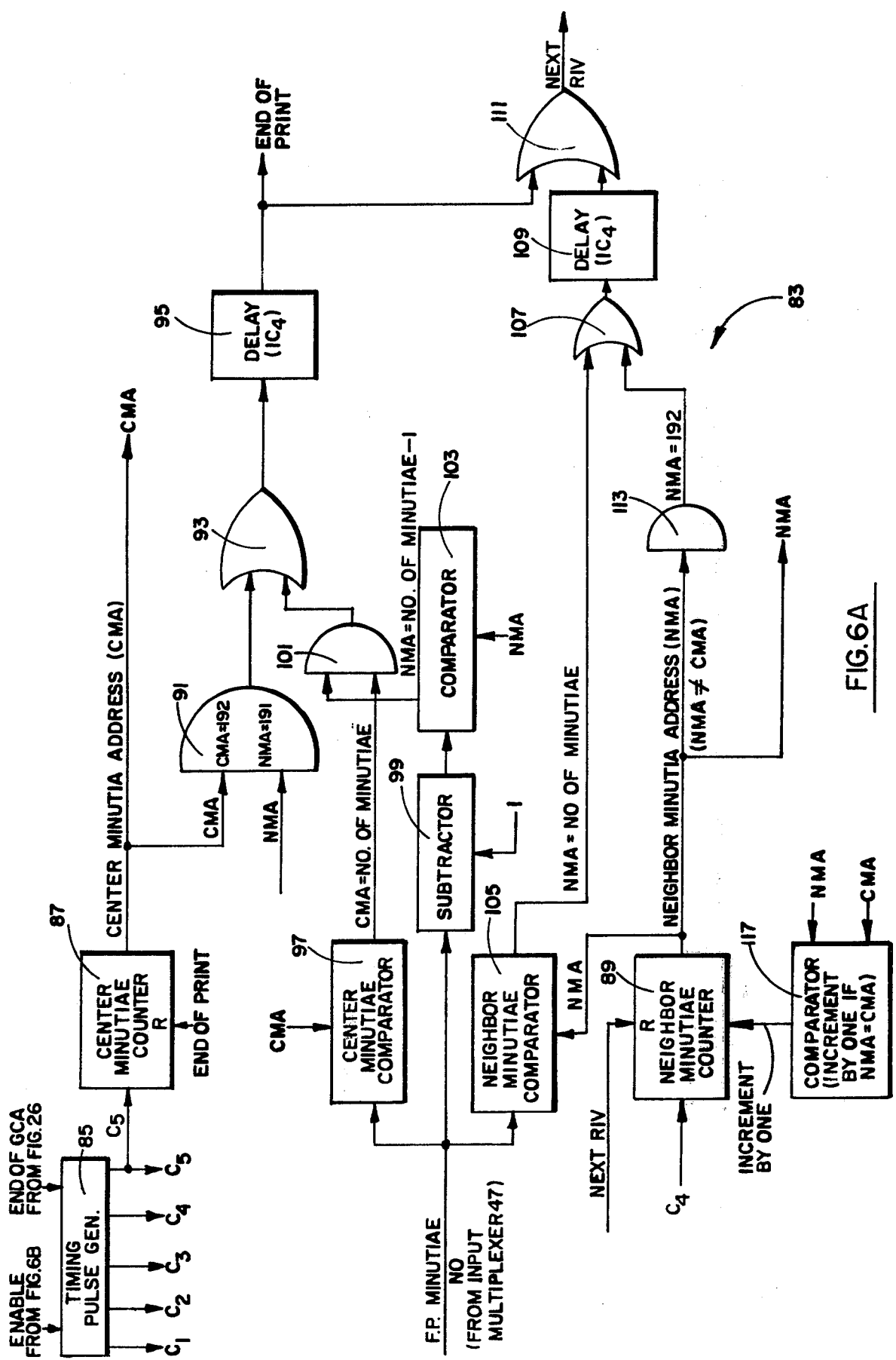
FIG. 6A is a block diagram of a first part of the timing and control circuit of FIG. 5.
Figure 6B:
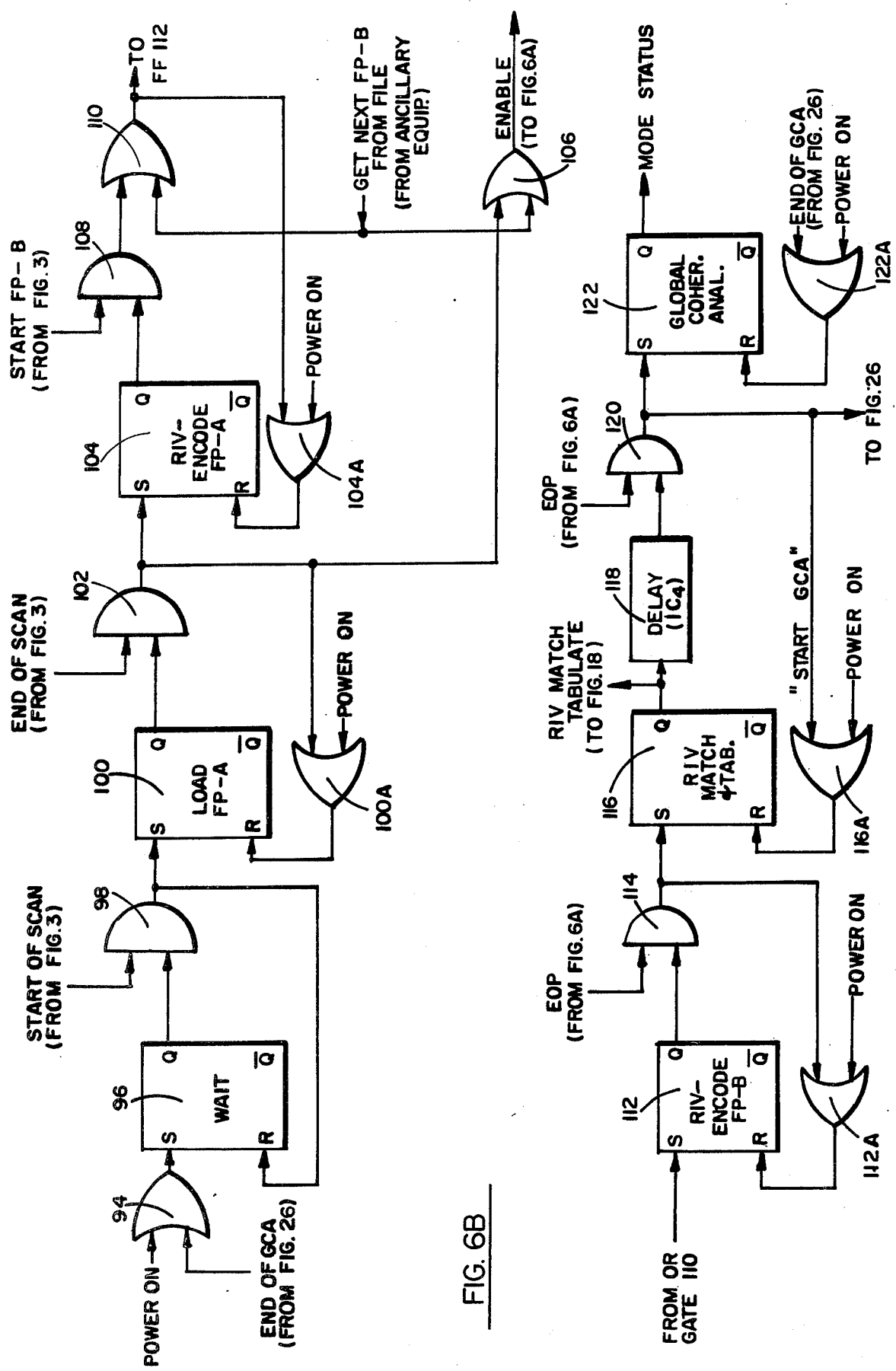
FIG. 6B is a block diagram of a second part of the timing and control circuit of FIG. 5.

In the sequential mode of operation of this preferred embodiment the selection of, a subsequent FP-B from the reference file for a new fingerprint comparison with FP-A must wait until the completion of the entire matching process performed by the system of FIG. 5, and will be further discussed in relation to FIG. 6B.

The next operation is performed by the match comparator 41. Basically, the match comparator 41 selectively compares each RIV of the unidentified or unknown fingerprint A with each RIV of the known reference fingerprint B and generates an RIV match score for each RIV pair comparison. The amplitude of the RIV match score generated at a given time indicates the closeness of the match between the two RIV's being compared at that given time.

The $C_4$ and $C_5$ clocks; the outputs of the registers 57 and 66; and control signals CMA, NMA, EOP and "RIV match and tabulate" (to be explained) are applied to a RIV selector 69 in the match comparator 41. In response to these input signals, the RIV selector 69 respectively supplies RIV-A and RIV-B read addresses to the storage circuits 61 and 67. These read addresses selectively enable the RIV-A and RIV-B information signals to be read out of the storage circuits 61 and 67 and applied to a center minutiae comparison circuit 71. In its addressing sequence, the RIV selector 69 selects the first RIV information signal (first RIV-A and its associated first center minutia and first RIV minutiae number) from fingerprint A and then sequentially selects one at a time all of the RIV information signals (RIV's and their associated center minutiae and associated number of minutiae in the RIV's) from fingerprint B. After the first RIV from fingerprint A has been compared in the match comparator 41 with each of the RIV's of fingerprint B, the second RIV of fingerprint A is compared with each of the RIV's from fingerprint B, and so on. In the manner, all pairs of RIV's between fingerprints A and B are compared.

The match comparator 41 performs two different comparisons on the RIV-A and RIV-B information signals applied to it. A first comparison is performed by the center minutiae comparison circuit 71 on the center minutiae associated with each pair of RIV's. The comparison circuit 71 respectively compares the parameters $(X_c, Y_c, \theta_c)$ of the center minutiae of the two RIV's of fingerprints A and B with each other. The comparison circuit 71 requires that the parameters $X_c$, $Y_c$ and $\theta_c$ of each of the center minutiae of RIV-A and RIV-B satisfy proximity tests before applying those two RIV's to its output for further comparison. More specifically, if the X-coordinate difference, the Y-coordinate difference or the orientation angle $\theta$ difference between the center minutiae of the two RIV's being compared is not sufficiently small, that RIV pair is rejected from further comparison, since preliminary global criteria (based upon the center minutiae) would indicate that the RIV pair if unlikely to match. By means of its above-described addressing sequence, the RIV selector 69 would then select another RIV pair and its associated center minutiae from the storage circuits 61 and 67 for another center minutiae comparison by the circuit 71. When the respective parameter differences ($X_{CA} - Y_{CB}$, $Y_{CA} - Y_{CB}$, $\theta_{CA} - \theta_{CB}$) of the center minutiae of the RIV pair from the A and B fingerprints are all sufficiently small to indicate that a match is likely, that RIV pair (and the number of minutiae in each RIV of that pair) is passed to an RIV comparison circuit 73 for a second comparison.

The comparison circuit 73 compares each neighbor (in RIV format of r, $\phi$ and $\Delta\theta$) of the center minutia of the RIV of fingerprint A with each neighbor of the center minutiae of the RIV of fingerprint B, and computes a separate RIV match score ($S_{AB}$) for each RIV pair from the two fingerprints being compared to indicate the closeness of match for that RIV pair. Basically, this match score is computed from the number of minutiae in RIV-A that find a "mate" in RIV-B comparing the relative coordinates for each minutia in RIV-A with those of each minutia in RIV-B. As a result, each RIV match score is quantitatively related to the probability that the minutiae patterns of an RIV pair from fingerprints A and B were produced by the same finger.

Each center minutia of RIV-A ($X_{CA}$, $Y_{CA}$ and $\theta_{CA}$) and its associated center minutia of RIV-B ($X_{CB}$, $Y_{CB}$ and $\theta_{CB}$) are also applied to a coordinate transformation circuit 75 in the match comparator 41. The coordinate transformation circuit 75 generates the angular displacement of rotation ($\Delta\theta_{AB}$) of the center minutiae of RIV's A and B, as well as, for example, three different sets of coordinate displacements for three different angular rotations of the center minutiae of the RIV pair being compared at that time. In response to each input pair of center minutiae and the 1 state "select D", "select E" or "select F" signal from the comparator circuit 73, the circuit 75 selects one of the exemplary three sets of coordinates as the output coordinate displacements ($\Delta X_{AB}$ and $\Delta Y_{AB}$). The $\Delta X_{AB}$, $\Delta Y_{AB}$ and $\Delta\theta_{AB}$ displacement signals are applied to a score gate 77 in the score processor 43 to indicate how much the coordinates of an RIV of fingerprint A have to be displaced and rotated in relation to the coordinates of an associated RIV of fingerprint B so that the center minutiae and neighboring minutiae of the A and B fingerprints match up. For this operation, $\Delta X$, $\Delta Y$ and $\Delta\theta$ respectively represent the relative horizontal and vertical displacements and angular displacement or rotation of the two coordinate systems of the center minutiae of the A and B fingerprints. The RIV match score $S_{AB}$ from the RIV comparison circuit 73 is also applied to the score gate 77 in the score processor 43.

The score processor 43 analyzes the set of RIV match scores of fingerprints A and B from a global viewpoint, and develops a final score which quantitatively indicates the degree of similarity between those two fingerprints. A sufficiently high RIV match score $S_{AB}$ causes the score gate 77 to generate a "store" signal, which enables the match score $S_{AB}$ and its displacement signals $\Delta X_{AB}$, $\Delta Y_{AB}$ and $\Delta\theta_{AB}$ to be passed out of the score gate 77 and stored in a three-dimensional histogram or score list register 79. The score list register 79 contains the match scores ($S_i$) and displacements ($\Delta X_i$, $\Delta Y_i$, $\Delta\theta_i$) of the two coordinate systems (between the two fingerprints being compared) for each pair of RIV's that satisfy the conditions of the match comparator 41 and score gate 77, where i = from 1 up to 192 RIV pair comparisons.

When all pairs of RIV's of fingerprints A and B have been compared and all of the match scores and position data from the score gate 77 have been entered into the score list 79, the histogram is completed. After the completion of the histogram, a "start GCA" (global coherency analysis) signal enables a global coherency analyzer 81 to start addressing the score list 79 to enable the score list to read out and apply its data contents to the analyzer 81.

The global coherency analyzer 81 performs a three-dimensional histogram in $\Delta X$, $\Delta Y$ and $\Delta\theta$ space in order to locate the densest point in $\Delta X$, $\Delta Y$ and $\Delta\theta$ space represented by the score list 79. The coherency analyzer 81 assures that all of the match scores are added together in such a manner that the coherency of the fingerprint patterns of fingerprints A and B is not destroyed.

The analyzer 81 develops a final score which, as stated previously, quantitatively indicates the degree of similarity between the two fingerprints being compared. This final score is a function of the number of RIV's that matched, how well they matched, and how closely their relative translations and rotations grouped. The analyzer 81 also develops the relative displacement ($\Delta X$, $\Delta Y$, $\Delta\theta$) of the two coordinate systems of the A and B fingerprints for the best match of those prints. At the completion of its analysis, the analyzer 81 generates an "end of GCA" signal.

A timing and control circuit 83 selectively receives the following input control signals: power on (to be explained), start of scan (FIG. 3), end of scan (FIG. 3), start FP-B (FIG. 3), get next FP-B from file (to be explained), end of GCA (global coherency analysis) (FIG. 27), and the FP-minutiae number from input multiplexer 47. In response to these input control signals, the timing and control circuit 83 provides $C_1$, $C_2$, $C_3$, $C_4$ and $C_5$ clock pulses at appropriately preselected frequencies, as well as center minutia address (CMA), neighbor minutia address (NMA), new RIV, End of Print (EOP) and Start GCA control signals, to control the timing operations for the system of FIG. 5. The frequencies of $C_1$, $C_2$, $C_3$, $C_4$ and $C_5$ may be preselected such that $C_1 = 2C_2 = 16C_3 = 3072 C_4 = 589,824 C_5$.

The operation of the system of FIG. 5 will now be explained in further detail by referring to the remaining drawings.

FIGS. 6A and 6B, in combination, provide a block diagram of the timing and control circuit 83 of FIG. 5. FIG. 6A will be discussed first. In FIG. 6A a timing pulse generator 85, which can comprise a clock generator and countdown circuits (not shown), develops the $C_1$, $C_2$, $C_3$, $C_4$ and $C_5$ clock pulses. An "enable" signal (FIG. 6B) enables the generator 85 to start developing these $C_1 \ldots C_5$ clock pulses. This "enable" signal is generated at the time of the "end of scan" signal (FIG. 3), which occurs after the unknown FP-A has been read, and at the time that a "get next FP-B from file" signal (FIG. 6B) may be generated. An "end of GCA" signal (FIG. 27) disables the generator 85 to prevent it from developing the $C_1 \ldots C_5$ clock pulses, unless a subsequent "enable" signal is received.

The $C_5$ clock pulses are counted by a center minutiae counter 87 to develop an 8-bit wide center minutia address (CMA). The $C_4$ clock pulses, which have a frequency 192 times greater than the $C_5$ clock pulses, are counted by a neighbor minutiae counter 89 to develop an 8-bit wide neighbor minutiae address (NMA).

The relationship of the center minutia address (CMA) to the neighbor minutia address (NMA) for a fingerprint containing 192 or more minutiae is more clearly illustrated in FIG. 7. In this illustration the counter 87, which is incremented by the $C_5$ clock, holds each count for 191 $C_4$ clock pulse periods. This is due to the fact (to be explained later) that the NMA is not allowed to remain equal to the CMA, but is immediately incremented by one as soon as NMA = CMA. Therefore, as indicated in FIG. 7, during each CMA count of the counter 87, the counter 89 effectively skips the NMA count that is equal to that CMA count since the RIV of a center minutia does not include that center minutia. Thus, during the period of time that the counter 87 is developing a CMA = 1 (or 00000001), the counter 89 effectively skips its count of 1 and develops NMA's of 2 through 192 (or 00000010 through 11000000). Similarly, during the period of time that the counter 87 is developing a CMA = 2, the counter 89 develops an NMA = 1, effectively skips a count of 2, and develops NMA's of 3 through 192. This operation continues as the counter 87 develops CMA's of 1 through 192. During the period of time that the counter 87 is developing a CMA = 192, the counter 89 develops NMA's of 1 through 191.

It should again be stressed that, while FIG. 7 illustrates the relationship of CMA to NMA for a fingerprint containing 192 or more minutiae, the number of minutiae in a fingerprint (FP minutiae number) can be less than 192, as well as 192 or more.

Referring back to FIG. 6A, an RIV is developed during each count or CMA of the counter 87. After all of the RIV's in a fingerprint are developed, the rising edge of an "end of print" (EOP) signal is used to reset the counter 87 for the next fingerprint. This "end of print" signal, which is generated after all of the minutiae in an input fingerprint have been processed, is generated under either of two operational conditions, namely when a fingerprint contains either at least 192 minutiae or less than 192 minutiae. These two operational conditions essentially require different circuits in FIG. 6A to initiate the development of the "end of print" signal and, hence, will be separately discussed.

For the development of the "end of print" signal when a fingerprint contains 192 or more minutiae, the CMA and NMA counts are both applied to a 16-input AND gate 91. The AND gate 91 has its inputs selectively inverted and non-inverted such that it develops and applies a 1 state signal through an OR gate 93 to a delay circuit 95 if CMA = 192 and NMA = 191. The delay circuit 95 delays this 1 state signal for one $C_4$ clock pulse period to enable the NMA of 191, that is developed during the period of time that CMA = 192, to be completed. The output of the delay circuit 95 is the "end of print" signal.

It should be noted at this time that an upper minutiae limit of 192 for a fingerprint was arbitrarily chosen for the purpose of this description. It should be understood that the system of this invention could be implemented with any desired upper minutiae limit for a fingerprint.

When the number of minutiae in the fingerprint (FP minutiae number) is less than 192, additional circuits are required to develop the "end of print" signal. For this operation the binary number of minutiae in the fingerprint being processed at that time is applied from the input multiplexer 47 (FIG. 5) to a center minutia comparator 97 and a subtractor 99. The comparator 97 develops and applies a 1 state signal to a first input of an AND gate 101, if the count of counter 87 (CMA) = the FP minutiae number of the fingerprint being processed. The subtractor 99 subtracts one (1) from the FP minutiae number in the fingerprint and applies the difference to a comparator 103. The NMA count from the counter 89 is also applied to the comparator 103 for comparison with this difference (FP minutiae number minus one). When NMA = FP minutiae number minus one, the comparator 103 develops and applies a 1 state to a second input of the AND gate 101. The AND gate 101, having been previously enabled by the output of the comparator 97, passes the output of the comparator 103 through the OR gate 93 to the delay circuit 95. After one $C_4$ clock pulse period an "end of print" (EOP) signal is produced at the output of the delay circuit 95. Thus, an "end of print" signal is derived from the AND gate 91 when there are 192 or more minutiae in the fingerprint being processed and from the AND gate 101 when there are less than 192 minutia in the fingerprint. Note than an "end of print" signal is always developed one $C_4$ clock pulse period after the start of the time when NMA = CMA − 1.

It should be recalled that an RIV is developed during each CMA count of the counter 87. At the completion of each RIV, a "next RIV" signal is generated to reset the counter 89 for the next RIV. This "next RIV" signal is generated one $C_4$ clock pulse period after NMA = the FP minutiae number or 192, whichever is less, or generated at the time the "end of print" signal is developed. Each of these three operational conditions will be separately explained.

In the generation of a "next RIV" signal one $C_4$ clock pulse period after NMA = the FP minutiae number, the NMA count from the counter 89 is applied to a neighbor minutiae comparator 105. The comparator 105 develops and applies a 1 state signal through an OR gate 107 to a delay circuit 109. The delay circuit 109 delays this 1 state signal for one $C_4$ clock pulse period to complete the NMA count that is equal to the FP minutiae number in the fingerprint. The output of the delay circuit 109 is applied through an OR gate 111 as the "next RIV" signal.

In the development of a "next RIV" signal when a fingerprint contains 192 or more minutiae, an upper minutiae limit of 192 for the NMA is arbitrarily chosen, as discussed above. In this case the NMA count is applied to an 8-input AND gate 113, which has all its inputs inverted except its two most significant bit inputs. When NMA = 192, the AND gate 113 develops and applies a 1 state signal through the OR gate 107 to the delay circuit 109. After the NMA count of 192 is completed, the delay circuit 109 applies a 1 state signal through the OR gate 111 as a "next RIV" signal.

At the completion of a fingerprint, the "end of print" signal is also applied through the OR gate 111 as the "next RIV" signal for the first RIV in the following fingerprint.

It can therefore be seen that: when there are less than 192 minutiae in the fingerprint being processed, a "next RIV" signal is originally derived from the comparator 105; when there are 192 or more minutiae in the fingerprint being processed, a "next RIV" signal is originally derived from the AND gate 113; and the "next RIV" signal for the first RIV in the following fingerprint is directly derived from the delay circuit 95. The rising edge of each "next RIV" signal resets the counter 89 to a zero count, so that the next RIV can be developed by the system of FIG. 5. The timing of "next RIV" signals is illustrated in FIG. 7 for the start of each RIV in a fingerprint containing 192 minutiae. See, particularly, the "next RIV" signals in waveform 115 in FIG. 7.

As stated before, an RIV is generated for each minutia of a fingerprint and is essentially a detailed description of the immediate neighborhood of that minutia. Furthermore, the minutia for which an RIV is generated is the center minutia for that RIV. Therefore, the RIV of a center minutia does not include that center minutia. To prevent the center minutia of an RIV from being included in its RIV, a comparator 117 is included in the timing and control circuit 83. Basically the comparator 117 compares the center minutia address (CMA) with the neighbor minutia address (NMA). As soon as NMA = CMA, the comparator 117 immediately develops an "increment-by-one" signal which is applied to the neighbor minutiae counter 89 to cause the counter 89 to increment its count by one. In this manner, the neighbor minutia address is never allowed to be equal to the center minutia address. Consequently, the RIV of a minutia cannot include that minutia.

Referring now to FIG. 6B, the second part of the timing and control circuit 83 of FIG. 5 will be discussed. When the fingerprint minutiae pattern matcher system is first put into operation (not shown but obvious to those skilled in the art), a "power on" signal is applied through OR gate 94 to set a "wait" flip flop 96. In addition, this "power on" signal initiates the proper timing sequence of the timing and control circuit 83 of FIGS. 6A and 6B by resetting flip flops 100, 104, 112, 116 and 122 by way of OR gates 100A, 104A, 112A, 116A and 122A, respectively. The output of the "wait" flip flop 96 enables the lower input of AND gate 98. The flip flop 96 is in a "wait" mode of operation until a new FP-A is initiated by the "start of scan" signal from the output of AND gate 19 (FIG. 3), as described in FIG. 3. It will be recalled that the "start of scan" signal initiates the detection and storage of the FP-A minutiae into the RAM 27 (FIG. 3). This "start of scan" signal is applied through the enabled AND gate 98 to set "load FP-A" flip flop 100 and to reset flip flop 96 to terminate the "wait" mode of operation.

When set, the output of the "load FP-A" flip flop 100 enables the lower input of an AND gate 102. The flip flop 100 thus is in a "load FP-A" mode of operation during the period of time when all of the minutiae in FP-A are detected and stored into the RAM 27 (FIG. 3). It will be recalled that the "end of scan" signal occurs at the end of this period of time, when all of the minutiae in FP-A have been stored in the RAM 27. It will be further recalled that the "end of scan" signal from the output of AND gate 21 (FIG. 3) initiates the readout of RAM 27 (FIG. 3) into the data converter 39 (FIG. 5) for the RIV encoding of FP-A. This "end of scan" signal is applied through the enabled AND gate 102 to set "RIV-encode FP-A" flip flop 104 and to reset the flip flop 100 by way of the OR gate 100A in order to terminate the "load FP-A" mode of operation. In addition, the "end of scan" signal that is applied through the enabled AND gate 102 is passed through an OR gate 106 as an "enable" signal to enable the timing pulse generator 85 (FIG. 6A) to generate the $C_1 \ldots C_5$ clock pulses.

When set, the output of the "RIV-encode FP-A" flip flop 104 enables the lower input of an AND gate 108. The flip flop 104 is thus in an "RIV-encode FP-A" mode of operation during the period of time when all of the FP-A minutiae data contents of the RAM 27 (FIG. 3) are being read out for RIV encoding. It will be recalled that when the contents of the RAM 27 have been read out, the comparator 37 (FIG. 3) initiates the generation of the "start FP-B" signal. It will also be recalled that this "start FP-B" signal enables FP-B minutiae data (and information) to be read out of the B fingerprint file (not shown) and be RIV-encoded by the data converter 39 (FIG. 5). The "start FP-B" signal is also serially applied through enabled AND gate 108 and an OR gate 110 to set "RIV-encode FP-B" flip flop 112 and to reset the flip flop 104 by way of the OR gate 104A in order to terminate the "RIV-encode FP-B" mode of operation.

When set, the output of the "RIV-encode FP-B" flip flop 112 enables the lower input of an AND gate 114. The flip flop 112 is thus in an "RIV-encode FP-B" mode of operation during the period of time when all of FP-B minutiae data of a fingerprint B are being RIV-encoded by the data converter 39 (FIG. 5). It will be recalled that, at the completion of the RIV-encoding of FP-B, an end of print (EOP) signal is developed at the output of delay circuit 95 (FIG. 6A). This EOP signal is applied to AND gates 114 and 120. However, only AND gate 114 is enabled during the time of this EOP signal. This EOP signal is applied through the enabled AND gate 114 to set "RIV match and tabulate" flip flop 116 and to reset flip flop 112 by way of the OR gate 112A in order to terminate the "RIV encode FP-B" mode of operation.

When set, the output of the "RIV match and tabulate" flip flop 116 becomes an "RIV match and tabulate" signal which is applied to the RIV selector 69 (FIG. 18) to enable the match comparator 41 (FIG. 5) to match and tabulate all of RIV's A and B in fingerprints A and B. This "RIV match and tabulate" signal is also passed through a delay circuit 118 to enable the lower input of the AND gate 120. The delay of the delay circuit 118 can be any suitable delay (for example, one $C_4$ clock period) sufficient to inhibit the lower input of the AND gate 120 until after the termination of the EOP signal that resulted from the completion of the RIV encoding of FP-B. The flip flop 116 thus is in an "RIV match and tabulate" mode of operation during the period of time when all of the RIV's A and B in fingerprints A and B are being matched and tabulated.

The next EOP pulse (FIG. 6A) that is generated is applied through the enabled AND gate 120 as a "start GCA" (global coherency analysis) pulse. This "start GCA" pulse is applied to the global coherency analyzer 81 (FIG. 26) to begin the global coherency analysis of the score and displacement signals stored in the store list register 79. By the time that this next EOP pulse occurs all of the RIV's A and B in fingerprints A and B have been matched. As a result, this "start GCA" pulse is used to reset the flip flop 116 by way of the OR gate 116A in order to terminate the "RIV match and tabulate" mode of operation.

When the circuit 81 has completed its analysis it applies an "end of GCA" signal through the OR gate 122A to reset the flip flop 122 to terminate the global coherency analysis mode of operation of the flip flop 122. This "end of GCA" signal is also applied through the OR gate 94 to set the flip flop 96 and put the flip flop 96 back into the "wait" mode of operation. Furthermore, this "end of GCA" signal is used to disable the timing pulse generator 85 (FIG. 6A) to prevent it from developing the $C_1 \ldots C_5$ clock pulses.

At the discretion of a higher order system (not shown) of which this fingerprint minutiae pattern matcher is a part, a "get next FP-B from file" signal will be generated. This "get next FP-B from file" signal is applied through OR gate 106 as an "enable" signal to enable the generator 85 (FIG. 6A) to start developing $C_1 \ldots C_5$ clock pulses again. In addition, this "get next FP-B from file" signal is applied through the OR gate 110 to set the flip flop 112 back into the "RIV-encode FP-B" mode of operation. Flip flops 100 and 104 do not need to be set since the FP-A has already been loaded and RIV-encoded. This operation therefore bypasses a new FP-A and selects another FP-B for comparison. The subsequent operation is the same as that previously described.

The RIV encoder 59 of FIG. 5 will now be explained more fully by referring to FIG. 8. For proper timing purposes, the X, Y, $\theta$ formatted FP minutiae data (from the multiplexer 47 in FIG. 5) of each of the minutiae in the fingerprint being processed at a given time is selectively applied to an input buffer 121 before the FP minutiae data is stored in a random access memory (RAM) 123 which, for example, is illustrated as being 192 by 24 bits in storage capacity. The RAM 123 stores 192 minutiae, with each minutia being 24 bits wide, and each of the X, Y and $\theta$ parameters being 8 bits or one byte wide.

The CMA and NMA counts from the timing and control circuit 83 (FIG. 5 or 6A) are utilized by the RAM 123 in the generation of RIV's. At each CMA time, the minutiae stored at the associated CMA location of the RAM 123 is read out of the RAM 123 and stored in a center minutia register 125. The register 125 accepts each addressed minutia as the center minutia CM ($X_c$, $Y_c$, $\theta_c$) of an associated RIV cluster to be determined. A "next RIV" pulse (from FIG. 6A) is delayed 1 $C_1$ clock period by a delay circuit 126. This delayed "next RIV" signal enables the center minutia CM in the register 125 to be also stored in a center minutia (CM) and neighboring register 127. The register 127 also has storage areas to store nine other signals $R_1$-$R_9$, which may or may not be neighboring minutiae of the center minutia CM. Each of these "R" storage areas is comprised of r, $\phi$ and $\Delta\theta$ portions. The delayed "next RIV" pulse from the delay circuit 126 also enables a radial order sorter 129 to initialize all of the r storage portions ($r_1$-$r_9$) in the register 127 so that all of the $r_1$-$r_9$ values are equal to 31, for example. In addition, the parameters $X_c$, $Y_c$ and $\theta_c$ that are stored in the register 125 are respectively applied to subtractors 131, 133 and 135.

During each time that the center minutia parameters $X_c$, $Y_c$ and $\theta_c$ are being respectively applied from the register 125 to the subtractors 131, 133 and 135, the $X_i$, $Y_i$ and $\theta_i$ parameters of all of the minutiae stored in the RAM 123, except the center minutia, are sequentially read out of the NMA locations of the RAM 123 at the NMA times.

In the above case, as well as in the following discussion, let i = 0, 1, 2 . . . the lesser of 192 or the fingerprint (FP) minutiae number of the fingerprint being processed at a given time.

The center minutia parameters $X_c$, $Y_c$, $\theta_c$ are respectively subtracted from these $X_i$, $Y_i$ and $O_i$ parameters (for example, $X_1$, $Y_1$, $\theta_1$; . . .; $X_{192}$, $Y_{192}$, $\theta_{192}$, excluding those of the center minutia) in the subtractors 131, 133 and 135. For each center minutia that is selected at any given time, all other minutiae in the RAM 123 are computed with respect to that center minutia to develop the horizontal displacements $\Delta X_i$, the vertical displacements $\Delta Y_i$, and the angular displacements $\Delta\theta_i$. Here, $\Delta X_i = X_i - X_c$, $\Delta Y_i = Y_i - Y_c$ and $\Delta\theta_i = \theta_i - \theta_c$.

The displacements $\Delta X_i$ and $\Delta Y_i$ are applied to an r generator 137 to compute the radial distance (r) between the center minutia and each neighboring minutia. The generator 137 is implemented according to the equation $r_i = \sqrt{\Delta X_i^2 + \Delta Y_i^2}$ to compute the radial distances $r_i$.

The displacements $\Delta X_i$ and $\Delta Y_i$, as well as $\theta_c$, are applied to a $\phi$ generator 139 to compute the angle $\phi_i$ between the tail or orientation of the center minutia and each of the neighboring minutiae of that center minutia. The generator 139 is implemented according to the equation $\theta_i = \tan^{-1}(\Delta Y_i/\Delta X_i) - \theta_c$ to compute the angles $\theta_i$.

The number of a center minutia's neighbors included in its RIV can be limited by either a maximum radial distance $R_T$ or an upper bound $N_{max}$, whichever is more restrictive. For the sake of this discussion a maximum radial distance $R_T$ has been selected in FIG. 8 to limit the number of neighboring minutiae associated with a center minutia. As a result, each of the radial distances $r_i$ (from r generator 137) of the neighboring minutiae from the center minutia is sequentially applied to a maximum neighborhood comparator 141 where it is internally compared with a maximum radial distance threshold $R_T$. The maximum neighborhood comparator 141 performs the function of determining which neighboring minutiae lie within the maximum radial distance $R_T$ of a center minutia. For purposes of the following discussion, let the value of the maximum radial distance threshold $R_T$ be equal to 30. Each of the radial distances $r_i$, which does not exceed the threshold $R_T$ of 30, will cause the comparator 141 to develop a pulse 143 to enable the register 127 to simultaneously store the parameters $r_i$, $\phi_i$, $\Delta\theta_i$ of the new neighboring minutia ($R_9$) associated with that radial distance $r_i$. Any previously stored neighboring minutiae are contained in $R_1$-$R_8$. As discussed before, the parameters or values $r_i$, $\phi_i$, $\Delta\theta_i$ of a neighboring minutia R are specifically derived from the generators 137 and 139 and subtractor 135, respectively. These values of r, $\phi$ and $\Delta\theta$ are generated sequentially as shown for each center minutia with respect to all other minutiae. The values $r_i$ and $\theta_i$ define the position of the nearby minutiae relative to the center minutia, while the values $\Delta\theta_i$ define the directions of the nearby minutiae relative to the center minutia.

The pulse 143 from the comparator 141 also enables the radial order sorter 129 to selectively index the signals $R_1$-$R_9$ from the register 127, selectively sort the new neighboring minutia $R_9$ among the previously sorted and stored signals $R_1$-$R_8$ according to its relative distance from the center minutia CM ($X_c$, $Y_c$, $\theta_c$), and selectively restore all of these nine signals back into the register 127 according to their relative radial distances from the center minutia CM. Since each of the $r_1$-$r_9$ values of the signals $R_1$-$R_9$ was initialized to a value of 31, the first new neighboring minutia, which has an r value of 30 or less, will be positioned in the $R_1$ location. In a like manner, all subsequent neighboring minutiae will correspondingly displace, according to their respective radial distances, the R's which had their r values initialized to 31.

Within each CMA period, all of the $X_i$, $Y_i$, $\theta_i$ minutiae, except the associated center minutia, are computed against the associated center minutia $X_c$, $Y_c$, $\theta_c$ to determine the relative positions (in $r_i$, $\phi_i$, $\Delta\theta_i$ format) of the neighboring minutiae with respect to that center minutia. By the completion of each CMA period, the radial order sorter 129 has determined the closest radially-sorted, neighboring minutiae in $r_i$, $\phi_i$, $\Delta\theta_i$ format for a center minutia in the fingerprint being processed.

The number of neighboring minutiae of a center minutia included within the radial distance threshold $R_T$ can vary from 0 on up. However, as discussed above, the register 127 is arbitrarily implemented to store no more than 9 neighboring minutiae as R signals. Only those R signals in the register 127, which have r values of 30 or less, are the neighboring, radially sorted minutiae in $r_i$, $\phi_i$, $\Delta\theta_i$ format which ultimately form the RIV neighborhood of the associated center minutia that is also stored in the register 127 at that time.

Since a new $R_9$ is developed at the time of each new pulse 143 (and subsequently radially sorted), $R_9$ may not necessarily be the ninth closest neighboring minutia to the center minutia CM. For example, $R_9$ could still be one of the previously initialized R signals having an r value equal to 31. For this reason, only the center minutia CM and the eight signals $R_1$-$R_8$ are applied to an output circuit 145 for further processing. It should be noted that CM and $R_1$-$R_8$ are applied to the output circuit 145 at the time of the "next RIV" pulse. This timing arrangement enables the CM and $R_1$-$R_8$ data to be accessed from the register 127 before the delayed "next RIV" pulse (from delay circuit 126) enables a new CM and initialized values of $r_1$-$r_9$ to be stored in the register 127.

The output circuit 145 internally thresholds each of the r values of the signals $R_1$-$R_8$ against the preselected threshold value of 30. Thus, only those signals of $R_1$-$R_8$ whose radial values r passed the threshold test of the comparator 141 (i.e., $r_i = 30$ or less) will be developed by the output circuit 145 as the closest neighboring minutiae for inclusion within the RIV neighborhood of the associated center minutia CM. The center minutia CM and RIV of that CM are passed to the output of the output circuit 145.

It can therefore be seen that an RIV of from 0 to 8 of the closest or neighboring minutiae in r, $\phi$, $\Delta\theta$ format can be developed by the output circuit 145. For example, if the r values of $R_1$-$R_8$ are all 31, all 30 or less, or mixed between 31 and 30 or less, there would be 0, 8 or between 1-7 neighboring minutiae, respectively, in the RIV. Because the number of minutiae in an RIV can vary from 0 to 8, means is included within the output circuit 145 to determine the number of minutiae in each RIV (RIV minutiae number) being developed by the RIV encoder 59.

A different RIV is generated during each CMA count or period. Therefore, the start of a CMA period indicates the start of a new center minutia for a new RIV and also indicates the end of the previous RIV. After each RIV is completed, that RIV and its associated center minutia, as well as the number of minutiae in that RIV, are time division multiplexed by the output multiplexer 49 (FIG. 5) and stored in the associated one of the RIV storage circuits 61 and 67 (FIG. 5).

To further aid in the understanding of how RIV's are derived, FIGS. 9, 10, 11 and 12 will now be discussed. For the limited purpose of this discussion assume that a modified fingerprint minutiae reader, such as described in FIG. 3, has detected only eleven minutiae, as illustrated in FIG. 9, during its raster pattern scan of a fingerprint. The numbers 1-11 indicate the order in which the eleven minutiae were detected, the dots inside the circles indicate the minutiae, and the tails from the circles indicate the angular orientations of the minutiae.

It will be recalled that an RIV is calculated for every minutia of a fingerprint and that the number of a center minutia's neighbors included in the RIV of that center minutia is limited by the maximum radial distance $R_T$. As indicated before, the maximum neighborhood comparator 141 (FIG. 8) performs the function of determining the neighboring minutiae that lie within the maximum radial distance $R_T$ of each of the minutiae illustrated in FIG. 9.

FIG. 10 illustrates the circular area encompassing the RIV of a center minutia for a maximum radial distance $R_T$. Any minutiae that lie within the circumference of the outer circle in FIG. 10 form the RIV neighborhood for the center minutia. Conceptually, when the long axis $R_T$ of FIG. 10 is sequentially overlaid along the axis (tail) of, for example, each of the minutiae 1-8, the RIV neighborhoods for minutiae 1-8 are obtained, as illustrated in FIG. 11. In particular, FIG. 11 illustrates the RIV neighborhoods for the minutiae 1-8, with each of minutiae 1-8 being the center minutia of its own RIV neighborhood and being oriented in standard rule location along the long axis of FIG. 10. In this manner, the associated neighboring minutiae 1-11 that are contained within the circumference of the outer circle of FIG. 10 form the RIV for that associated center minutiae. More specifically, the RIV (relative information vector) for minutia 1 includes minutia 3; the RIV for minutia 2 includes minutia 4; the RIV for minutia 3 includes minutiae 1 and 7; the RIV for minutia 4 includes minutiae 2, 6 and 8; the RIV for minutia 5 includes minutiae 6 and 9, the RIV for minutia 6 includes minutiae 4, 5, 9 and 11; the RIV for minutia 7 includes minutiae 3, 8 and 10; and the RIV for minutia 8 includes minutiae 4, 7, 10 and 11. Therefore, each RIV neighborhood is an information vector or descriptor of the neighborhood for the associated one of the minutiae 1-8. One reason that an RIV is obtained for each of the minutiae of a fingerprint instead of for only one minutia, is that it cannot be determined which minutiae may be missing or whether some "minutiae" may be false.

The radial order sorter 129 (FIG. 8) performs the function of indexing the neighboring minutiae of each RIV in FIG. 11 in the order of increasing radial distance from the associated center minutia. A radially-ordered sorted example of the RIV for minutia 4 of FIG. 11 is illustrated in FIG. 12.

Figure 8:
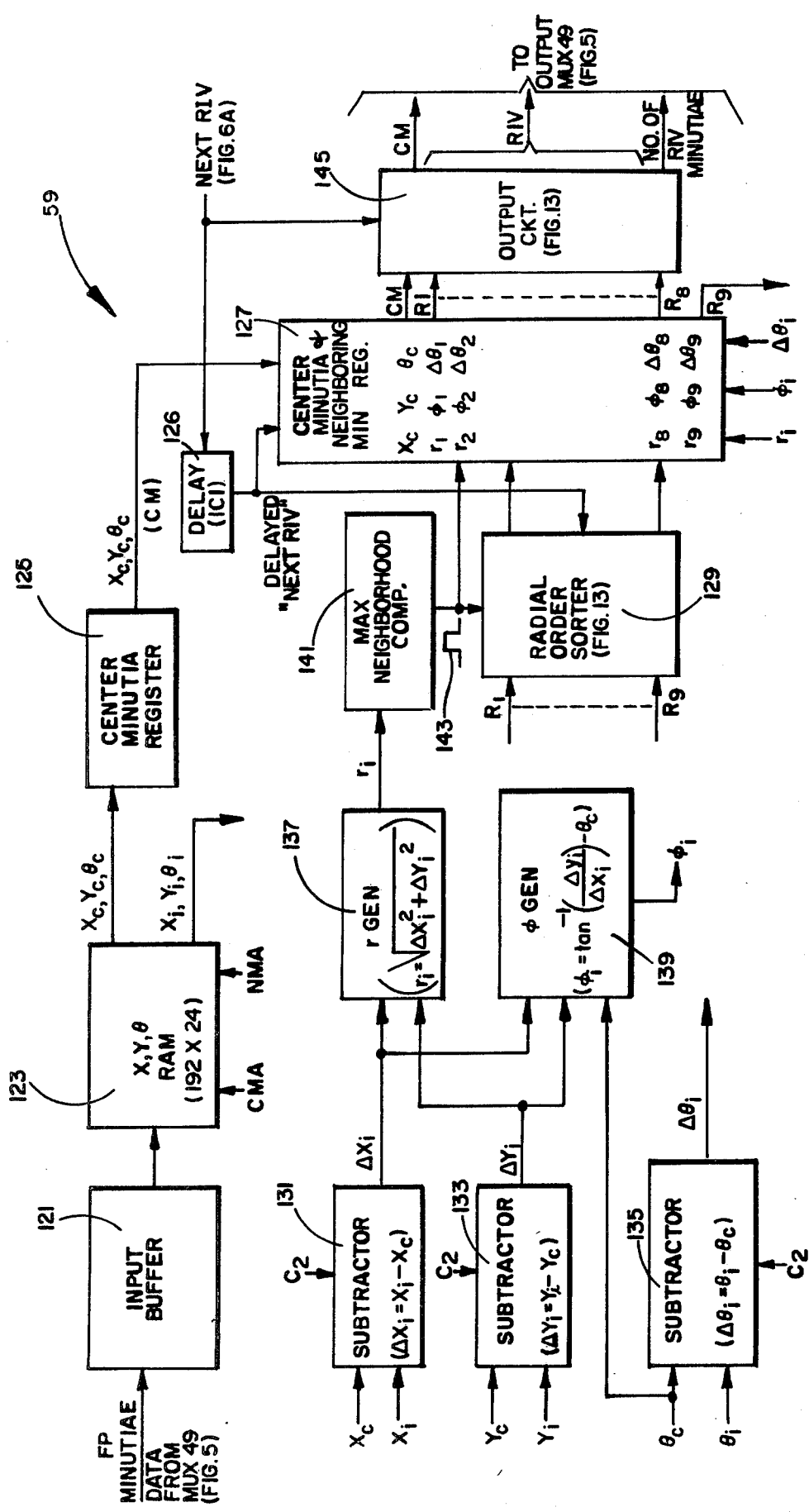
FIG. 8 is a block diagram of the RIV encoder of FIG. 5.

Referring now to FIG. 13, a simplified block diagram of the radial order sorter 129, center minutia and neighborhood minutiae register 127 and output circuit 145 of FIG. 8 is illustrated. The radial order sorter 129 is comprised of a gating circuit 151 and a position determining circuit 153, while the output circuit 145 is comprised of a threshold circuit 155 and a number determining circuit 157.

As previously discussed, at the time of each delayed "next RIV" pulse (from delay 126, FIG. 8), a different center minutia CM is loaded into the register 127, while all of the r values in the signals $R_1$-$R_9$ in the register 127 are initialized to values of 31 by way of the gating circuit 151. From that time until the end of a CMA period, neighboring minutiae having r values that meet the threshold test of comparator 141 (FIG. 8) are sequentially loaded into the register 127. After a new neighboring minutia R₉ has been stored in the register 127, the position determining circuit 153 sequentially accesses and compares $R_9$ with $R_8$, $R_8$ with $R_7$, ..., $R_2$ with $R_1$, and sequentially re-stores these pairs of R signals back into the register 127. Each compared pair of R signals is radially sorted by the circuit 153 before being applied through the gating circuit 151 and re-stored back into the register 127.

The center minutia CM and $R_1$-$R_8$ signals, which are stored in the register 127, are applied to the input of the threshold circuit 155 in the output circuit 145. However, they are not processed by the threshold circuit 155 before the "next RIV" signal (FIG. 6A) occurs. The "next RIV" signal which is generated after all of the neighboring minutiae in an RIV have been detected, enables the threshold circuit 155 to receive the final $R_1$-$R_8$ signals from the register 127. Since some of the signals $R_1$-$R_8$ may not be neighboring minutiae of a center minutia, but rather signals initially initialized to 31, the threshold circuit 155 thresholds each of the r values of the signals $R_1$-$R_8$ with a threshold signal equal to 30. This threshold circuit 155 therefore blocks any R signal whose r value was initially initialized to 31. The remaining ones of the $R_1$-$R_8$ signals which pass this threshold test comprise the neighboring minutiae in the RIV of the center minutia CM. This RIV and its associated center minutia CM are applied to the output of the threshold circuit 155.

The threshold circuit 155 also passes signals, developed from this thresholding operation, to the number determining circuit 157 to enable the circuit 157 to develop a signal indicative of the number of minutiae in the RIV (RIV minutiae number). The RIV and its associated center minutia CM, as well as the RIV minutiae number, are parallel-applied from the output circuit 145 to the output multiplexer 49 (FIG. 5).

Figure 14:
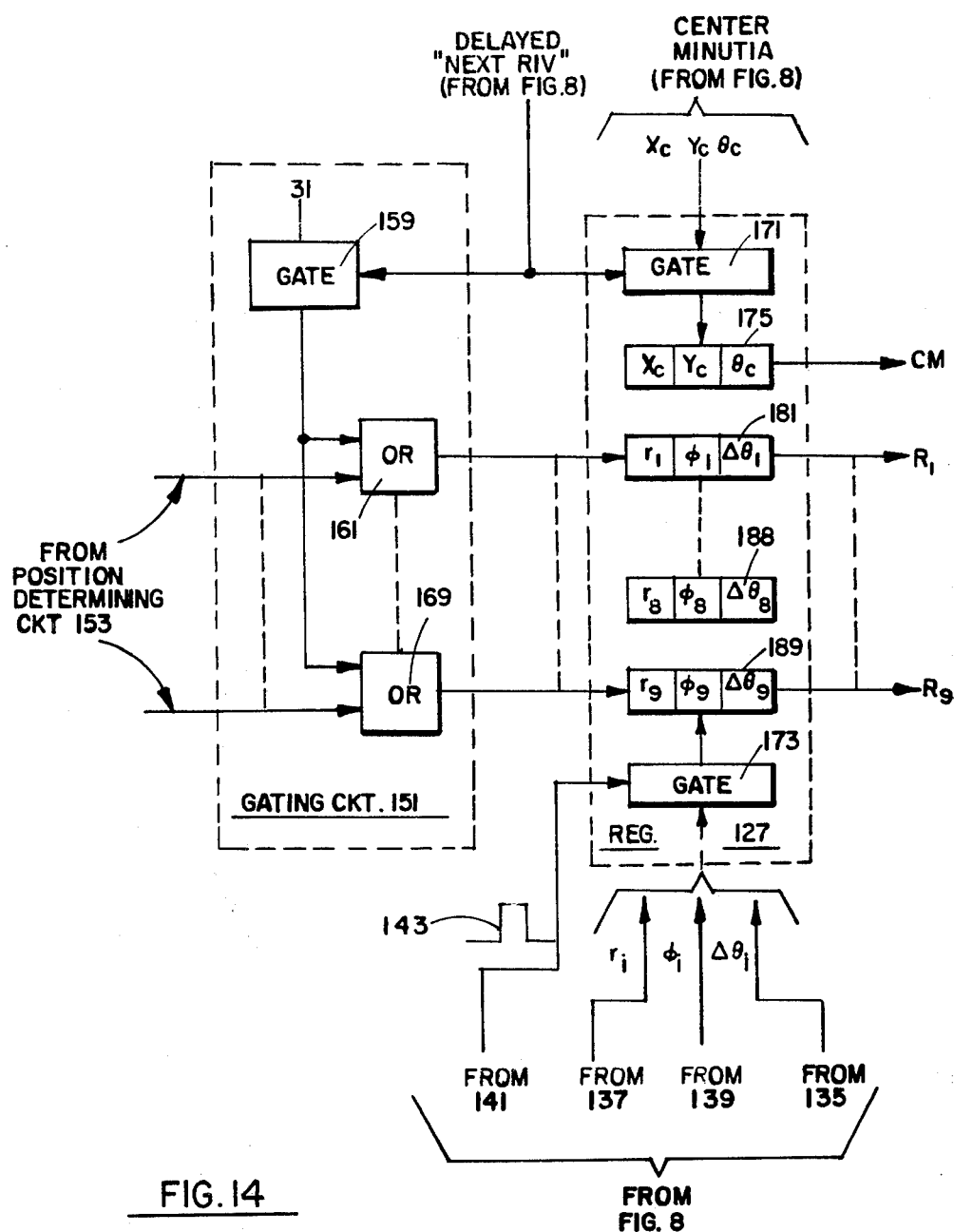
FIG. 14 is a block diagram of the gating circuit and center minutia and neighboring minutiae register of FIG. 13.

FIG. 14 illustrates a more detailed block diagram of the gating circuit 151 of the radial order sorter 129 and of the center minutia and neighboring minutiae register 127 of FIG. 13. The gating circuit 151 is comprised of a gate 159 and OR gating circuits 161-169, while the register 127 is comprised of gates 171 and 173 and holding registers 175 and 181-189. For purposes of this explanation, each of the OR gating circuits 161-169 (as well as subsequent OR gating circuits) can be comprised of a bank of twenty-four OR gates, and the holding registers 175 and 181-189 can each be three bytes or twenty-four bits wide for storing information in $X_c$, $Y_c$, $\theta_c$ and $r_i$, $\phi_i$, $\Delta\theta_i$ locations, respectively.

A delayed "next RIV" signal (from delay 126 in FIG. 8) enables the gate 159 to pass a constant of 31 through each of the gating circuits 161-169 for storage in the $r_i$ (or $r_1$-$r_9$) locations of the holding registers 181-189. This delayed "next RIV" signal also enables the gate 171 to allow a center minutia $X_c$, $Y_c$, $\theta_c$, which is stored in the center minutia register 125 (FIG. 8), to also be stored in the $X_c$, $Y_c$, $\theta_c$ locations of the holding register 175.

Each time within any given CMA period (FIG. 6A) that a neighboring minutia is detected by the comparator 141 (FIG. 8), the comparator 141 generates the pulse 143. The leading edge of the pulse 143 enables the gate 173 to allow a new neighboring minutia $r_i$, $\phi_i$, $\Delta\theta_i$ to be stored in the $r_9$, $\phi_9$, $\Delta\theta_9$ locations of the holding register 173. The pulse 143 is also applied to the position determining circuit 153 (in the radial order sorter 129 of FIG. 13), which will now be discussed by referring to FIG. 15. The waveforms of FIG. 16 will also be discussed to aid in explaining the operation of the circuit 153.

Figure 15:
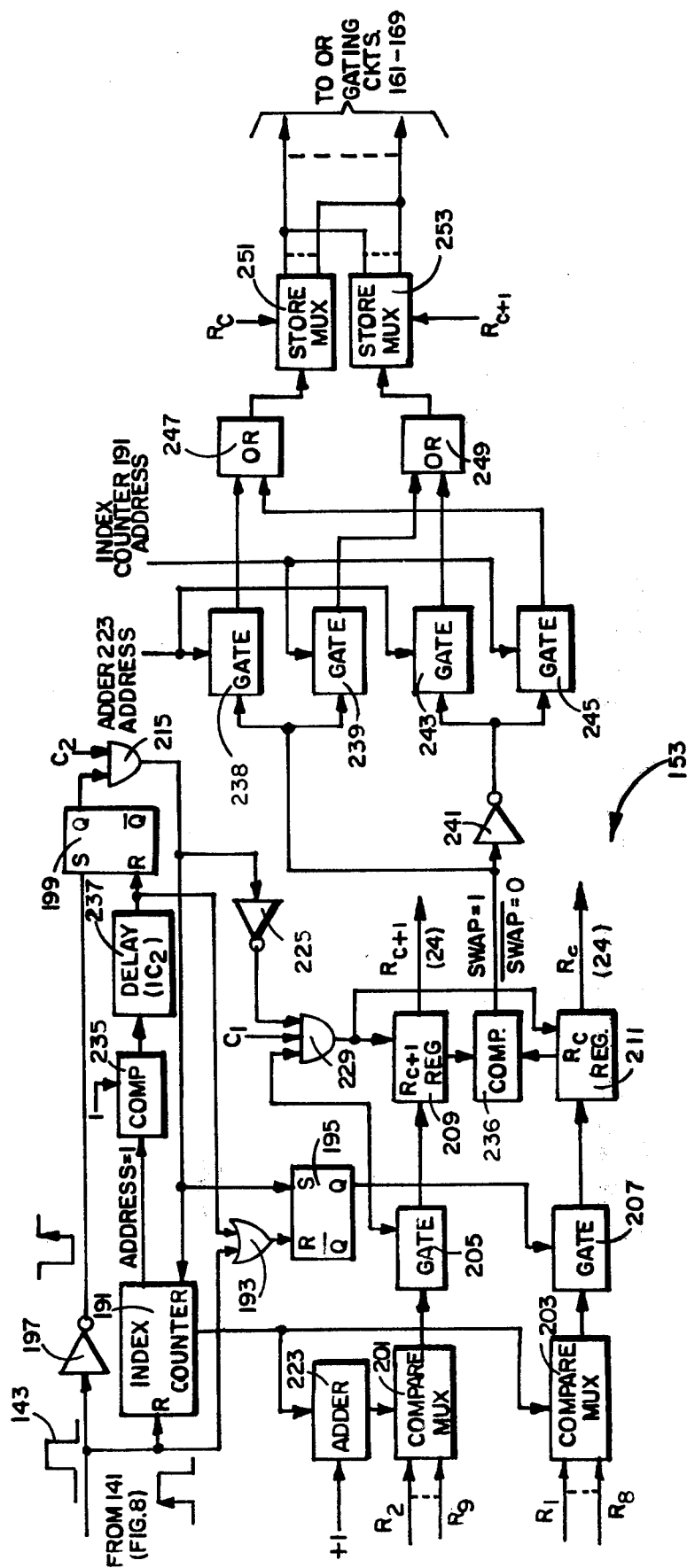
FIG. 15 is a block diagram of the position determining circuit of the radial order sorter illustrated in FIG. 13.
Figure 16:
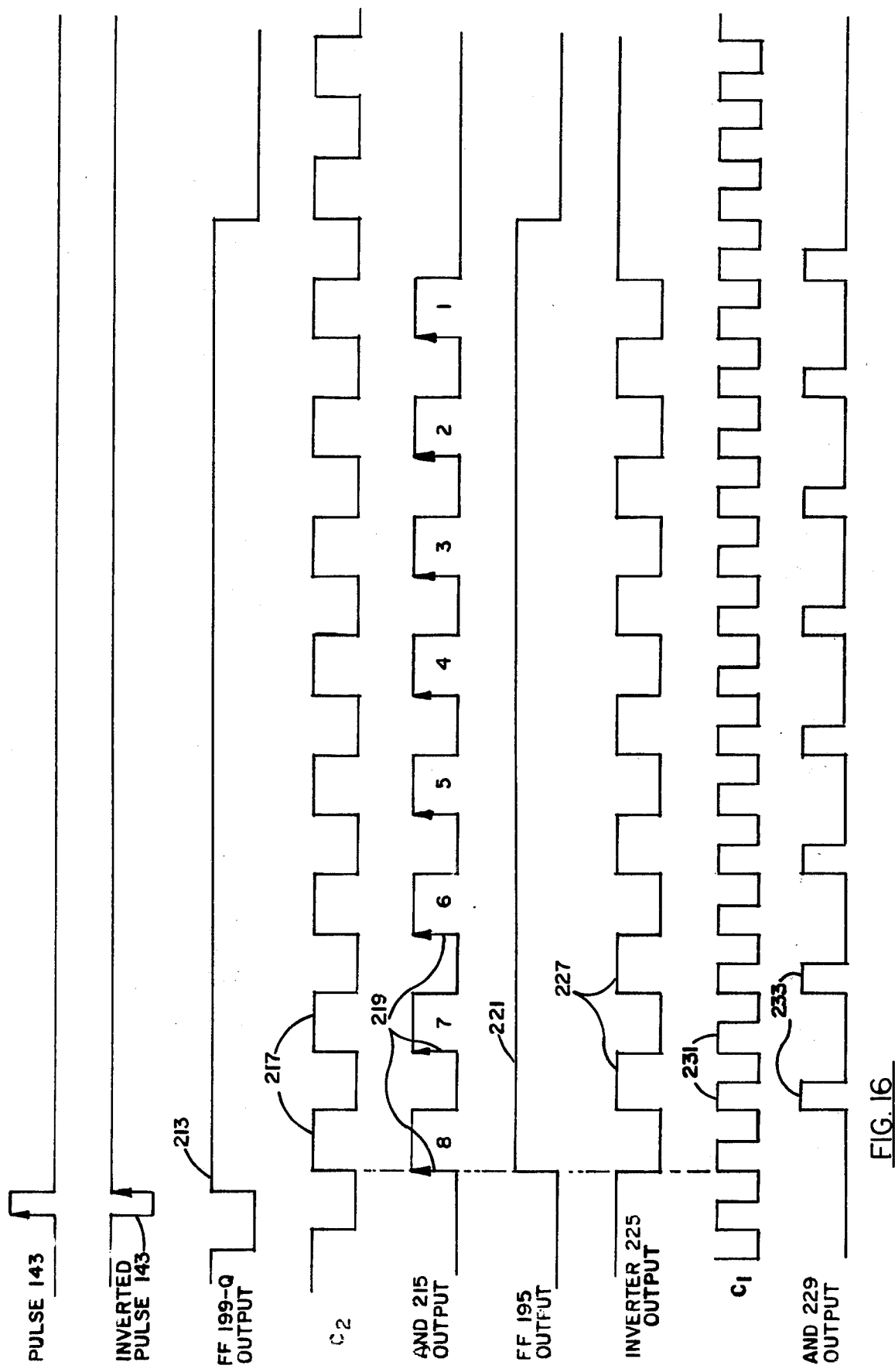
FIG. 16 illustrates waveforms useful in explaining the operation of the position determining circuit of FIG. 15.

As shown in the position determining circuit 153 of FIG. 15, the pulse 143 (FIG. 8) is applied to the reset input of an index or decrement counter 191, through an OR gate 193 to the reset input of a flip flop 195, and through an inverter 197 to the set input of a flip flop 199. In addition, the signals $R_9$-$R_2$ and $R_8$-$R_1$ from the register 127 (FIG. 14) are respectively applied to the inputs of compare multiplexers 201 and 203.

The leading edge of the pulse 143 resets the index counter 191 to a count of 0 and resets the flip flop 195 to disable gates 205 and 207. Upon being disabled, the gates 205 and 207 prevent the outputs of the multiplexers 201 and 203 from being applied to $R_{c+1}$ (R count plus one) and $R_c$ (R count) registers 209 and 211, respectively.

The inverted trailing edge of the inverted pulse 143 sets the flip flop 199 to generate a waveform 213 at the Q output of flip flop 199. Waveform 213 is applied to AND gate 215 along with $C_2$ clocks 217 to develop a series of eight clocks 219. The leading edge of the first one of the clocks 219 sets the flip flop 195 to develop an output waveform 221 which enables gates 205 and 207 to pass the outputs of the multiplexers 201 and 203 to the inputs of the registers 209 and 211 respectively. The first clock 219 also causes the index counter 191 to change its output address count from 0 to 8. Subsequent clocks 219 cause the counter 191 to decrement its output address count from 8 to 1.

The address counts of 8, 7 ... 1 from the counter 191 are sequentially applied to the compare multiplexer 203 and to an adder 223. Adder 223 adds a binary 1 to each address count to develop and apply to the compare multiplexer 201 a number equal to the address from the counter 191 plus one. Thus, as the counter 191 develops address counts of 8, 7 ... 1, the multiplexers 201 and 203 sequentially select signals $R_9$, $R_8$ ... $R_2$ and $R_8$, $R_7$ ... $R_1$ for application through the gates 205 and 207 to the inputs of the registers 209 and 211, respectively.

The clocks 219 are also inverted by an inverter 225 to develop and apply clocks 227 to an AND gate 229. The waveform 221 and $C_1$ clocks 231 are also applied to the AND gate 229. By examining the input waveforms 221, 227 and 231 to the AND gate 229, it can be seen that the AND gate 229 develops a 1 state output 233 each time that all three of its inputs are in binary 1 states. These 1 state outputs 233 of AND gate 229, which occur after the output address counts of the counter 191 have stabilized, enable the registers 209 and 211 to sequentially clock in in parallel the multiplexed signals $R_9$, $R_8$ ... $R_2$ and $R_8$, $R_7$ ... $R_1$, respectively.

Each output address count of the counter 191 is compared in a comparator 235 with a constant of 1. When the counter 191 has decremented its address count to a count of 1, the comparator 235 develops a signal which is applied to a delay circuit 237. After a delay of a 1 $C_2$ clock period, the output signal of the delay circuit 237 resets the flip flop 199 to terminate the waveform 213 and disable the AND gate 215, thereby preventing any more $C_2$ clocks from being counted by the counter 191. The output of the delay circuit 237 also resets the flip flop 195, by way of the OR gate 193, to terminate the waveform 221, thereby disabling gates 205, 207 and 229. This prevents the outputs of the multiplexers 201 and 203 from being applied to the inputs of the registers 209 and 211. In addition, the disabling of AND gate 229 also prevents the AND gate 229 from applying clocks to the registers 209 and 211.

During the period of time that the index counter 191 is developing address counts of 8, 7 . . . 1, the outputs of the multiplexers 201 and 203 ($R_9$, $R_8$ . . . $R_2$ and $R_8$, $R_7$ . . . $R_1$, respectively) are respectively applied to the registers 209 and 211. The r (radial distance) components of the R signals stored in the registers 209 and 211 are compared together in a comparator 236 to determine which r ($r_{c+1}$ or $r_c$) is larger. If $r_{c+1}$ (which is stored in register 209) is smaller than $r_c$ (which is stored in register 211), the comparator 236 will develop a 1 state signal to indicate that the signals $R_{c+1}$ and $R_c$ must be swapped or re-stored back into the register 127 (FIG. 14) in the reverse order. Otherwise, the comparator 236 will develop a 0 state signal to indicate that $R_{c+1}$ and $R_c$ are not to be swapped.

The binary state output of the comparator 236 is directly applied to gates 238 and 239, as well as being inverted by an inverter 241 before being applied to gates 243 and 245. When the output of the comparator 236 is a 1 state or "swap" signal, only the gates 238 and 239 are enabled. On the other hand, when the output of the comparator 236 is a 0 state or "$\overline{swap}$" (do not swap) signal, only the gates 243 and 245 are enabled. The address from the adder 223 is applied to the gates 238 and 243, while the address from the index counter 191 is applied to the gates 239 and 245. The outputs of the gates 238 and 245 are applied to an OR gating circuit 247. In a similar manner, the outputs of the gates 239 and 243 are applied to an OR gating circuit 249. The outputs of the OR gating circuits 247 and 249 respectively supply the addresses to store multiplexers 251 and 253. The $R_c$ and $R_{c+1}$ signals from the registers 211 and 209 are also applied to the multiplexers 251 and 253. In response to the addresses from OR gating circuits 247 and 249, the multiplexers 251 and 253 respectively apply the $R_c$ and $R_{c+1}$ signals through a selected pair of the OR gating circuits 161–169 for restorage in an associated pair of holding registers in the register 127 (FIG. 14).

It will be recalled that the function of the radial order sorter 129 is to index the neighboring minutiae of each RIV of a center minutia CM in the order of increasing radial distance from that center minutia. To more fully explain this overall function of the radial order sorter 129, an operational example will now be described with reference to FIGS. 14, 15 and 16.

Assume that five neighboring minutiae have been detected and radially sorted since the values $r_1$–$r_9$ in the register 127 were initialized to 31 at the time of the last "next RIV" pulse (FIG. 6A). As a result, assume that $r_1$–$r_9$, the radially sorted distances of the signals $R_1$–$R_9$ stored in the holding registers 181–189 of the register 127 (FIG. 14), are respectively equal to 16, 18, 19, 20, 23, 31, 31, 31 and 31. Finally, assume that a new neighboring minutia $R_9$ of the center minutia CM has been detected, and that the radial distance $r_9$ of the signal $R_9$ is 21. The resultant pulse 143 (FIG. 8) enables this new neighboring minutia $R_9$ to be stored in the holding register 189 and resets the index counter 191 to 0. Thus, this new $R_9$ signal displaces the old $R_9$ signal. Consequently, at this time the $r_1$–$r_9$ values of the signals $R_1$–$R_9$ are respectively equal to 16, 18, 19, 20, 23, 31, 31, 31 and 21. After $R_9$ has been stored in the holding register 189, the inverted trailing edge of the pulse 143 sets the flip flop 199 to enable the AND gate 215 to pass the stream of eight $C_2$ clocks 219 to the index counter 191 to be counted.

The first clock 219 from the AND gate 215 causes the index counter 191 to develop an address count of 8. As a result, the compare multiplexers 201 and 203 respectively select and apply the new neighboring minutia $R_9$ and the signal $R_8$ through the gates 205 and 207 for storage in the registers 209 and 211, respectively. The values of $r_9$ and $r_8$ of the signals $R_9$ and $R_8$ are compared in the comparator 235. Since it was assumed that $r_9 = 21$ and $r_8 = 31$, the comparator 235 will develop a 1 state "swap" output. This 1 state swap output enables the gates 237 and 239 to respectively pass the addresses from the adder 223 and counter 191 through the OR gating circuits 247 and 249 to the store multiplexers 251 and 253, respectively. Thus, the multiplexer 251 applies the $R_8$ signal out on its $R_9$ address line, through OR gating circuit 169 and into holding register 189. At the same time, the multiplexer 253 applies the $R_9$ signal out on its $R_8$ address line, through OR gating circuit 168 and into holding register 188. It can therefore be seen that the $R_9$ and $R_8$ signals, that were respectively multiplexed out of the holding registers 189 and 188, have been swapped, with $R_9$ and $R_8$ being respectively multiplexed back into holding registers 188 and 189. As indicated before, the signals stored in the holding registers 181–189 are $R_1$–$R_9$ respectively. Thus, the old $R_9$ and $R_8$ signals respectively become the new $R_8$ and $R_9$ signals after being swapped. As a result, at the end of the first clock 219 period, the $r_1$–$r_9$ values of the $R_1$–$R_9$ signals are 16, 18, 19, 20, 23, 31, 31, 21 and 31.

The second clock 219 causes the index counter 191 to decrement its count to 7. As a result, the compare multiplexers 201 and 203 select the $R_8$ and $R_7$ signals from the holding registers 188 and 187, respectively, for respective storage in the registers 209 and 211. The values of $r_8$ and $r_7$ (21 and 31, respectively) of the signals $R_8$ and $R_7$ cause the comparator 236 to develop a 1 state "swap" signal which subsequently results in $R_8$ and $R_7$ being stored in the holding registers 187 and 188, respectively. Thus, at the end of the second clock 219 period, the $r_1$–$r_9$ values of the $R_1$–$R_9$ signals at that time are 16, 18, 19, 20, 23, 31, 21, 31 and 31, respectively. Similarly, the fourth clock 219 causes the counter 191 to decrement its count to 5, which in turn results in the $r_1$–$r_9$ values of the $R_1$–$R_9$ signals being equal to 16, 18, 19, 20, 21, 23, 31, 31 and 31, respectively, at the end of the fourth clock 219 period.

During the fifth clock 219 period, the adder 223 address is 5 and the index counter 191 address is 4. At this time $r_5 = 21$ and $r_4 = 20$. Therefore, the comparator 236 will develop a 0 state $\overline{swap}$ signal which will disable the gates 238 and 239, while the inversion of this 0 state $\overline{swap}$ signal will enable the gates 243 and 245. As a result, the index counter 191 address will be applied through the circuits 245 and 247 to enable the multiplexer 251 to initiate the restoration of the $R_4$ signal back into the holding register 184 from which it was multiplexed. At the same time, the adder 223 address will be applied through the circuits 243 and 249 to enable the multiplexer 253 to initiate the restoration of the $R_5$ signal back into the holding register 185 from which it was multiplexed. At the end of the fifth clock 219 period, the $r_1$–$r_9$ values of the $R_1$–$R_9$ signals will respectively remain equal to 16, 18, 19, 20, 21, 23, 31, 31 and 31, since the newest neighboring minutia has now been radially sorted in the order of increasing radial distance from the center minutia. In a like manner, each of the subsequent sixth, seventh and eighth clocks 219 will not affect the order of these radially sorted signals $R_1$-$R_9$.

The center minutia CM and signals $R_1$-$R_8$ are applied from the register 127 (FIG. 14) to the output circuit 145. A block diagram of the output circuit 145 is illustrated in FIG. 17, which will now be discussed.

Figure 17:
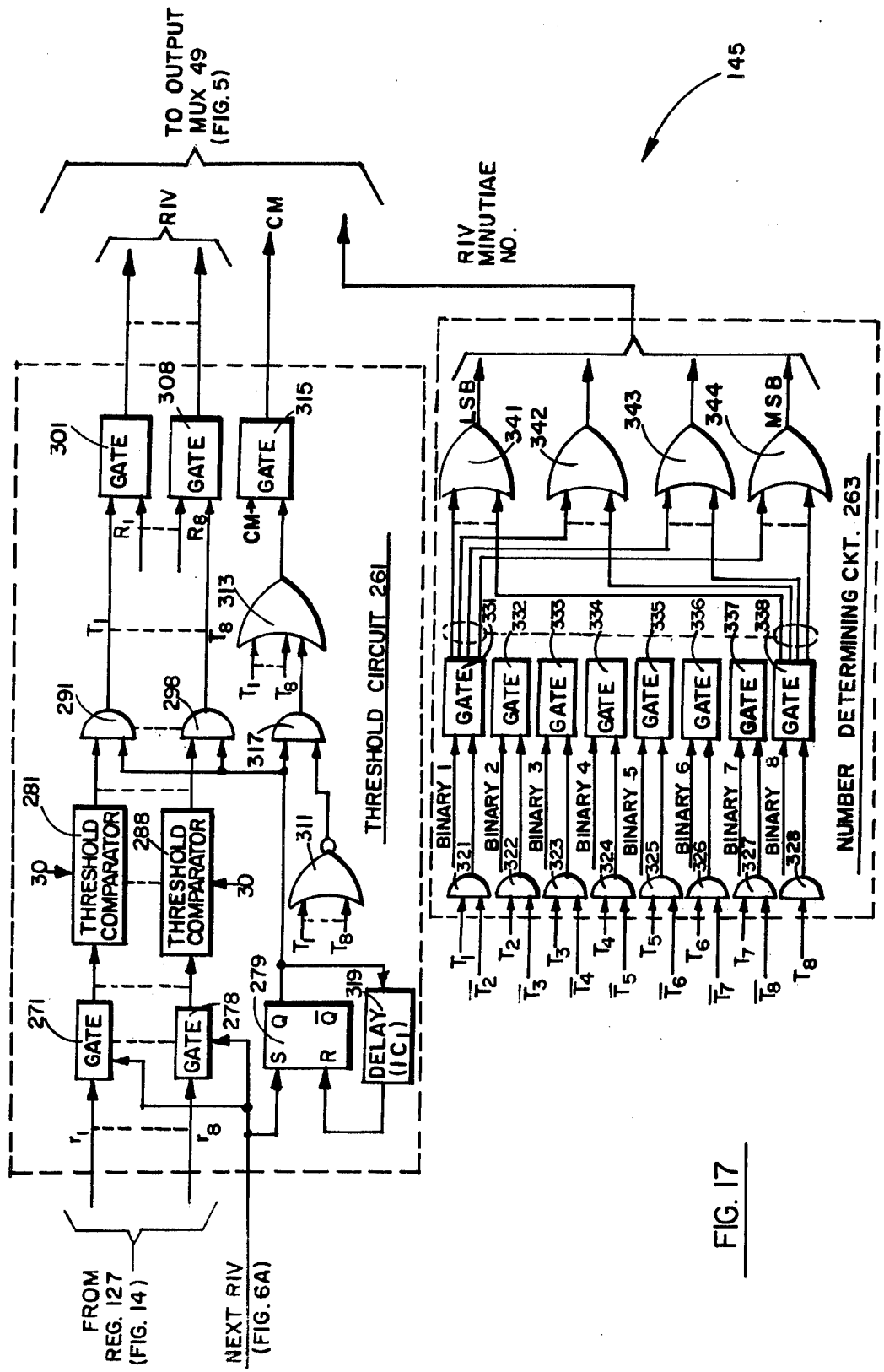
FIG. 17 is a block diagram of the output circuit of FIG. 13.

As shown in FIG. 17, the output circuit 145 is comprised of a threshold circuit 261 and a number determining circuit 263. The threshold circuit 261 essentially blocks or eliminates those ones of the input $R_1$-$R_8$ signals which have r values that are still initialized to a value of 31. By this means, only those signals of $R_1$-$R_8$, whose radial values $r_i$ passed the threshold test of comparator 141 (FIG. 8), will be developed by the threshold circuit 261 as neighboring minutiae within the RIV of the input center minutia CM. The number determining circuit 263 utilizes signals from the threshold circuit 261 to determine the number of neighboring minutiae (RIV minutiae number) in the RIV being developed by the threshold circuit 261. Each of the circuits 261 and 263 is separately discussed in greater detail below.

The $r_1$-$r_8$ components of the radially sorted signals $R_1$-$R_8$ are applied to the inputs of gates 271-278, respectively, in the threshold circuit 261. The "next RIV" signal (FIG. 6A) is also applied to the gates 271-278, as well as to the set input of a flip flop 279. It should be recalled at this time that a "next RIV" is generated (by the timing and control circuit 83 of FIG. 6A) at the completion of an RIV. By this time the center minutia CM and final $R_1$-$R_8$ data from the register 127 (FIG. 14) have stabilized, since all of the neighboring minutiae in an RIV have been detected.

The "next RIV" signal enables the gates 271-278 to respectively pass the values $r_1$-$r_8$ to threshold comparators 281-288, where each of the values $r_1$-$r_8$ is compared against a threshold value of 30. Each of the threshold comparators 281-288 is implemented to develop a 1 state threshold output (T) if the value of its r input does not exceed the threshold value of 30. If otherwise, a threshold comparator will develop a 0 state threshold output.

The output of the flip flop 279, which was set by the "next RIV signal", enables AND gates 291-298 to pass the outputs ($T_1$-$T_8$) of the comparators 281-288 to gates 301-308. Also applied to the gates 301-308 are the $R_1$-$R_8$ signals from the register 127 (FIG. 14). Those of the $T_1$-$T_8$ outputs of the comparators 281-288, which are 1 state outputs, will enable the associated ones of the gates 301-308 to pass the corresponding ones of the radially sorted $R_1$-$R_8$ signals out as the neighboring minutia that form the RIV of the associated center minutia CM. Thus, it can be seen that any R signal having an r component value that is still at the initialized value of 31 will cause its associated threshold comparator to develop a 0 state threshold output T, which will in turn prevent its associated gate from passing that R signal.

All of the $T_1$-$T_8$ threshold outputs from AND gates 291-298 are also applied to NOR gate 311 and OR gate 313. If any of the $T_1$-$T_8$ outputs is a 1 state signal, the OR gate 313 will develop a signal to enable gate 315 to pass the center minutia CM to its output. On the other hand, if all of the $T_1$-$T_8$ outputs are 0 state signals, the NOR gate 311 will apply a 1 state signal to a first input of AND gate 317. The AND gate 317, like the gates 291-298, was enabled by the output of the flip flop 279 which was set by the "next RIV" signal. Therefore, the "1" state output of NOR gate 311 will pass through AND gate 317 and OR gate 313 to enable the gate 315 to pass the center minutia CM to its output. Consequently, it can be seen that the center minutia CM of an RIV is always developed, even though the number of neighboring minutiae (RIV minutiae number) in the RIV of that CM can vary from a maximum of 8 to a minimum of 0.

The output of flip flop 279, which enabled gates 291-298 and 317, is delayed for 1 $C_1$ clock pulse period by delay circuit 319 before it resets the flip flop 279 to directly disable the gates 291-298 and 317 and indirectly disable the gates 301-308 and 315.

During the time that the AND gates 291-298 are enabled by the flip flop 279 to develop the threshold outputs $T_1$-$T_8$, the outputs $T_1$-$T_8$ are respectively applied to AND gates 321-328 in the number determining circuit 263. In addition, the negation of the outputs $T_2$-$T_8$, or $\overline{T_2}$-$\overline{T_8}$, are respectively applied to the AND gates 321-327. With this implementation, only one of the gates 321-328 will develop a 1 state output, and that one gate will indicate the number of neighboring minutiae in the RIV being developed by the threshold circuit 261.

The 0 or 1 state outputs of AND gates 321-328 are applied to the inputs of gates 331-338. Also applied to the gates 331-338 are 4-bit binary numbers 1-8, respectively. Each of the gates 331-338 develops a 4-bit output, which may be 0 (0000). The four bits from each of these gates 331-338 are respectively applied to OR gates 341-344, with the least significant and most significant bits being respectively applied to OR gates 341 and 344.

Only that one of the AND gates 321-328, which develops a 1 state output, will enable its associated one of the gates 331-338 to, in turn, apply its associated input 4-bit binary number to the OR gates 341-344. It is the collective 4-bit binary output of these four OR gates 341-344 which comprises the number of neighboring minutiae (RIV minutiae number) in the RIV that is developed by the threshold circuit 261.

The operation of the number determining circuit 263 will be further described in the following examples.

In a first example, if $r_1$ = 30 or less and $r_2$-$r_8$ are each equal to 31, $T_1$ = 1 and $T_2$-$T_8$ are each equal to 0. In this case, only AND gate 321 would develop a 1 state output, which would enable gate 331 to respectively pass the four bits in the binary 1 (0001) to OR gates 341-344. Consequently the OR gates 341-344 would respectively develop the output bits 0, 0, 0 and 1 to indicate that the RIV minutiae number of the RIV is one (0001).

In a second example, if $r_1$-$r_5$ are each equal to 30 or less and $r_6$-$r_8$ are each equal to 31, $T_1$-$T_5$ are each equal to 1 and $T_6$-$T_8$ are each equal to 0. Since $T_1$-$T_5$ are each equal to 1, $\overline{T_1}$-$\overline{T_5}$ are each equal to 0 and AND gates 321-324 are disabled. Since $T_6$-$T_8$ are each equal to zero, AND gates 326-328 are likewise disabled. Only AND gate 325 is enabled since both $T_5$ and $\overline{T_6}$ are equal to 1. The 1 state output of AND gate 325 enables the gate 335 to respectively pass the four bits in its binary 5 input (0101) through OR gates 341-344 to indicate that the RIV minutiae number of the RIV is five (0101).

Finally, in a third example, if $r_1$-$r_8$ are each equal to 0, all of the gates 321-328 would be disabled and the OR gates 341-344 would collectively develop an output of 0000 to indicate that there are no neighboring minutiae in the RIV for the center minutia CM.

The center minutia CM, the RIV of that center minutia, and the RIV minutiae number of the RIV are all applied in parallel from the output circuit 145 of the RIV encoder 59 to the output multiplexer 49 (FIG. 5) for further processing, as discussed previously.

Figure 18:
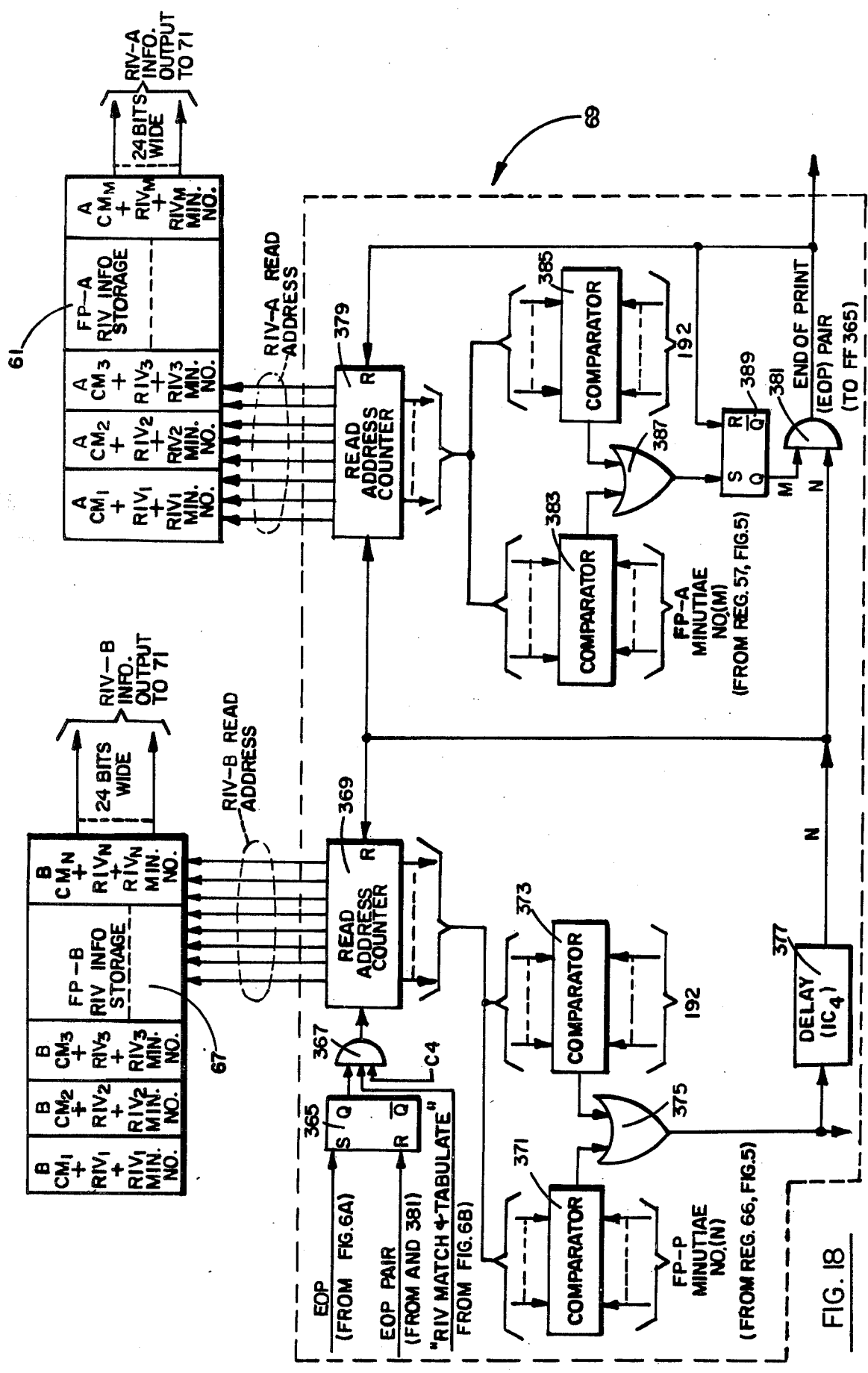
FIG. 18 is a block diagram of the RIV selector of FIG. 5.

Referring now to FIG. 18, a block diagram of the RIV selector 69, as well as the FP-B and FP-A RIV information storage circuits 67 and 61, of FIG. 5 is illustrated. It will be recalled that an RIV is generated by the RIV encoder 59 (FIG. 5) for each of the minutiae in a fingerprint. For purposes of this discussion, assume that there are M minutiae in fingerprint A and N minutiae in fingerprint B. Consequently, the RIV-A information signals in circuit 61 contain fingerprint A RIV's 1 to M (or 1 - M) and the M center minutiae ($CM_1$-$CM_M$) of those RIV's, as well as the RIV minutiae number in each of those RIV's. In a like manner the RIV-B information signals in circuit 67 contain fingerprint B RIV's 1 to N (or 1 - N) and the N center minutiae ($CM_1$-$CM_N$) of those RIV's, as well as the RIV minutiae number in each of those RIV's. While the number M does not have to be equal to the number N, neither M nor N is greater than 192.

Figure 19:
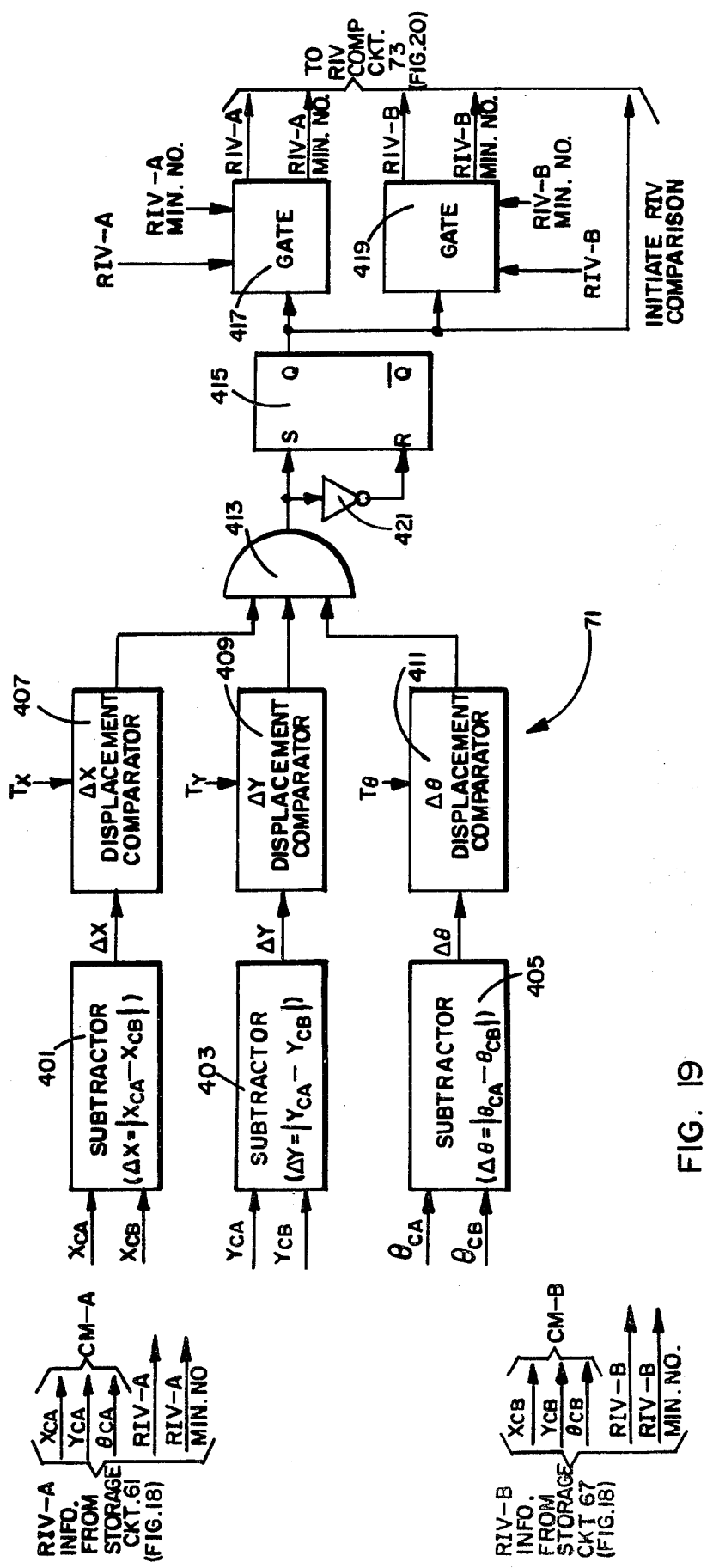
FIG. 19 is a block diagram of the center minutiae comparison circuit of FIG. 5.

The EOP signal that occurs at the end of fingerprint A sets a flip flop 365 to enable a first input of an AND gate 367. Applied to a second input of the AND gate 367 are $C_4$ clocks. However, these $C_4$ clocks are prevented from passing through the AND gate 367 because a third input of the AND gate 367 is in a 0 state at this time (since no 1 state "RIV match and tabulate signal from FIG. 6B is present). It will be recalled that the EOP signal which occurs after FP-B has been RIV-encoded generates an "RIV match and tabulate" signal (see discussion on FIG. 6B). This "RIV match and tabulate" signal now enables the AND gate 367 to pass $C_4$ clocks to a read address counter 369 to be counted. In counting $C_4$ clocks, the counter 369 develops RIV-B read addresses or address counts from 1 to N. In response to these address counts, the storage circuit 67 sequentially accesses each of the RIV-B information signals 1-N of fingerprint B for application to the center minutiae comparison circuit 71 (FIG. 5 or 19).

The address counts of the counter 369 are also compared in a comparator 371 with the FP-B minutiae number (from register 359) and in a comparator 373 with a constant of 192. If N is 191 or less, the comparator 371 will develop a 1 state signal when the address count of the counter 369 becomes equal to N. On the other hand, if N is 192 or more, the comparator 373 will develop a 1 state signal when the address count of the counter 369 becomes equal to 192.

When either of the comparators 371 and 373 develops a 1 state signal, that 1 state signal is serially applied through an OR gate 375 and a delay circuit 37. The output of the delay circuit 377 will henceforth be referred to as an "N" signal. This "N" signal occurs when all of the N (or 192) RIV-B information signals of fingerprint B in the storage circuit 67 have been sequentially applied to the comparison circuit 71 (FIG. 5). The delay of the delay circuit 377 is equal to one $C_4$ clock period. This allows the last RIV-B information signal in the storage circuit 67 to be applied to the circuit 71 for a full $C_4$ clock period before the counter 369 is reset.

The N signal from the delay circuit 377 resets the counter 369 to an address count of zero, increments a read address counter 379 by one, and is applied to an AND gate 381 (to be explained).

Each time that the counter 369 is reset to a count of zero, the counter 379 increments its count by one to develop a different RIV-A read address or address count. In this manner, the counter 379 develops address counts from 1 to M. In response to these address counts, the storage circuit 61 seqentially accesses each of the RIV-A information signals 1 - M of fingerprint A for application to the center minutiae comparison circuit 71 (FIG. 5 or 19).

As described above, the counter 379 increments its address count by one each time after all of the N RIV information signals in the circuit 67 have been sequentially applied to the circuit 71. Thus, during each period of time that one of the M RIV information signals of fingerprint A is being applied from the circuit 61 to the circuit 71, all of the RIV information signals in the circuit 67 are sequentially applied to the circuit 71.

The address counts of the counter 379 are also compared in a comparator 383 with the FP-A minutiae number (from the register 355) and in a comparator 385 with a constant of 192. If M is 191 or less, the comparator 383 will develop a 1 state signal when the address count of the counter 379 becomes equal to M. On the other hand, if M is 192 or more, the comparator 385 will develop a 1 state signal when the address count of the counter 379 becomes equal to 192.

When either of the comparators 383 and 385 develops a 1 state signal, that 1 state signal is applied through an OR gate 387 to set a flip flop 389 to develop an "M" signal output. This "M" signal occurs at the beginning of the time period when the Mth (or 192nd at the most) RIV-A information signal of fingerprint A is being applied from the circuit 61 to the circuit 71 (FIG. 5).

The M signal from the flip flop 389 is used to enable the AND gate 381. As stated before, all of the N RIV-B information signals are sequentially accessed from the circuit 67 during the period of time when the Mth RIV-A information signal is being accessed from the circuit 61. When all of the RIV-B information signals have been accessed from the circuit 67, the N signal is generated and applied through the enabled AND gate 381. The output of the AND gate 381 is an "end of print pair" signal, which indicates that all of the combinations of pairs of RIV information signals in the pair of A and B fingerprints have been applied to the comparison circuit 71 (FIG. 5).

This end of print pair signal is generated coincident in time with an N signal that resets the flip flop 365 and the counter 369. The end of print pair signal resets the counter 379 to a count of 1, and resets the flip flop 389 to terminate the M signal. The termination of the M signal disables the AND gate 381, thereby terminating the end of print pair signal.

The RIV selector 69 is now in a quiescent state, with the flip flops 365 and 389 and counters 369 and 379 all being in a reset condition. The RIV selector 69 remains in this quiescent state until either another B fingerprint is fetched from the reference fingerprint file to be compared with the fingerprint A or another fingerprint A is to be compared with one or more fingerprints from the fingerprint file. When a different fingerprint A is to be identified, the operation is similar to that previously described. When another B fingerprint is fetched from the reference fingerprint file, it is initially processed by the data converter 39 (FIG. 5), with the EOP signal setting the flip flop 365 to start the above described selective accessing operation of the RIV-A and new RIV-B information signals.

The RIV-A and RIV-B information signals from the storage circuits 61 and 67 are applied to the center minutiae comparison circuit 71 (FIG. 5). The comparison circuit 71 will now be more fully discussed by referring to the block diagram of the comparison circuit 71 illustrated in FIG. 19.

Each RIV information signal is comprised of a center minutia ($X_c$, $Y_c$, $\theta_c$), followed by the RIV of that center minutia and the RIV minutiae number of that RIV. At any given time, let the parameters of the center minutia of RIV-A be designated as $X_{CA}$, $Y_{CA}$, $\theta_{CA}$, and the parameters of the center minutia of RIV-B be designated as $X_{CB}$, $Y_{CB}$, $\theta_{CB}$. The values of $X_{CB}$, $Y_{CB}$ and $\theta_{CB}$ are respectively subtracted from the values $X_{CA}$, $Y_{CA}$ and $\theta_{CA}$ in subtractors 401, 403 and 405 respectively. Respectively developed at the outputs of the subtractors 401, 403 and 405 are the signals $\Delta X$, $\Delta Y$ and $\Delta\theta$, which represent the absolute magnitudes of the associated parameter differences. More specifically, $\Delta X$, $\Delta Y$ and $\Delta\theta$ respectively represent the X and Y displacements and angular displacement or orientation $\theta$ between the center minutiae of the RIV's A and B being compared at a given time. To accomplish these subtractions, the subtractors 401, 403 and 405 may be implemented in a conventional two's complement arrangement.

The $\Delta X$, $\Delta Y$ and $\Delta\theta$ displacements between the two center minutiae are respectively compared with preselected threshold values $T_X$, $T_Y$ and $T_\theta$ in $\Delta X$, $\Delta Y$ and $\Delta\theta$ displacement comparators 407, 409 and 411, respectively. Each comparator is implemented to develop a 1 state output when the amplitude of the associated displacement input does not exceed the associated threshold value. The threshold values $T_X$, $T_Y$ and $T_\theta$ may be chosen, for example, to respectively represent 350 units, 350 units and 30°, where each unit is equal to two mils. However, the values of threshold values $T_X$, $T_Y$ and $T_\theta$ may be preselected to suit the type of operation desired.

The outputs of the comparators 407, 409 and 411 are applied to an AND gate 413. AND gate 413 can only develop a 1 state output signal when the X-coordinate difference ($\Delta X$) is less than $T_X$, the Y-coordinate difference ($\Delta Y$) is less than $T_Y$ and the orientation angle $\theta$ difference ($\Delta\theta$) is less than $T_\theta$. A 1 state output from the AND gate 413 is therefore developed only when the parameters of the center minutiae of RIV's A and B are all sufficiently close to each other.

A 1 state output from the AND gate 413 sets a flip flop 415 to generate an "initiate RIV comparison" signal which enables gates 417 and 419 to respectively pass RIV-A and RIV-B, as well as the respective RIV-A and RIV-B minutiae numbers of those RIV's, to the RIV comparison circuit 73 (FIG. 20) for the second or RIV comparison test. The "initiate RIV comparison" signal from flip flop 415 is also applied to the RIV comparison circuit 73. When the output of the AND gate 413 changes from a 1 state back to a 0 state signal (at the end of a successful center minutiae comparison), that 0 state signal is inverted by an inverter 421 to reset the flip flop 415, which in turn terminates the "initiate RIV comparison" signal and disables the gates 417 and 419.

If all of the parameters of the center minutiae of the RIV's A and B are not sufficiently close to each other, the gates 417 and 419 remain disabled and the RIV's A and B (of the center minutiae being compared at that time) and the RIV-A and RIV-B minutiae numbers of those RIV's are thereby prevented from being applied to the RIV comparison circuit 73.

Each of the gates 417 and 419 can be comprised of a plurality of two-input AND gates (not shown), whose first inputs are commonly enabled by the output of the flip flop 415 (when set) to individually pass in parallel the bits in the associated RIV (and RIV minutiae number of that associated RIV) that are respectively applied to the second inputs.

Figure 20:
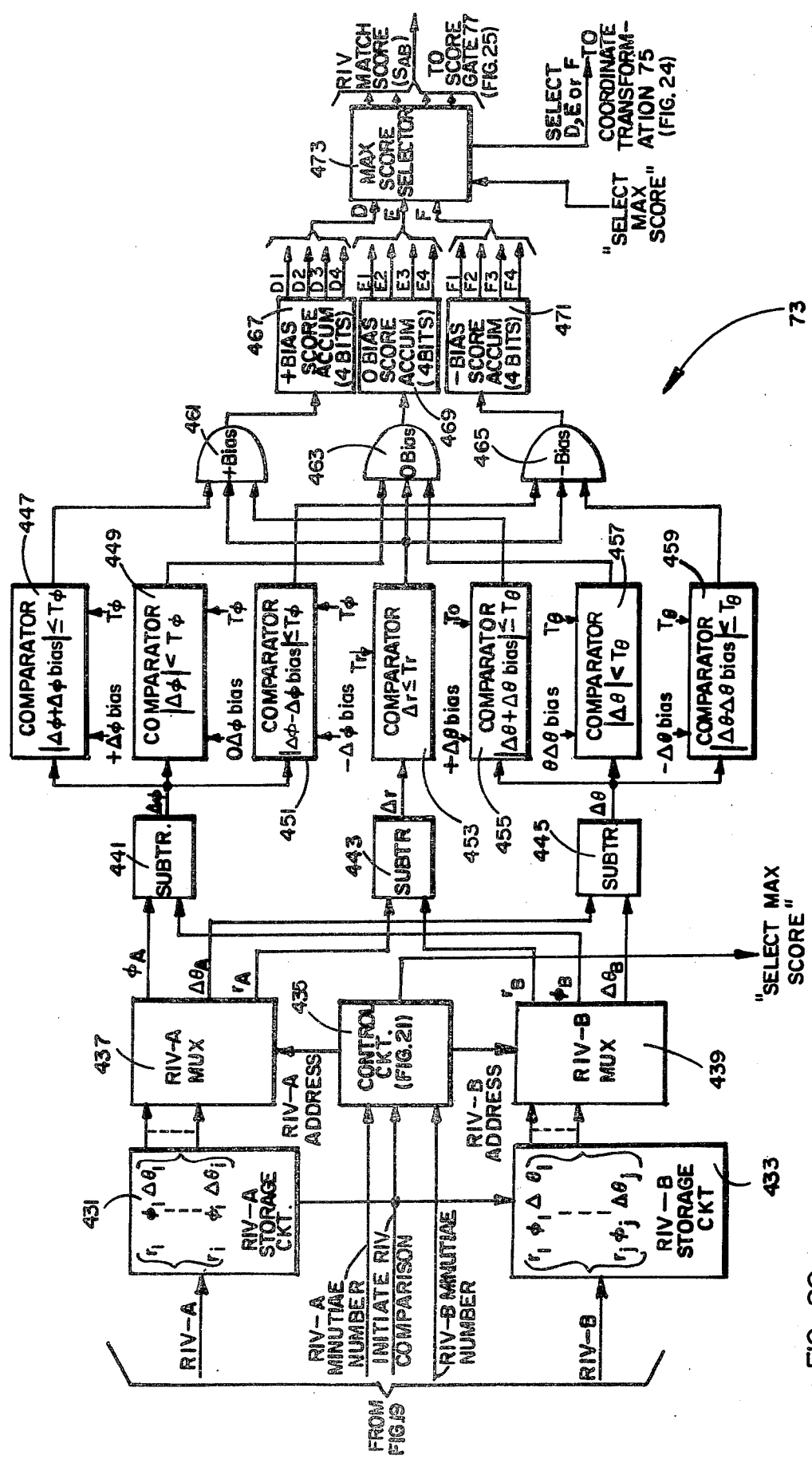
FIG. 20 is a block diagram of the RIV comparison circuit of FIG. 5.

Referring now to FIG. 20, a block diagram of the RIV comparator circuit 73 is illustrated. The RIV's A and B, the "initiate RIV comparison" signal, and the RIV-A and RIV-B minutiae number signals are all received from the center minutiae comparison circuit 71 (FIG. 19). Basically, the function of the RIV comparison circuit 73 is to develop an RIV match score ($S_{AB}$) which indicates the degree of similarity or match between RIV-A and RIV-B.

The "initiate RIV comparison" signal enables RIV-A and RIV-B storage circuits 431 and 433 to parallel store RIV-A and RIV-B respectively. Each of the storage circuits 431 and 433 can be comprised of a bank of eight holding registers (not shown) for respectively storing up to eight neighboring minutiae in r, $\phi$, $\Delta\theta$ format. Also, each holding register can have three successive 8-bit wide register portions (not shown) for respectively storing the r, $\phi$ and $\Delta\theta$ parts of a neighboring minutia. The "initiate RIV comparison" signal also enables a control circuit 435 to store the RIV-A and RIV-B minutiae number signals.

Each of the neighboring minutiae of RIV-A in the storage circuit 431 are parallel-applied to the input of an RIV-A multiplexer 437. Likewise, each of the neighboring minutiae of RIV-B in the storage circuit 433 are parallel-applied to the input of an RIV-B multiplexer 439. In response to the "initiate RIV comparison" signal and RIV-A and RIV-B minutiae number signals, the control circuit 435 develops a sequence of 4-bit RIV-A addresses, as well as a sequence of 4-bit RIV-B addresses during the time of each RIV-A address. The RIV-A addresses enable the multiplexer 437 to sequentially multiplex out each of the neighboring minutiae in RIV-A, and the RIV-B addresses enable the multiplexer 439 to sequentially multiplex out each of the neighboring minutiae in RIV-B. However, the same sequence of RIV-B addresses are developed during each different RIV-A address. For example, assume that there are five neighboring minutiae in RIV-A and seven neighboring minutiae in RIV-B. In this case there will be five RIV-A addresses (0001–0101) and seven RIV-B addresses (0001–0111). During the first RIV-A address of 0001, the first minutia in RIV-A is multiplexed to the output of the RIV-A multiplexer 437, and all seven of the minutiae in RIV-B are sequentially multiplexed out of the RIV-B multiplexer 439 by the RIV-B addresses 0001–0111. In a similar manner, during the fifth RIV-A address of 0101, the fifth minutia in RIV-A is multiplexed to the output of the multiplexer 437 and all seven of the minutiae in RIV-B are sequentially multiplexed out of the multiplexer 439 by the RIV-B addresses 0001–0111. In this way, each encoded neighboring minutia of RIV-A can be consequently compared against each of the sequence of encoded neighboring minutiae of RIV-B.

At any given time, let the parts of the neighboring minutia being multiplexed out of multiplexer 437 be represented by $r_A$, $\phi_A$ and $\Delta\theta_A$ and the parts of the neighboring minutia being multiplexed out of multiplexer 437 be represented by $r_B$, $\phi_B$ and $\Delta\theta_B$. The angular mismatch in $\phi$, or $\Delta\phi$, between these two neighboring minutiae of RIV-A and RIV-B is obtained by subtracting $\phi_B$ from $\phi_A$ in a subtractor 441. Likewise, the radial mismatch $\Delta r$ is obtained by subtracting $r_B$ from $r_A$ in a subtractor 443. Finally, the angular mismatch in $\theta$, or $\Delta\theta$, is obtained by subtracting $\theta_B$ from $\theta_A$ in a subtractor 445.

The angular mismatch signal $\Delta\phi$ and a threshold angle limit signal $T_\phi$ are applied to each of comparators 447, 449 and 451. In addition, positive (+), zero (0) and negative (−) $\Delta\phi$ angle biases are applied to the comparators 447, 449 and 451, respectively. These +, 0 and − angle biases are binary numbers which respectively represent, for example, approximate angles of rotation of +8.4°, 0° and −8.4° to test the extent of the angular mismatch in $\phi$ between RIV-A and RIV-B in three different ranges.

Binary numbers, representing these angle biases of approximately +8.4°, 0° and −8.4°, can be derived in the following manner. The 256 different binary numbers in one byte, or 8 bits, can be used to represent 256 different angles around the 360° of a circle. Therefore, between adjacent binary numbers in the byte, there will be 360/256 degrees (approximately 1.4°) of angle. As a result, binary numbers of 6 (00000110), 0 (00000000) and 250 ( 11111010) would respectively represent angle biases of approximately +8.4°, 0°, and −8.4°, with 11111010 being the two's complement of 00000110.

Each of the comparators 447 and 451 is implemented to develop a 1 state output when the absolute value of the algebraic sum of the associated input angle bias and the angular mismatch $\Delta\phi$ is equal to or less than the threshold angle limit signal $T_\phi$. Similarly, the comparator 449 is implemented to develop a 1 state output when the absolute value of $\Delta\phi$ is less than $T_\phi$. For example, assume $T_\phi = 4.2°$, +$\phi$ bias = +8.4°, 0$\phi$ bias = 0° and −$\phi$ bias = −8.4°. Thus, if $\Delta\phi$ is within the range from −4.2° to −12.6°, the comparator 447 will develop 1 state output since $|\Delta\phi + 8.4°| \leq 4.2°$. Likewise, if $\Delta\phi$ is within the range between −4.2° and +4.2°, the comparator 449 will develop a 1 state output since $|\Delta\lambda\phi| < 4.2°$. Finally, if $\Delta\phi$ is within the range from +4.2° to +12.6°, the comparator 451 will develop a 1 state output since $|\Delta\phi − 8.4°| \leq 4.2°$.

At most, depending upon the angular mismatch in $\phi$, only one of these comparators 447, 449 and 451 can develop a 1 state output at any given time. However, it should also be apparent that the neighboring minutiae pair being compared may be excessively rotated with respect to each other such that $\Delta\phi$ may be outside the range limits of all of the comparators 447, 449 and 451. Therefore, none of these comparators would develop a 1 state output. For instance, in the above example $\Delta\phi$ could represent an angular mismatch of + 13° or − 13°.

Radial mismatch $\Delta r$ is compared in comparator 453 with a preselected, radial-mismatch threshold limit $T_r$. The comparator 453 will only develop a 1 state output if $\Delta r$ is equal to or less than the value to $T_r$.

The angular mismatch $\Delta\theta$ signal and a threshold angle limit signal $T_\theta$ are applied to each of comparators 455, 457 and 459. In addition, +, 0 and − $\Delta\theta$ angle biases are respectively applied to the comparators 455, 457 and 459. The structure and operation of the comparators 455, 475 and 459 are similar to those of the comparators 447, 449 and 451 previously discussed, and hence will not be further discussed.

In retrospect it can be seen that the seven comparators 447, 449, 451, 453, 455, 457 and 459 basically comprise three comparator groups which are respectively related to three different sets of limits of angular rotations of the neighboring minutiae pairs, and hence of the RIV-A and RIV-B that are being compared. The first comparator group is comprised of comparators 447, 453 and 455, which have their outputs applied to the inputs of positive (+) bias AND gate 461. The second comparator group is comprised of comparators 449, 453 and 457, which have their outputs applied to the inputs of zero (0) bias AND gate 463. The third comparator group is comprised of comparators 451, 453 and 459, which have their outputs applied to the inputs of negative (−) bias AND gate 465. It should be noted that the output of the comparator 453 (which just determines whether or not the radial mismatch $\Delta r$ between the two radii $r_A$ and $r_B$ is within the preselected threshold $T_r$) is commonly included in each of the three comparator groups. Hence, the output of the comparator 453 is applied to each of the AND gates 461, 463 and 465.

The remaining two inputs of each of the AND gates 461, 463 and 465 are the +, 0 or − angle biases, which relate to the angular rotation of the minutiae pair in $\phi$ and $\theta$.

If the RIV's A and B, that are being compared, are rotated with respect to each other, the neighboring minutiae within those RIV's are also rotated with respect to each other. If the angular mismatches $\Delta\phi$ and $\Delta\theta$ and radial mismatch $\Delta r$ of a neighboring minutiae pair being compared are all within the range limits of one of the above-defined groups of comparators, that associated group of comparators will develop 1 state outputs to enable the associated one of the AND gates 461, 463 and 465 to develop a 1 state output. For example, if the $\Delta\phi$, $\Delta r$ and $\Delta\theta$ mismatch signals of a compared pair of minutiae from RIV-A and RIV-B lie within the + bias range or threshold limits (i.e. $|\Delta\phi + \Delta\phi \text{ bias}| \leq T_\phi$, $\Delta r \leq T_r$, and $|\Delta\theta + \Delta\theta \text{ bias}| \leq T_\theta$) of the first comparator group, the comparators 447, 453 and 455 will develop 1 state output signals to enable AND gate 461 to develop a 1 state output. In a like manner each minutia of RIV-A is compared with each of the minutiae of RIV-B to cause one, or none, of the AND gates 461, 463 and 465 to develop an output.

The 1 state outputs of AND gates 461, 463 and 465 are added to the contents of + bias, 0 bias and − bias score accumulators 467, 469 and 471. Each of these score accumulators 467, 469 and 471 can be a 4-bit counter which is initially reset to a zero count by the "initiate RIV comparison" signal. Therefore, when pairs of neighboring minutiae from RIV-A and RIV-B have been compared, each of these score accumulators can have numbers in it from 0 to 8. In other words, an accumulated score of 0 means that none of the neighboring minutiae matched. Similarly, an accumulated score of 8 means that all of 8 minutiae in RIV-A matched all of 8 minutiae in RIV-B. If, as given before, there are 5 minutiae in RIV-A and seven minutiae in RIV-B, 5 would be the highest accumulated score that any of the accumulators could have. This would indicate that each of the 5 minutiae in RIV-A found a matching minutia in RIV-B. Finally, an intermediate score between a minimum and a maximum can also be accumulated. It can therefore be seen that, at the completion of the comparison of all of the possible pairs of neighboring minutiae from RIV's A and B, one of the accumulators 467, 469 and 471 will contain the largest or maximum accumulated score. Whichever one of the angular rotations of +8.4° (+ bias) 0° (0 bias) and −8.4° (− bias) of the comparator groups (447, 453, 455;

449, 453, 457; and 451, 453, 459) that is required to most closely align RIV-A with RIV-B will cause the associated one of the accumulators 467, 469 and 471 to develop that maximum accumulated score.

Let the 4-bit wide contents, or accumulated scores D, E and F, of the accumulators 467, 469 and 471 be respectively designated as D1–D4, E1–E4 and F1–F4. The accumulated scores of these accumulators 467, 469 and 471 are applied in parallel to a maximum score selector 473. After all of the possible pairs (i times j) of neighboring minutiae in RIV-A and RIV-B have been compared, the control circuit 435 generates a "select maximum score" signal. In response to this "select maximum score" signal, the selector 473 internally generates a 1 state "select D", "select E" or "select F" signal (to be explained) to select the maximum accumulated score from the outputs (D, E and F) of accumuators 467, 469 and 471 at that time. The maximum selected score is developed at the output of the selector 473 as the RIV match score $S_{AB}$, which quantitatively indicates the closeness of match for the RIV pair (RIV-A and RIV-B) that was compared. In addition, the 1 state "select D", "select E" or "select F" signal is applied to the coordinate transformation circuit 75 (FIG. 24) to determine the relative coordinate displacement and angular orientation between the RIV-A and RIV-B pair being compared at that time.

Figure 21:
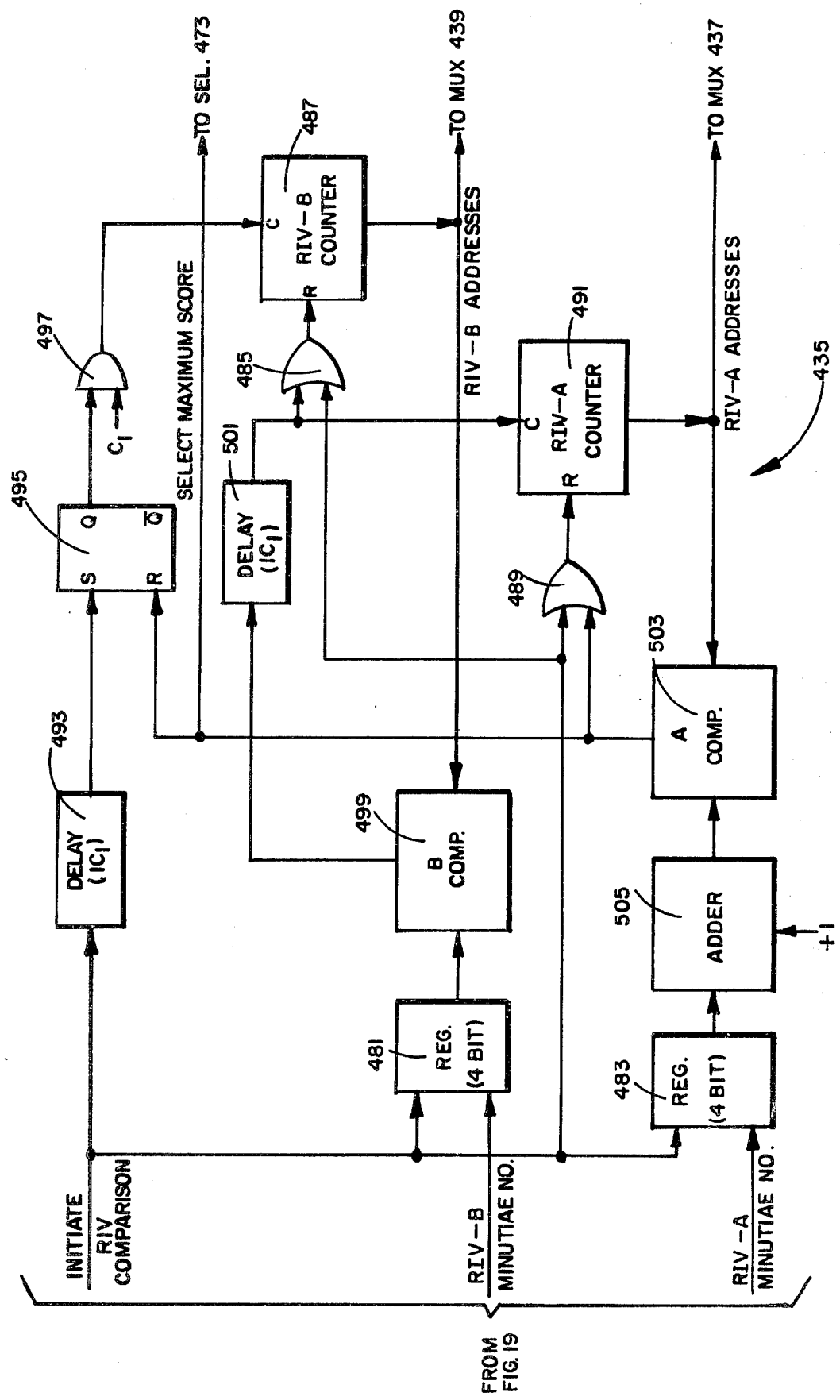
FIG. 21 is a block diagram of the control circuit of FIG. 20.

Referring now to FIG. 21, a block diagram of the control circuit 435 of FIG. 20 will now be discussed.

The initiate RIV comparison signal enables registers 481 and 483 to respectively parallel-store the RIV-B and RIV-A minutiae numbers. In addition, the initiate RIV comparison signal is applied through an OR gate 485 to reset an RIV-B counter 487 to a count of 0, and also through an OR gate 489 to reset an RIV-A counter 491 to a count of 0. The counts of the counters 487 and 491 are the RIV-B and RIV-A addresses, respectively, which are applied to the multiplexers 439 and 437 (FIG. 20). The counters 487 and 491 are reset to 0 counts because, it will be recalled, an RIV may have 0 neighboring minutiae. Finally, the initiate RIV comparison signal is applied through a delay circuit 493 to set a flip flop 495 to enable an AND gate 497 to pass $C_1$ clocks to the RIV-B counter 487. The delay time of the delay circuit 493 can be, for example, one $C_1$ clock period to allow sufficient time for the RIV-A and RIV-B minutiae numbers to be stored in the registers 481 and 483 and for each of the counters 487 and 491 to be reset to a count of 0 before the AND gate 497 is enabled to pass $C_1$ clocks.

In response to the $C_1$ clocks from the AND gate 497, the counter 487 starts incrementing its count to develop the RIV-B addresses which are applied to the multiplexer 439 (FIG. 20). These RIV-B addresses from the counter 487 are compared in a B comparator 499 with the RIV-B minutiae number stored in the register 481. When the RIV-B address becomes equal to the RIV-B minutiae number, the comparator 499 develops a 1 state output. This output of the comparator 499 is delayed by a delay circuit 501 for one $C_1$ clock period before it increments the RIV-A counter 491 from a count of 0 to a count of 1. The output of the delay circuit 501 is also applied through the OR gate 485 to reset the RIV-B counter 487 to a count of 0. Thus, it can be seen that, during the time that the RIV-A counter 491 is developing an RIV-A address of 0, the RIV-B counter 487 is developing a sequence of RIV-B addresses from 0 through the RIV-B minutiae number.

Through the above-described operation the RIV-B counter 487 counts $C_1$ clocks to periodically develop a sequence of RIV-B addresses from 0 through the RIV-B minutiae number. Each time that the RIV-B address becomes equal to the RIV-B minutiae number, the comparator 499 develops an output which is delayed by the delay circuit 501 before it is used to reset the RIV-B counter 487 to a count of 0, and to increment the RIV-A counter 491 to the next RIV-A address. In this manner, the RIV-A addresses are developed. As stated before, these RIV-A addresses are applied to the multiplexer 437 (FIG. 20). In addition, these RIV-A addresses from the counter 491 are applied to an A comparator 503.

An adder 505 sums the RIV-A minutiae number from the register 483 with a constant of 1 and applies the resultant sum (RIV-A minutiae number + 1) to the comparator 503. After all of the sequence of RIV-B addresses have been developed by the counter 487 during the time that the RIV-A address from counter 491 is equal to the RIV-A minutiae number, the output of the delay circuit 501 again increments the count of the counter 491 by 1. It is at this time that the RIV-A address from the counter 491 becomes equal to the sum (RIV-A minutiae number + 1) from the adder 505. As a consequence, the comparator 503 develops the "select maximum score" signal which is applied to the maximum score selector 473 (FIG. 20). Also, this "select maximum score" signal resets the flip flop 495 to disable the AND gate 497 in order to prevent any further $C_1$ clocks from being passed to the RIV-B counter 487. Furthermore, the "select maximum score" signal is applied through the OR gate 489 to reset the counter 491 to a count of 0 and terminate the "select maximum score" signal. At this time, both of the counters 487 and 491 have been reset to 0 counts and are developing RIV-B and RIV-A addresses of 0. Both of the counters 487 and 491 will remain reset to 0 counts, until the following "initiate RIV comparison" signal causes the control circuit 435 to repeat the above-described operation.

Figure 22:
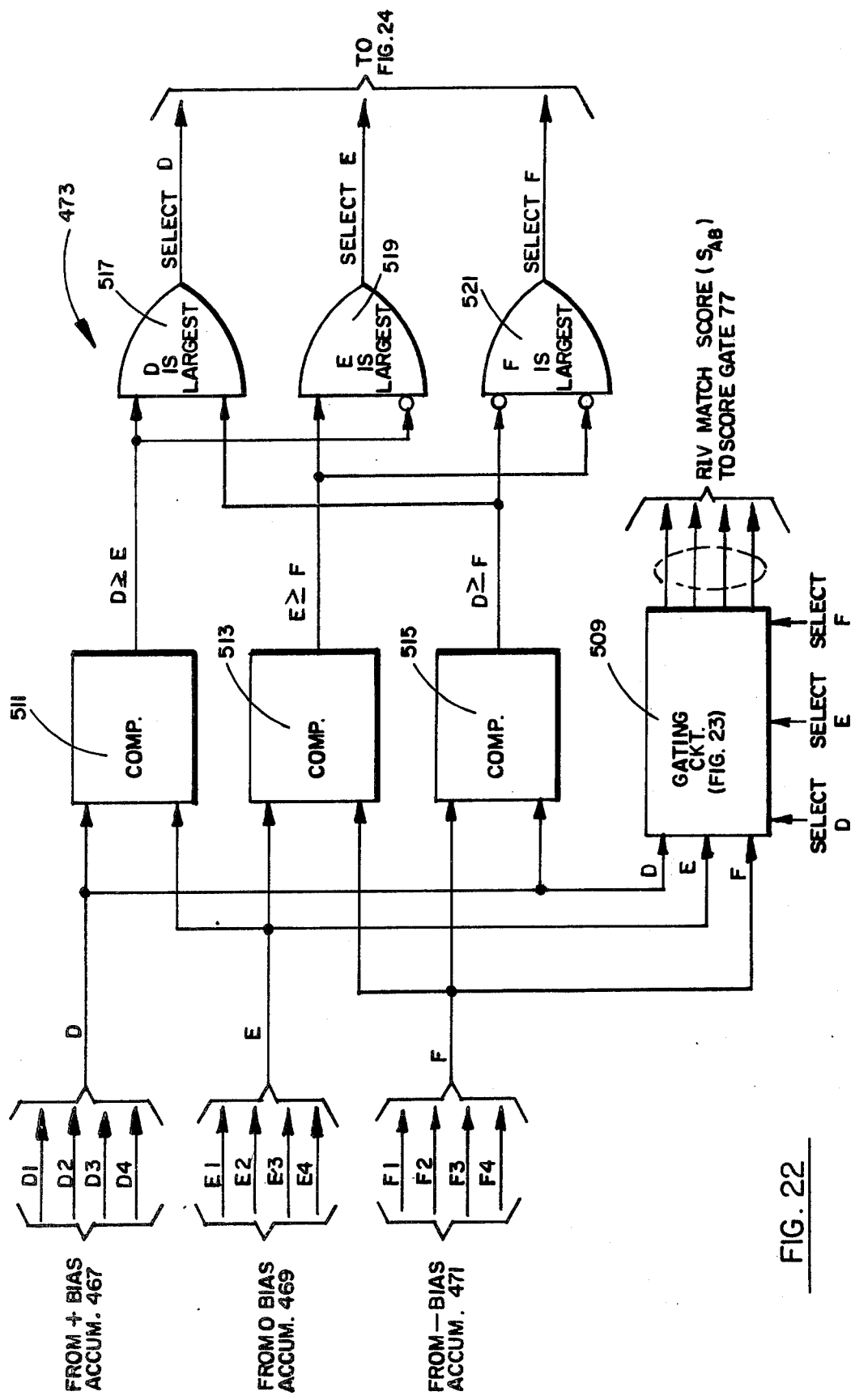
FIG. 22 is a block diagram of the maximum score selector of FIG. 20.

The block diagram of the maximum score selector 473 will now be discussed by referring to FIG. 22. Let the D1–D4, E1–E4 and F1–F4 outputs of the comparators 467, 469 and 471 be designated as D, E and F signals, respectively. All of these D, E and F signals are applied to the input of a gating circuit 509. Also, as shown in FIG. 22, a comparator 511 compares the D and E signals, a comparator 513 compares the E and F signals, and a comparator 515 compares the D and F signals. If $D \geq E$, the comparator 511 will develop a 1 state output. In a like manner, if $E \geq F$, the comparator 513 will develop a 1 state output. Similarly, if $D \geq F$, the comparator 515 will develop a 1 state output.

The outputs of the comparators 511 and 515 are applied to an AND gate 517. The outputs of the comparators 511 and 513 are respectively applied to inverted and non-inverted inputs of an AND gate 519. The outputs of the comparators 513 and 515 are applied to inverted inputs of an AND gate 521. The signal outputs of these AND gates 517, 519 and 521, which are all applied to the gating circuit 509, are respectively designated as "select D", "select E" and "select F". However, at any given time, only one of the "select D", "select E" and "select F" signals will be in a binary 1 state condition, with the other two signals being in 0 state conditions.

If D ≧ E and D ≧ F, the AND gate 517 will develop a 1 state "select D" signal to indicate that the D signal is the largest signal. A 1 state "select D" signal will enable the gating circuit 509 to select the D signal as the output RIV match score signal ($S_{AB}$).

If E ≧ F and E ≧ D, the AND gate 519 will develop a 1 state "select E" signal to indicate that the E signal is the largest signal. A 1 state "select E" signal will enable the gating circuit 509 to select the E signal as the output RIV match score signal.

If F ≧ E and F ≧ D, the AND gate 521 will develop a 1 state "select F" signal to indicate that the F signal is the largest signal. A 1 state "select F" signal will enable the gating circuit 509 to select the F signal as the output RIV match score signal. As indicated previously, the RIV match score signal $S_{AB}$ is applied to the score gate 77 (FIG. 5).

Figure 23:
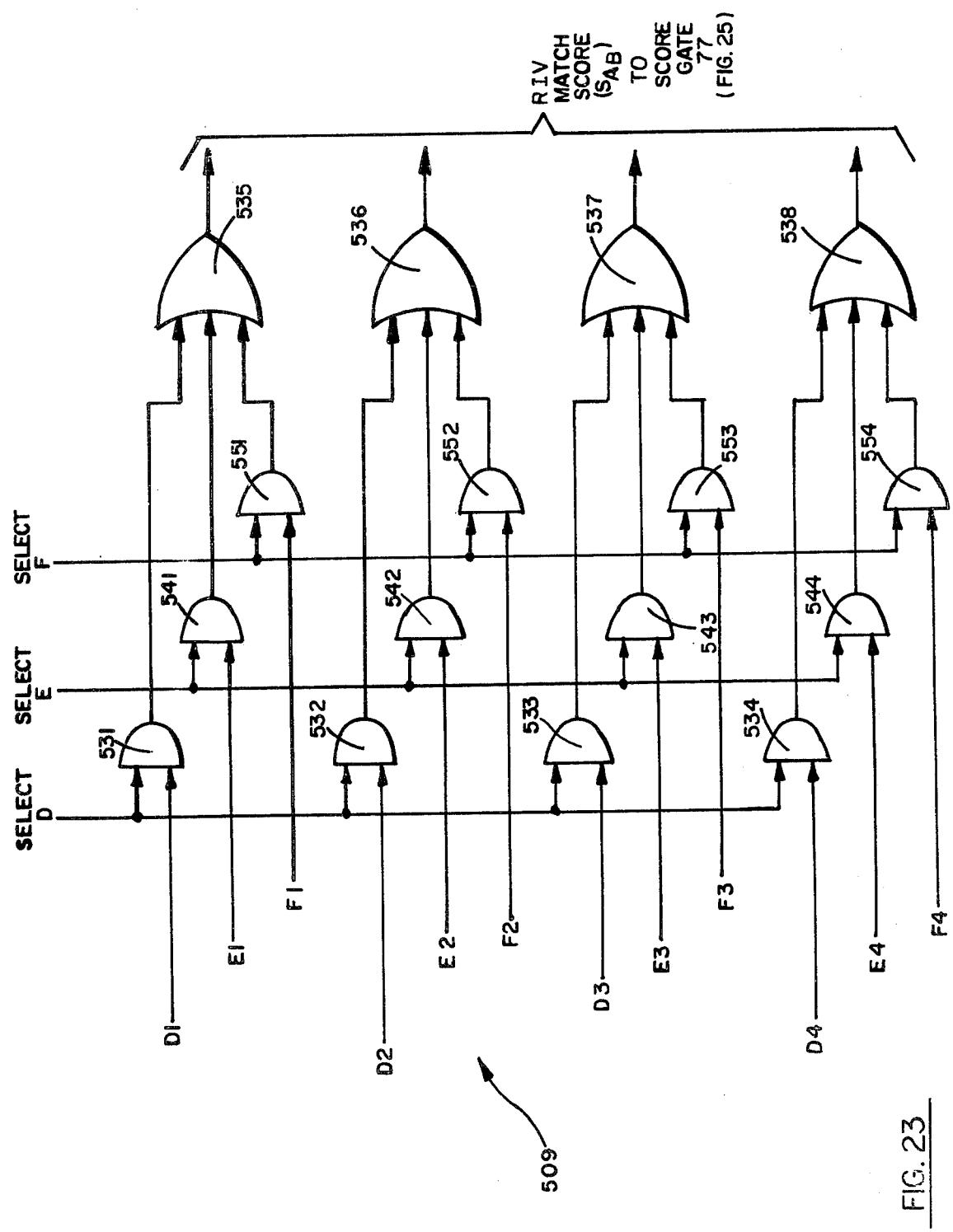
FIG. 23 is a block diagram of the gating circuit of FIG. 22.

The operation of the gating circuit 509 will now be explained by referring to its block diagram illustrated in FIG. 23.

The D1-D4 bits from the + bias score accumulator 467 (FIG. 20) are respectively applied to the lower inputs of a bank of AND gates 531-534. The "select D" signal from AND gate 517 (FIG. 22) is applied to the upper inputs of the AND gates 531-534. A 1 state "select D" signal will enable the AND gates 531-534 to pass the D1-D4 bits through OR gates 535-538 as the RIV match score signal.

In a like manner, the E1-E4 bits from the 0 bias score accumulator 469 (FIG. 20) are respectively applied to the lower inputs of a bank of AND gates 541-544. The "select E" signal from AND gate 519 (FIG. 22) is applied to the upper inputs of the AND gates 541-544. A 1 state "select E" signal will enable the AND gates 541-544 to pass the E1-E4 bits through the OR gates 535-538 as the RIV match score signal.

Similarly, the F1-F4 bits from the -bias score accumulator 471 (FIG. 20) are respectively applied to the lower inputs of a bank of AND gates 551-554. The "select F" signal from AND gate 521 (FIG. 22) is applied to the upper inputs of the AND gates 551-554. A 1 state "select F" signal will enable the AND gates 551-554 to pass the F1-F4 bits through the OR gates 535-538 as the RIV match score signal.

Thus, that one of the "select D", "select E" and "select F" signals, which is in a 1 state condition, will determine which bank of AND gates 531-534, 541-544 and 551-554 is selected to pass the associated one of the outputs of the score accumulators 467, 469 and 471 (FIG. 20) out as the RIV match score $S_{AB}$.

Figure 24:
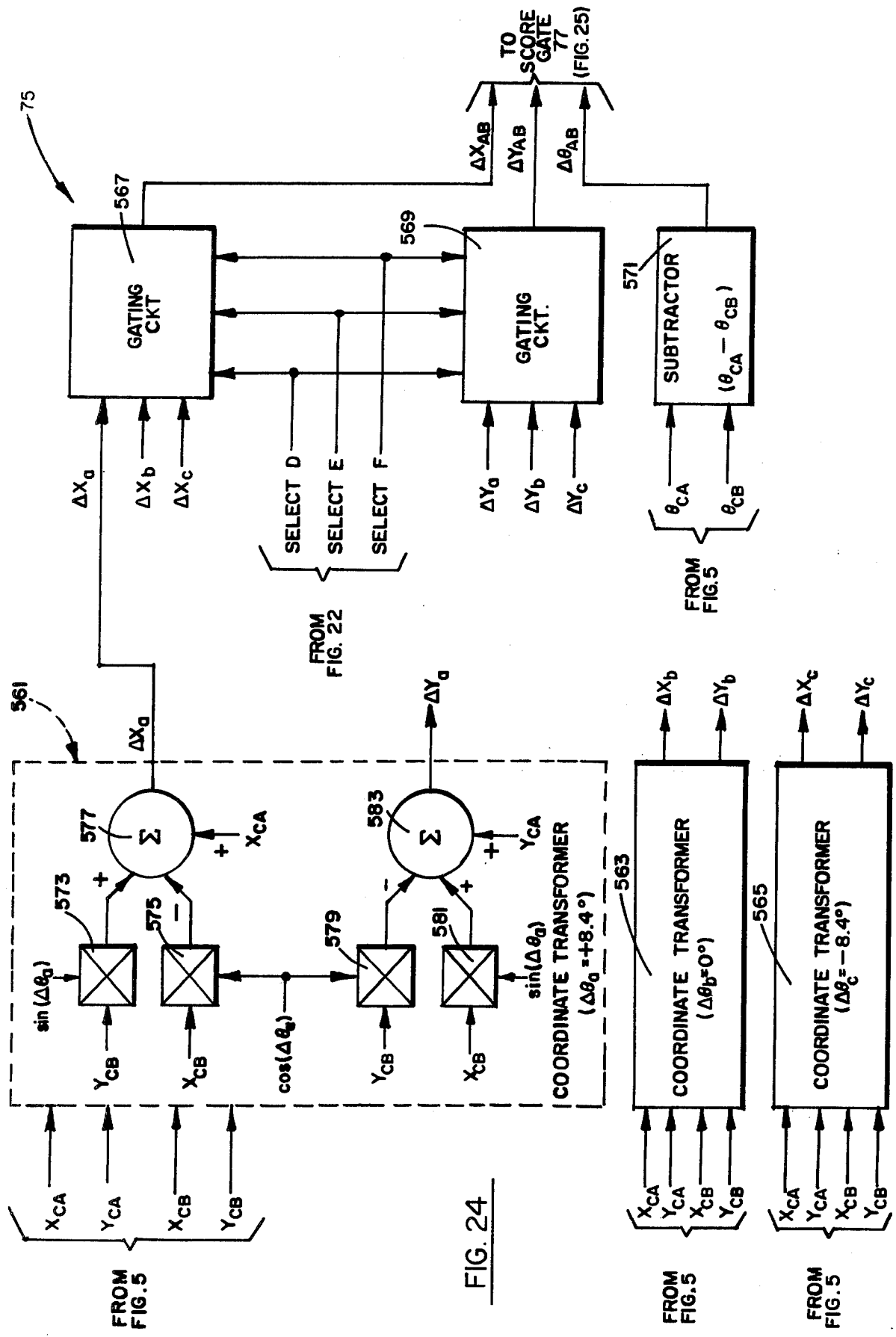
FIG. 24 is a block diagram of the coordinate transformation circuit of FIG. 5.

Referring now to FIG. 24, a block diagram of the coordinate transformation circuit 75 (FIG. 5) is illustrated. As illustrated, the circuit 75 is comprised of coordinate transformers 561, 563 and 565, gating circuits 567 and 569, and a subtractor 571.

The X and Y coordinates of each of the center minutiae of RIV-A and RIV-B ($X_{CA}$, $Y_{CA}$ and $X_{CB}$, $Y_{CB}$) are applied to each of the coordinate transformers 561, 563 and 565. In response to these $X_{CA}$, $Y_{CA}$, $X_{CB}$ and $Y_{CB}$ inputs and to internally developed constants sin ($\Delta\theta$) and cos ($\Delta\theta$), each of the transformers 561, 563 and 565 develops the following conventional coordinate transformer equations for $\Delta X$ and $\Delta Y$:

$$\Delta X = X_{CA} + Y_{CB} \sin (\Delta\theta) - X_{CB} \cos (\Delta\theta) \quad (1)$$

$$\Delta Y = Y_{CA} - Y_{CB} \cos (\Delta\theta) - X_{CB} \sin (\Delta\theta) \quad (2)$$

However, a different angle or angular mismatch ($\Delta\theta$) is used in each of the transformers 561, 563 and 565 to generate different sine and cosine functions.

Let $\Delta\theta_a$, $\Delta\theta_b$ and $\Delta\theta_c$ be respectively used in the transformers 561, 563 and 565 to generate these sine and cosine functions, where $\Delta\theta_a = +8.4°$, $\Delta\theta_b = 0°$ and $\Delta\theta_c = -8.4°$. It should be noted that these angles $\Delta\theta_a$, $\Delta\theta_b$, $\Delta\theta_c$ correspond in degrees to the $+\Delta\theta$ bias, $0\Delta\theta$ bias and $-\Delta\theta$ bias angles which were respectively applied to the comparators 455, 457 and 459 in the RIV comparator circuit of FIG. 20.

Since different $\Delta\theta$ angles are used by the transformers in the generation of the sine and cosine functions, let the X and Y coordinate displacement outputs of the transformer 561 be designated as $\Delta X_a$ and $\Delta Y_a$. Similarly, let the X and Y coordinate displacement outputs of the transformers 563 and 565 be respectively designated as $\Delta X_b$, $\Delta Y_b$ and $\Delta X_c$, $\Delta Y_c$. In this way three different sets of coordinate displacements are generated for the three different angles or angular rotations ($\Delta\theta_a$, $\Delta\theta_b$, $\Delta\theta_c$) of the center minutiae of the RIV pair being compared at that time. However, it should be noted that, in the above-described description of FIG. 20, angles different in size, number or both size and number could be used, which could necessitate a corresponding modification of the structure of FIG. 20. For example, if five different angles (or angular rotations) were used, five different comparator groups with associated circuits would be required in FIG. 20 and five different coordinate transformers would be required in the coordinate transformation circuit 75 of FIG. 24.

The X coordinate displacements $\Delta X_a$, $\Delta X_b$ and $\Delta X_c$ are applied to the gating circuit 567, while the Y coordinate displacements $\Delta Y_a$, $\Delta Y_b$ and $\Delta Y_c$ are applied to the gating circuit 569. These gating circuits 567 and 569 are similar in structure and operation to the gating circuit 509 illustrated in FIG. 23 and, hence, will not be further described.

In response to the 1 state "select D", "select E" or "select F" signal from the maximum score selector circuit 473 (FIG. 22), the gating circuits 567 and 569 select an associated pair of coordinate displacement signals as the output coordinate displacement signals, $\Delta X_{AB}$ and $\Delta Y_{AB}$. For example, when the "select D" signal is in a 1 state condition, $\Delta X_a$ and $\Delta Y_a$ are selected as the output $\Delta X_{AB}$ and $\Delta Y_{AB}$ signals. Similarly, a 1 state "select E" signal enables the gating circuits 567 and 569 to select the 0° coordinate displacements $\Delta X_b$ and $\Delta Y_b$. Likewise, a 1 state "select F" signal enables the gating circuits 567 and 569 to select the −8.4° coordinate displacements $\Delta X_c$ and $\Delta Y_c$.

The orientation angle difference $\Delta\theta_{AB}$, between the orientation angles $\theta_{CA}$ and $\theta_{CB}$ of the center minutiae of RIV's A and B, is obtained by subtracting $\theta_{CB}$ from $\theta_{CA}$ in the subtractor 571. In this way the following third coordinate transformer equation is derived:

$$\Delta\theta_{AB} = \theta_{CA} - \theta_{CB} \quad (3)$$

The operation of a coordinate transformer will be explained in more detail by referring back to the transformer 561. A multiplier 573 multiplies the input signals $Y_{CB}$ and sin ($\Delta\theta_a$) together to develop the product signal $Y_{CB}$ sin ($\Delta\theta_a$). Another multiplier 575 multiplies the input signals $X_{CB}$ and cos ($\Delta\theta_a$) together to develop the product signal $X_{CB}$ cos ($\Delta\theta_a$). Within a combiner or summation circuit 577, the product signal $X_{CB}$ cos ($\Delta\theta_a$) is subtracted from the sum of input signal $X_{CA}$ and the product signal $Y_{CB} \sin(\Delta\theta_a)$ to develop the X coordinate displacement signal $\Delta X_a$, whose value is given by equation (1) above. Similarly, a multiplier 579 multiplies the input signals $Y_{CB}$ and $\cos(\Delta\theta_a)$ together to develop the product signal $Y_{CB} \cos(\Delta\theta_a)$, while a multiplier 581 multiplies the input signals $X_{CB}$ and $\sin(\Delta\theta_a)$ together to develop the product signal $X_{CB} \sin(\Delta\theta_a)$. Within a combiner 583, the sum of the product signals $Y_{CB} \cos(\Delta\theta_a)$ and $X_{CB} \sin(\Delta\theta_a)$ is subtracted from input signal $Y_{CA}$ to develop the Y coordinate displacement signal $\Delta Y_a$, whose value is given by equation (2) above.

When the angle $\Delta\theta_a$ is set equal to $+8.4°$ in the coordinate transformer 561, the values $\Delta X_a$ and $\Delta Y_a$ are respectively given by equations (4) and (5) below.

$$\Delta X_a = X_{CA} + Y_{CB}\sin(+8.4°) - X_{CB}\cos(+8.4°) \quad (4)$$

$$\Delta Y_a = Y_{CA} - Y_{CB}\cos(+8.4°) - X_{CB}\sin(+8.4°) \quad (5)$$

Similarly, when $\Delta\theta_b$ is set equal to 0° in the coordinate transformer 563, the values $\Delta X_b$ and $\Delta Y_b$ are respectively given by equations (6) and (7) below.

$$\Delta X_b = X_{CA} - X_{CB} \quad (6)$$

$$\Delta Y_b = Y_{CA} - Y_{CB} \quad (7)$$

Finally, when $\Delta\theta_c$ is set equal to $-8.4°$ in the coordinate transformer 565, the values $\Delta X_c$ and $\Delta Y_c$ are respectively given by equations (8) and (9) below.

$$\Delta X_c = X_{CA} + Y_{CB}\sin(-8.4°) - X_{CB}\cos(-8.4°) \quad (8)$$

$$\Delta Y_c = Y_{CA} - Y_{CB}\cos(-8.4°) - X_{CB}\sin(-8.4°) \quad (9)$$

The X and Y coordinate displacements $\Delta X_{AB}$ and $\Delta Y_{AB}$ and the orientation angle displacement $\Delta\theta_{AB}$ represent the coordinate system transformation that is needed to line up the center minutiae of the compared RIV's A and B with each other. These displacement signals $\Delta X_{AB}$, $\Delta Y_{AB}$ and $\Delta\theta_{AB}$ are applied to the score gate 77 (FIG. 5), which will now be discussed by referring to FIG. 25.

Figure 25:
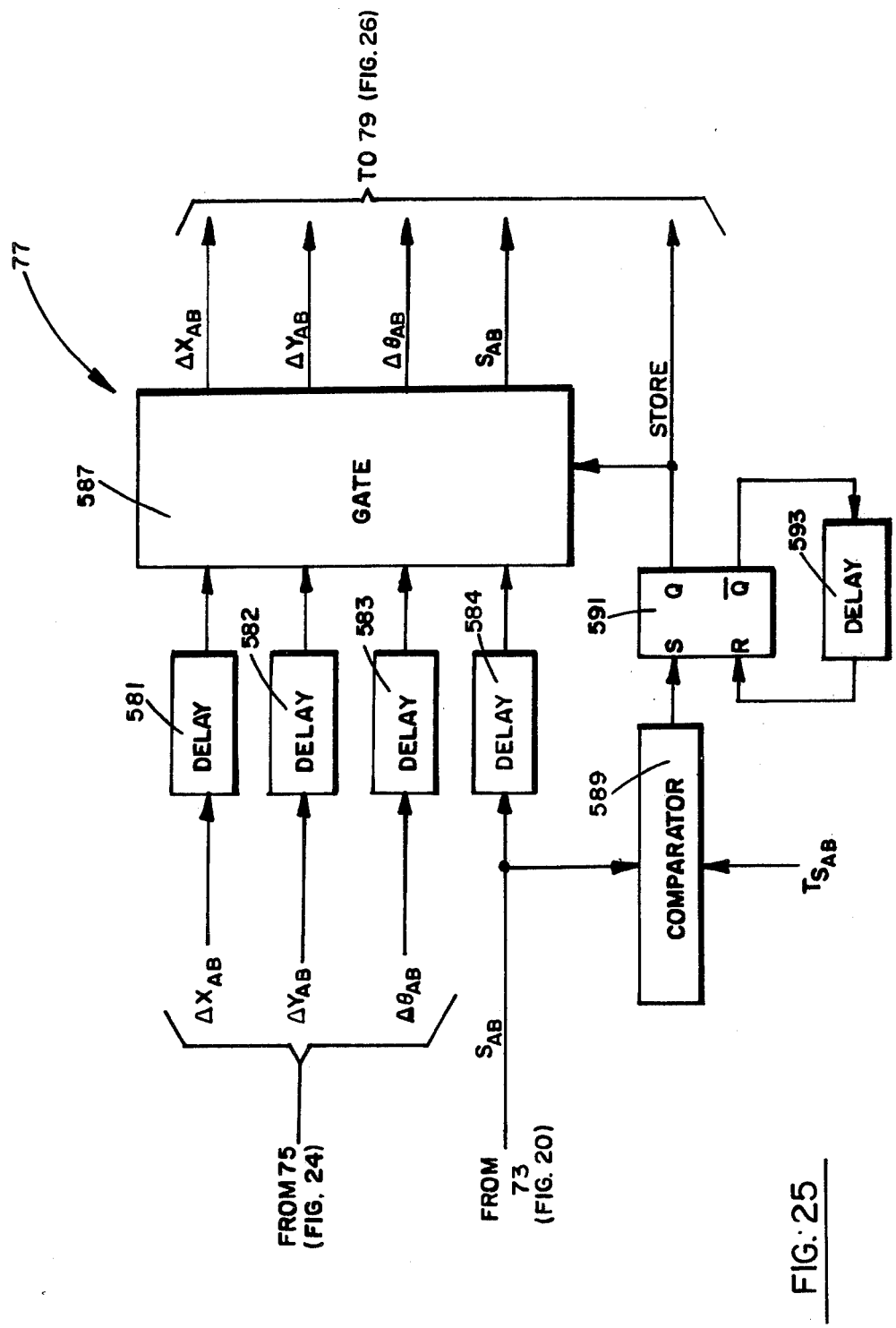
FIG. 25 is a block diagram of the score gate of FIG. 5.

As shown in FIG. 25, the displacement signals $\Delta X_{AB}$, $\Delta Y_{AB}$ and $\Delta\theta_{AB}$ from the coordinate transformation circuit 75 (FIG. 24) and the RIV match score signal $S_{AB}$ from the RIV comparison circuit 73 (FIG. 20) of the match comparator 41 (FIG. 5) are respectively parallel-applied through delay circuits 581-584 to a common gate 587. The delay time of each of the delay circuits 581-584 can be one $C_1$ clock period, for example. The gate 587 can be comprised of four banks or pluralities of two-input AND gates (not shown) for the four input signals, with the bits in each input signal being applied to first inputs of the AND gates in the associated bank.

The signal $S_{AB}$ from the comparison circuit 73 (FIG. 20) is also compared with a threshold signal $T_{S_{AB}}$ in a comparator 589. It should be recalled that the match score $S_{AB}$ is computed from the number of minutiae in RIV-A that find a mate in RIV-B. The amplitude of the threshold signal $T_{S_{AB}}$ is preselected such that two or more neighboring minutiae in RIV's A and B must match before the match score $S_{AB}$ is greater in amplitude than the signal $T_{S_{AB}}$. If $S_{AB}$ is greater than the threshold signal $T_{S_{AB}}$, the comparator 589 develops an output to set a flip flop 591. When set, the flip flop 591 enables all of the second inputs of all of the AND gates in gate 587 to pass the $\Delta X_{AB}$, $\Delta Y_{AB}$, $\Delta\theta_{AB}$ and $S_{AB}$ signals into the score list register 79 (FIG. 5) for storage therein. The output of the flip flop 591 is also suitably delayed by a delay circuit 593 before it resets the flip flop 591 to disable all of the AND gates in the gate 587. The delay time of the delay circuit 593 can be, for example, equal to two $C_1$ clock periods to provide sufficient time for the gate 587 to develop its four outputs.

If the amplitude of the RIV match score $S_{AB}$ is equal to or less than the threshold signal $T_{S_{AB}}$, the flip flop 591 will remain in a reset state and the gate 587 will be prevented from passing the outputs of the match comparator 41 (FIG. 5) to the score list register 79 (FIG. 5).

Figure 26:
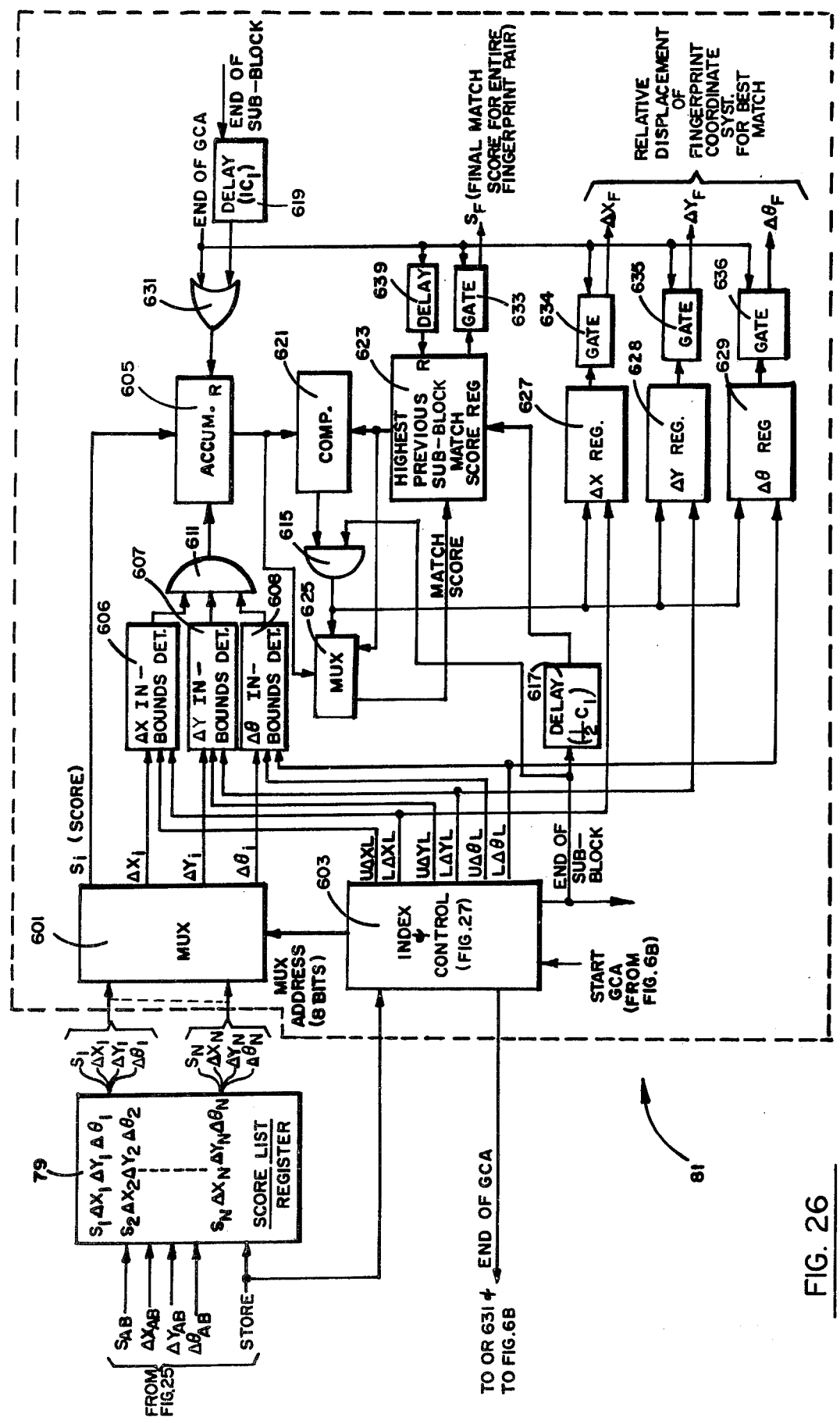
FIG. 26 is a block diagram of the global coherency analyzer of FIG. 5.

Referring now to FIG. 26, the score list register 79 and a block diagram of the global coherency analyzer 81 of FIG. 5 are illustrated. Each time that a "store" signal is generated by the score gate 77 (FIG. 25), the associated RIV match score $S_{AB}$ and displacement signals $\Delta X_{AB}$, $\Delta Y_{AB}$ and $\Delta\theta_{AB}$ are passed through the score gate 77 and parallel-stored in the score list register 79. The score list register 79 contains the match scores ($S_i$) and associated displacements ($\Delta X_i$, $\Delta Y_i$, $\Delta\theta_i$) of the two coordinate systems (between the two fingerprints being compared) for each pair of RIV's A and B that satisfy the conditions of the match comparator 41 (FIG. 5) and score gate 77 (FIG. 5), where i = from 1 to N RIV pair comparisons. For this description, N can be a number up to 192. While in principle $192^2$ such scores might result, this preferred embodiment recognizes that in typical use the vast majority of RIV pair comparisons will not yield a "store" signal. Accordingly only 192 positions in score list register 79 suffice to buffer store these scores. The contents ($S_1$, $\Delta X_1$, $\Delta Y_1$, $\Delta\theta_1$ through $S_N$, $\Delta X_N$, $\Delta Y_N$, $\Delta\theta_N$) of the score list register 79 are applied in parallel to the input of a multiplexer 601 in the global coherency analyzer 81.

The overall function of the analyzer 81 is to locate the densest region in $\Delta X$, $\Delta Y$, $\Delta\theta$ space of the match score and displacement data stored in the score list register 79. With respect to this $\Delta X$, $\Delta Y$, $\Delta\theta$ space, it has been previously stated that each $\Delta X$, $\Delta Y$, $\Delta\theta$ entry represents the X, Y coordinate displacement and angular rotation of the two coordinate systems of an RIV pair from which this result was derived.

To aid in understanding how the global coherency analyzer 81 locates the densest region in $\Delta X$, $\Delta Y$, $\Delta\theta$ space of the contents of register 79, let the $\Delta X$, $\Delta Y$, $\Delta\theta$ space components be respectively represented by the three orthogonal axes of a cube. Let each of the $\Delta X$, $\Delta Y$ and $\Delta\theta$ axes of the cube be 256 units long. Divide the 256 units along each of the $\Delta X$ and $\Delta Y$ axes into 8 sections of 32 units each, and divide the 256 units along the $\Delta\theta$ axis into 128 sections of 2 units each. As a result, the cube will be divided into 8192 sub-blocks (8 times 8 times 128) with each sub-block being 32 units long in the $\Delta X$ direction, 32 units wide in the $\Delta Y$ direction and 2 units deep in the $\Delta\theta$ direction.

An index and control circuit 603 counts the "store" signals to determine the number of significant RIV match scores $S_i$ that are stored in the store list register 79. After all of the significant RIV match scores $S_i$ and their associated displacements $\Delta X_i$, $\Delta Y_i$, $\Delta\theta_i$ have been stored in the register 79, the "start GCA" signal from the timing and control circuit 83 (FIG. 5) is applied to the index and control circuit 603. The "start GCA" signal enables the index and control circuit 603 to start sequentially applying multiplexer addresses 1-N to the multiplexer 601. In response to each of the 1-N addresses, the multiplexer 601 respectively applies the $S_i$, $\Delta X_i$, $\Delta Y_i$ and $\Delta\theta_i$ components (of the addressed entry from register 79) to an accumulator 605 and $\Delta X$, $\Delta Y$ and $\Delta\theta$ in-bounds detectors or comparators 606–608. During each period of time that the circuit 603 is developing all of the 1-N multiplexer addresses, the circuit 603 is also generating one of 8192 sets of the following lower (L) and upper (U) displacement (D) limits in $\Delta X$, $\Delta Y$, $\Delta\theta$ space: L$\Delta$XD and U$\Delta$XD, L$\Delta$YD and U$\Delta$YD, L$\Delta\theta$D and U$\Delta\theta$D. The $\Delta X$, $\Delta Y$ and $\Delta\theta$ displacement limits (L$\Delta$XD and U$\Delta$XD; L$\Delta$YD and U$\Delta$YD; L$\Delta\theta$D and U$\Delta\theta$D) are respectively applied to the detectors 606–608.

Each of the detectors 606–608 is implemented to develop a 1 state output if the value of the associated one of the $\Delta X_i$, $\Delta Y_i$ and $\Delta\theta_i$ components is between the associated upper and lower displacement limits, or equal to its upper displacement limit. For example, with $\Delta Y$ displacement limits of 64 and 96, the detector 607 will develop a 1 state output for each $\Delta Y_i$ signal that is equal to any VALUE within the range 65–96, including 96 but not 64.

Each of the 8192 sets of displacement limits corresponds to the limits or boundaries for an associated one of the 8192 sub-blocks in the cube previously discussed. For example, the circuit 603 can develop lower and upper displacement limits in each of $\Delta X$ (L$\Delta$XD and U$\Delta$XD) and $\Delta Y$ (L$\Delta$YD and U$\Delta$YD) of: 0 and 32, 32 and 64, 64 and 96, 96 and 128, 128 and 160, 160 and 192, 192 and 224, and 224 and 256. Likewise the circuit 603 can develop lower and upper displacement limits in $\Delta\theta$ (L$\Delta\theta$D and U$\Delta\theta$D) of: 0 and 2, 2 and 4, 4 and 6, ... 254 and 256.

During the period of time that one of the 8192 sets of $\Delta X$, $\Delta Y$, $\Delta\theta$ displacement limits for a sub-block is applied to the detectors 606–608, all of the N sets of coordinates ($\Delta X_i$, $\Delta Y_i$, $\Delta\theta_i$) stored in the register 79 are sequentially multiplexed out to the detectors 606–608. Thus, the detectors 606–608 will determine if any of the N sets of $\Delta X_i$, $\Delta Y_i$, $\Delta\theta_i$ coordinates are in the sub-block being examined at that time. If the coordinates ($\Delta X_i$, $\Delta Y_i$, $\Delta\theta_i$) of a score $S_i$ are within the sub-block being examined, all of the detectors 606–608 will generate 1 state signals, which are AND gated by AND gate 611 to enable the accumulator 605 to add to its contents the score $S_i$ associated with those coordinates.

After all of the N entries ($S_i$, $\Delta X_i$, $\Delta Y_i$, $\Delta\theta_i$) in the register 79 have been processed, the index and control circuit 603 generates an "end of sub-block" signal. The "end of sub-block" signal is applied to the lower input of an AND gate 615, and also applied to the inputs of delay circuits 617 and 619 which have delay times of $\frac{1}{2}$ $C_1$ and 1 $C_1$ clock periods, respectively. At this time the accumulated total (or present match score) of the accumulator 605 is indicative of the degree of match between fingerprints A and B in that sub-block of $\Delta X$, $\Delta Y$, $\Delta\theta$ space that was examined. The present match score from accumulator 605 is compared in a comparator 621 with the "highest previous sub-block match score" that is stored in register 623. The match scores from the accumulator 605 and register 623 are also applied to a multiplexer 625.

If, at the time of the "end of sub-block" signal, the present match score from accumulator 605 is higher than the highest previous match score from the register 623, the comparator 621 will apply a 1 state signal through the enabled AND gate 615 to enable the multiplexer 625 to apply the present match score to the input of the register 623. Conversely, if the output of the register 623 is higher than the output of the accumulator 605, the comparator 621 will develop a 0 state output. In this case the resultant 0 state output of the AND gate 615 will cause the multiplexer 625 to apply the highest previous match score to the input of the register 623.

A 1 state output from the AND gate 615 also enables $\Delta X$, $\Delta Y$ and $\Delta\theta$ registers 627, 628 and 629 to replace the previously stored L$\Delta$XD, L$\Delta$YD and L$\Delta\theta$D coordinates of a previously sub-block by now respectively storing the L$\Delta$XD, L$\Delta$YD and L$\Delta\theta$D coordinates of the sub-block being examined at that time.

After a delay of $\frac{1}{2}$ $C_1$ clock period, the delay circuit 617 applies the "end of sub-block" signal to the register 623. By this time the match score input to the register 623 has stabilized. This delayed "end of sub-block" signal from the delay circuit 617 enables the register 623 to store the match score output of the mutliplexer 625.

After a delay of 1 $C_1$ clock period, the delay circuit 619 applies the "end of sub-block" signal through an OR gate 631 to reset the accumulator 605 to a 0 count.

The above operation is performed 8192 times. Thus, all of the coordinate entries ($\Delta X_i$, $\Delta Y_i$, $\Delta\theta_i$) in the score list register 79 are examined to determine how many are in each of the 8192 sub-blocks of the exemplary cube. At the end of these 8192 passes through the 8192 sub-blocks of the cube, the index and control circuit 603 generates the "end of GCA" signal. This "end of GCA" signal passes through the OR gate 631 to reset the accumulator 605 to a 0 count, and enables 633–636 to respectively pass the contents of the register 623 and 627–629 out as the system outputs. The gate 633 develops $S_F$, the final match score which indicates the degree of match between the two fingerprints A and B. The gates 634–636 respectively develop $\Delta X_F$, $\Delta Y_F$ and $\Delta\theta_F$, the relative displacements of the A and B fingerprint coordinate systems that produces the best match between the fingerprints.

The "end of GCA" signal is suitably delayed by a delay circuit 639 for, for example, a 1 $C_1$ clock period before it resets the register 623 to a 0 count in order to terminate that fingerprint pair comparison.

It should be pointed out at this time that N (where N = the number of entries in the score list register 79) is the maximum number of the 8192 sub-blocks in the cube that will be occupied, or develop match scores in the accumulator 605. Furthermore, this dispersion in $\Delta X$, $\Delta Y$, $\Delta\theta$ space would only occur if the fingerprints A and B were totally dissimilar. On the other hand, with a perfect match between fingerprints A and B all of the entries in the register 79 would be located within the same sub-block of $\Delta X$, $\Delta Y$, $\Delta\theta$ space. However, even if two fingerprints are derived from the same finger, false, missing or distorted minutiae can cause a dispersion of the entries in the register 79 over a number of the sub-blocks in $\Delta X$, $\Delta Y$, $\Delta\theta$ space. For this reason the global coherency analyzer 81 of FIG. 26 determines the final match score, as described above, by locating the densest region in $\Delta X$, $\Delta Y$, $\Delta\theta$ space of the entries in the register 79.

Figure 27:
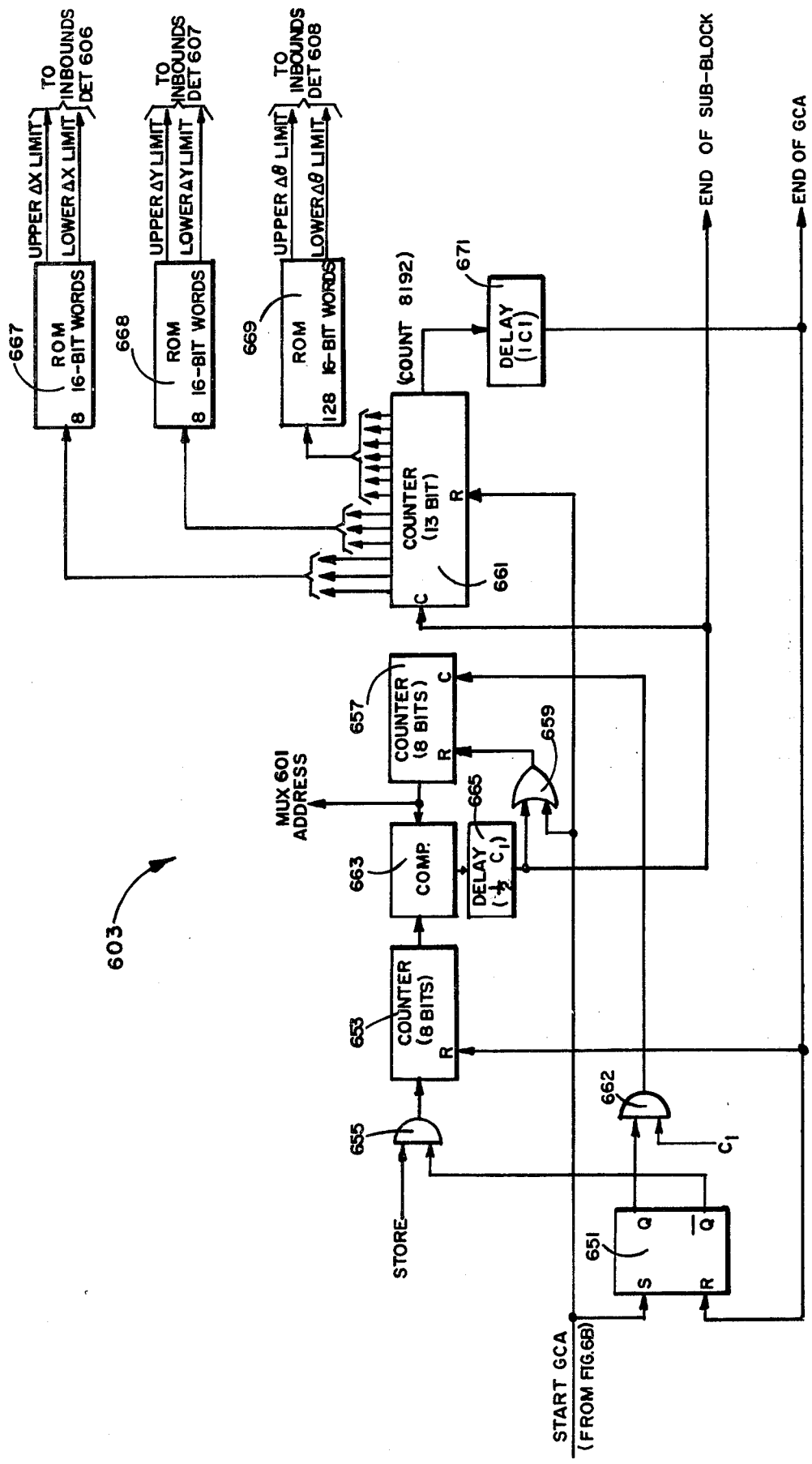
FIG. 27 is a block diagram of the index and control circuit of FIG. 26.

Referring now to FIG. 27, a block diagram of the index and control circuit 603 (FIG. 26) is illustrated. Initially, a flip flop 651 is in a reset state and a counter 653 has been reset to a 0 count. In its reset state the Q side of the flip flop 651 enables an AND gate 655 to pass "store" pulses to the counter 653 to be counted. After all of the "store" signals have been counted, a "start GCA" signal resets a counter 657 to a 0 count by way of an OR gate 659 and directly resets a counter 661 to a 0 count. In addition, the "start GCA" signal sets the flip flop 651 to disable the AND gate 655 and to enable an AND gate 662. When enabled the AND gate 662 passes $C_1$ clocks to the counter 657 to be counted.

Each time that the couter 657 counts a $C_1$ clock, it develops and applies a different multiplexer address to the multiplexer 601 (FIG. 26). The multiplexer address is also compared in a comparator 663 with the output "store" count of the counter 653. When the multiplexer address becomes equal to the number of "store" signals counted by the counter 653, the comparator 663 develops a 1 state output. One half of 1 $C_1$ clock period after receiving the output of the comparator 663, a delay circuit 665 develops an "end of sub-block" signal. This allows the counter 657 to generate all of the multiplexer addresses before the "end of sub-block" signal is applied through the OR gate 659 to reset the counter 657 to a 0 count. In addition, the "end of sub-block" signal increments the counter 661 by 1. Therefore, it can be seen that the counter 657 develops muliplexer addresses from 1 through N before being reset to 0 by the "end of sub-block" signal, and then cylically repeats this operation.

The counter 661, which can be a 13-bit counter, counts the "end of sub-block" signals in order to develop output counts from 1 through 8192. The first 3 bits of each output 13-bit count are applied to a read only memory (ROM) 667 to select 1 of 8 sixteen-bit words which establish the lower and upper $\Delta X$ displacement limits that are applied to the $\Delta X$ in-bounds detector 606 (FIG. 26). The next 3 bits of each output 13-bit count are applied to a ROM 668 to select 1 of 8 sixteen-bit words which establish the lower and upper $\Delta Y$ displacement limits that are applied to the $\Delta Y$ in-bounds detector 607 (FIG. 26). Finally, the last 7 bits of each output 13-bit count are applied to a ROM 669 to select 1 of 128 sixteen-bit words which establish the lower and upper $\Delta \theta$ displacement limits that are applied to the $\Delta \theta$ in-bounds detector 608. In this manner, the previously discussed coordinates in $\Delta X$, $\Delta Y$, $\Delta \theta$ space are determined for each of the 8192 sub-blocks in the exemplary cube.

Upon reaching a count of 8192, the counter 661 develops a "count 8192" signal which is applied to a delay circuit 671. One $C_1$ clock period after receiving the "count 8192" signal, the delay circuit 671 develops an "end of global coherency analysis" (end of GCA) signal, which resets the flip flop 651 and resets the counter 653 to a 0 count. This "end of GCA" signal is also available as an output signal to permit use of the final match score $S_F$ in an overall system of which the RIV matcher is one component, and either sets "wait" flip flop 96 (FIG. 6B) to prepare for a new unknown FP-A, as shown in FIG. 6B, or leaves the control decision up to the overall system which may choose to read additional FP-B's from the file for comparison by setting flip flop 112 in FIG. 6B.

The index and control circuit 603 remains in this quiescent state of operation until another fingerprint pair comparison subsequently develops "store" pulses to be counted by the counter 653.

The invention thus provides, as disclosed in the illustrated embodiment, a system for automatically determining whether or not two fingerprints match each other by automatically determining how each and every local region of minutiae, described in an RIV format, of one fingerprint matches with each and every local region of minutiae of another fingerprint, and then putting all of these interim results together in a three coordinate space in order to obtain a global picture of the degree of match between the two fingerprints.

While the salient features have been illustrated and described with respect to a fingerprint minutiae pattern matcher, it should be understood that the invention is generally applicable to any minutiae pattern matching application. Basically, the RIV matching algorithm of the invention is intended to produce a numerical measure of the similarity between two patterns, where each pattern has been described by a set of minutiae and each minutia is described by its position and orientation. These minutiae can be very broadly defined as significant repeatable characteristics of the patterns to be compared. For example, roads, buildings, intersections, hills, mountains, lakes, monuments, etc., in an aerial scene or ridge endings, islands, dots, bifurcations, trifurcations, etc., in a fingerprint pattern. The RIV matching algorithm of this invention is especially useful when the patterns to be matched have undergone some significant distortion and variations. For example, the number of minutiae may vary as a result of cloud cover (aerial scene) or over-inking (fingerprints); the relative positions of the minutiae may vary as a result of perspective variation (aerial scene) or rolling pressure (fingerprints); and false characteristics may appear because of noise contamination due to rain, snow, etc. (aerial scene) or multiple impressions (fingerprints). Under these conditions, the RIV approach tolerates a relatively wide degree of variation while still being able to measure the degree of similarity between the patterns to be compared. It should therefore be apparent to those skilled in the art that modifications can be made within the spirit and scope of the invention as set forth in the appended claims.

We claim:

1. An automatic minutiae pattern matching system comprising:
   means responsive to minutiae of first and second patterns for selectively generating a plurality of sets of neighborhood comparison signals representative of the closeness of match and coordinate and orientation displacements between minutiae neighborhoods of the first and second patterns, each set of neighborhood comparison signals comprising a match score and associated coordinate and orientation displacement signals respectively representative of the closeness of match and coordinate and orientation displacements between a minutiae neighborhood of the first minutiae pattern and a minutiae neighborhood of the second pattern; and
   means having a plurality of three-dimensional ranges of different displacements in a three-coordinate system for adding in each three-dimensional range all match scores whose associated sets of displacement signals represent displacements lying within that three-dimensional range in order to find the three-dimensional range having the highest combined match score, the highest combined match score being indicative of the relative closeness of match between the first and second patterns.

2. The system of claim 1 wherein said generating means comprises:
   means responsive to minutiae of the first and second patterns for selectively developing for each minutia in the first and second patterns an associated minutiae comprised of nearby neighboring minutiae contained within a preselected radial distance of said minutia; and means selectively responsive to the minutiae neighborhoods of the first and second patterns for developing the plurality of sets of neighborhood comparison signals.

3. The system of claim 2 wherein said means for adding includes:
means for determining the relative coordinate and orientation displacements between the first and second patterns for the best match between these patterns.

4. An automatic fingerprint matching system comprising:
means for selectively generating for each minutia in first and second fingerprints a minutiae neighborhood comprised of nearby neighboring minutiae;
means for selectively comparing each minutiae neighborhood in the first fingerprint against each minutiae neighborhood in the second fingerprint to provide for each pair of compared minutiae neighborhoods a score indicative of the closeness of match of those comared minutiae neighborhoods and the associated relative displacement in $\Delta X$, $\Delta Y$, $\Delta\theta$ space of those compared minutiae neighborhoods; and
means for performing a histogram in $\Delta X$, $\Delta Y$, $\Delta\theta$ space by selectively combining the scores according to their associated relative displacements in $\Delta X$, $\Delta Y$, $\Delta\theta$ space in order to find the densest concentration of scores, said densest concentration of scores being indicative of the closeness of match of the first and second fingerprints.

5. An automatic minutiae pattern matching system comprising:
means responsive to minutiae of first and second minutiae patterns for selectively developing for each minutia in the first and second minutiae patterns an associated minutiae neighborhood comprised of nearby neighboring minutiae;
means selectively responsive to the minutiae neighborhoods of the first and second minutiae patterns for generating a plurality of different sets of neighborhood comparison signals, each set of neighborhood comparison signals comprising a match score and associated coordinate and orientation displacement signals respectively indicative of the closeness of match and coordinate and orientation displacements between a minutiae neighborhood of the first minutiae pattern and a minutiae neighborhood of the second minutiae pattern;
means for storing the match scores and associated coordinate and orientation displacements; and
means for selectively combining the match scores from said storing means in a plurality of regions in three-coordinate space according to the coordinate and orientation displacement signals associated with the match scores in order to find the region with the highest combined match score, the highest combined matched score being indicative of the relative closeness of match between the first and second minutiae patterns, and preselected coordinate and orientation signals associated with the region with the highest combined matched score being indicative of the coordinate and orientation displacements between the first and second minutiae patterns.

6. An automatic fingerprint matching system comprising:
means responsive to minutiae of first and second fingerprints for selectively generating a plurality of sets of neighborhood comparison signals representative of the closeness of match and coordinate and orientation displacements between minutiae neighborhoods of the first and second fingerprints, each set of neighborhood comparison signals comprising a match score and associated coordinate and orientation displacement signals respectively representative of the closeness of match and coordinate and orientation displacements between a minutiae neighborhood of the first fingerprint and a minutiae neighborhood of the second fingerprint; and
means having a plurality of three-dimensional ranges of different displacements in a three-coordinate system for adding in each three-dimensional range all match scores whose associated sets of displacement signals represent displacements lying within that three-dimensional range in order to find the three-dimensional range having the highest combined match score, the highest combined match score being indicative of the relative closeness of match between the first and second fingerprints.

7. The system of claim 5 wherein said generating means comprises:
means responsive to minutiae of the first and second fingerprints for selectively developing for each minutia in the first and second fingerprints an associated minutiae neighborhood comprised of nearby neighboring minutiae contained within a preselected radial distance of said minutia; and
means selectively responsive to the minutiae neighborhoods of the first and second fingerprints for developing the plurality of sets of neighborhood comparison signals.

8. An automatic fingerprint matching system comprising:
means responsive to minutiae of first and second fingerprints for selectively developing for each minutia in the first and second fingerprints an associated minutiae neighborhood comprised of nearby neighboring minutiae;
means selectively responsive to the minutiae neighborhoods of the first and second fingerprints for generating a plurality of different sets of neighborhood comparison signals, each set of neighborhood comparison signals comprising a match score and associated coordinate and orientation displacement signals respectively indicative of the closeness of match and coordinate and orientation displacements between a minutiae neighborhood of the first fingerprint and a minutiae neighborhood of the second fingerprint;
means for storing the match scores and associated coordinate and orientation displacements; and
means for selectively combining the match scores from said storing means in a plurality of regions in three-coordinate space according to the coordinate and orientation displacement signals associated with the match scores in order to find the region with the highest combined match score, the highest combined matched score being indicative of the relative closeness of match between the first and second fingerprints, and preselected coordinate and orientation signals associated with the region with the highest combined matched score being indicative of the coordinate and orientation displacements between the first and second fingerprints.

9. An automatic fingerprint matching system comprising:
- means responsive to minutiae of unidentified and reference fingerprints for developing for each minutia a group of minutiae comprised of minutiae contained within a preselected radial distance of said each minutia;
- first means for matching each group of minutiae in the unidentified fingerprint against each group of minutiae in the reference fingerprint to provide a plurality of scores and a plurality of associated sets of displacement signals, each score being indicative of the closeness of match between the groups of minutiae being matched and each associated set of displacement signals being representative of the relative displacement in a preselected three-coordinate system between the groups of minutiae being matched;
- second means for storing the scores and sets of displacement signals; and
- third means having a plurality of three-dimensional ranges of different displacements in the preselected coordinate system for adding in each three-dimensional range all scores from said second means whose associated sets of displacement signals represent displacements lying within that three-dimensional range in order to find the three-dimensional range that has the largest total score, the largest total score being indicative of the relative closeness of match between the unidentified and reference fingerprints.

10. The system of claim 9 wherein each group of minutia is relative information vector and said first means comprises:
- a comparator responsive to a relative information vector from each of the unidentified and reference fingerprints for producing the score indicative of the closeness of match between each pair of relative information vectors of the unidentified and reference fingerprints;
- a coordinate transformation circuit responsive to the relative information vectors applied to said comparator for producing the set of displacement signals; and
- a gating circuit responsive to each score above a preselected threshold level for allowing that score and the set of displacement signals associated therewith to be stored in said second means.

11. The system of claim 10 further comprising:
- first and second storage circuits;
- fourth means selectively responsive to sequences of minutiae from the unidentified and reference fingerprints for encoding the minutiae from the unidentified and reference fingerprints into relative information vector format and respectively storing the encoded fingerprints in the first and second storage circuits; and
- means for selectively applying the relative information vectors to said comparator.

* * * * *